(12) United States Patent
Retterath

(10) Patent No.: US 12,072,515 B2
(45) Date of Patent: Aug. 27, 2024

(54) RETROREFLECTIVE MATERIALS AND ARTICLES INCORPORATING NEAR-IDEAL TOTAL INTERNAL RETROREFLECTIVE ELEMENTS

(71) Applicant: Vergence Automation, Inc., Chaska, MN (US)

(72) Inventor: James E. Retterath, Chaska, MN (US)

(73) Assignee: Vergence Automation, Inc., Chaska, MN (US)

( * ) Notice: Subject to any disclaimer, the term of this patent is extended or adjusted under 35 U.S.C. 154(b) by 0 days.

(21) Appl. No.: 18/221,935

(22) Filed: Jul. 14, 2023

(65) Prior Publication Data

US 2023/0400612 A1    Dec. 14, 2023

Related U.S. Application Data

(63) Continuation of application No. 16/563,523, filed on Sep. 6, 2019, now Pat. No. 11,762,133.

(60) Provisional application No. 62/874,100, filed on Jul. 15, 2019, provisional application No. 62/753,218, filed on Oct. 31, 2018, provisional application No. 62/730,941, filed on Sep. 13, 2018.

(51) Int. Cl.
*G02B 5/12* (2006.01)
*E01F 9/524* (2016.01)
*G02B 5/124* (2006.01)

(52) U.S. Cl.
CPC .............. *G02B 5/124* (2013.01); *E01F 9/524* (2016.02)

(58) Field of Classification Search
None
See application file for complete search history.

(56) References Cited

U.S. PATENT DOCUMENTS

| 1,743,835 A | 1/1930 | Stimson |
| 3,541,606 A | 11/1970 | Heenan et al. |
| 3,712,706 A | 1/1973 | Stamm |
| 3,810,804 A | 5/1974 | Rowland |
| 3,924,929 A | 12/1975 | Holmen et al. |
| 3,946,130 A | 3/1976 | Tung et al. |
| 3,975,083 A | 8/1976 | Rowland |
| 4,025,159 A | 5/1977 | McGrath |
| 4,066,331 A | 1/1978 | Lindner |
| 4,123,140 A | 10/1978 | Ryan et al. |
| 4,145,112 A | 3/1979 | Crone et al. |

(Continued)

FOREIGN PATENT DOCUMENTS

| CA | 1291465 C | 10/1991 |
| CN | 100437156 C | 11/2008 |

(Continued)

OTHER PUBLICATIONS

ASTM, "D1746-15, Standard Test Method for Transparency of Plastic Sheeting," ASTM International, 2019, www.astm.org, 4 pages.

(Continued)

*Primary Examiner* — Jennifer D. Carruth
(74) *Attorney, Agent, or Firm* — Barnes & Thornburg LLP

(57) ABSTRACT

Retroreflective materials and articles are enabled that increase the retroreflectivity of reflective materials or articles for roadway, automotive, and safety purposes by incorporating retroreflective elements that exhibit near-ideal Total Internal Reflection (TIR).

18 Claims, 60 Drawing Sheets

(56) References Cited

U.S. PATENT DOCUMENTS

| | | |
|---|---|---|
| 4,202,600 A | 5/1980 | Burke et al. |
| 4,208,090 A | 6/1980 | Heenan |
| 4,243,618 A | 1/1981 | Van Arnam |
| 4,349,598 A | 9/1982 | White |
| 4,576,850 A | 3/1986 | Martens |
| 4,588,258 A | 5/1986 | Hoopman |
| 4,712,868 A | 12/1987 | Tung et al. |
| 4,775,219 A | 10/1988 | Appeldorn et al. |
| 4,895,428 A | 1/1990 | Nelson et al. |
| 5,450,235 A | 9/1995 | Smith et al. |
| 5,571,362 A | 11/1996 | Hachey et al. |
| 5,614,286 A | 3/1997 | Bacon, Jr. et al. |
| 5,679,437 A | 10/1997 | Hackworth et al. |
| 5,691,846 A | 11/1997 | Benson, Jr. et al. |
| 5,782,993 A | 7/1998 | Ponewash |
| 6,127,020 A | 10/2000 | Bacon, Jr. et al. |
| 6,155,689 A | 12/2000 | Smith |
| 6,172,810 B1 | 1/2001 | Fleming et al. |
| 6,287,670 B1 | 9/2001 | Benson et al. |
| 6,287,680 B1 | 9/2001 | Sasaki et al. |
| 6,470,610 B1 | 10/2002 | Northey |
| 6,540,367 B1 | 4/2003 | Benson et al. |
| 6,800,574 B2 | 10/2004 | Anderson |
| 6,883,921 B2 | 4/2005 | Mimura et al. |
| 6,967,053 B1 | 11/2005 | Mullen et al. |
| 7,045,475 B2 | 5/2006 | Senturk et al. |
| 7,075,718 B2 | 7/2006 | Suzuki et al. |
| 7,156,527 B2 | 1/2007 | Smith |
| 7,168,815 B2 | 1/2007 | Shipman et al. |
| 7,784,952 B2 | 8/2010 | Yukawa et al. |
| 7,995,039 B2 | 8/2011 | Eliasson et al. |
| 8,057,043 B2 | 11/2011 | Maekawa |
| 8,269,202 B2 | 9/2012 | Backes |
| 8,434,872 B2 | 5/2013 | Maekawa |
| 8,469,578 B2 | 6/2013 | Cornelissen et al. |
| 8,496,339 B2 | 7/2013 | Nakajima |
| 8,513,322 B2 | 8/2013 | Wright et al. |
| 8,570,393 B2 | 10/2013 | Moed et al. |
| 8,591,044 B2 | 11/2013 | Budd et al. |
| 8,651,720 B2 | 2/2014 | Sherman et al. |
| 8,783,879 B2 | 7/2014 | Smith et al. |
| 8,915,635 B2 | 12/2014 | Fiorentino et al. |
| 9,182,525 B2 | 11/2015 | Kim et al. |
| 9,294,754 B2 | 3/2016 | Billerbeck et al. |
| 9,335,255 B2 | 5/2016 | Retterath et al. |
| 9,470,822 B2 | 10/2016 | Smith |
| 9,551,475 B2 | 1/2017 | Sherman et al. |
| 9,575,225 B2 | 2/2017 | Kim |
| 9,651,721 B2 | 5/2017 | Chapman |
| 9,670,091 B2 | 6/2017 | Ryu et al. |
| 9,703,023 B2 | 7/2017 | Smith et al. |
| 9,709,349 B2 | 7/2017 | Raman et al. |
| 9,746,591 B2 | 8/2017 | Lu et al. |
| 9,790,372 B1 | 10/2017 | Greer et al. |
| 9,866,816 B2 | 1/2018 | Retterath |
| 9,910,194 B2 | 3/2018 | Free et al. |
| 9,923,111 B2 | 3/2018 | Fan et al. |
| 9,964,676 B2 | 5/2018 | Nagahama et al. |
| 9,971,074 B2 | 5/2018 | Chatterjee et al. |
| 10,031,266 B2 | 7/2018 | Pricone |
| 10,088,251 B2 | 10/2018 | Raman et al. |
| 10,218,913 B2 | 2/2019 | Somasundaram et al. |
| 10,298,908 B2 | 5/2019 | Retterath |
| 10,382,742 B2 | 8/2019 | Retterath |
| 10,623,716 B2 | 4/2020 | Retterath |
| 11,001,979 B2 | 5/2021 | Retterath |
| 2001/0026860 A1 | 10/2001 | Benson et al. |
| 2003/0123931 A1 | 7/2003 | Khieu et al. |
| 2006/0087735 A1 | 4/2006 | Nilsen et al. |
| 2008/0036356 A1 | 2/2008 | Ward et al. |
| 2010/0277801 A1 | 11/2010 | Nakajima |
| 2012/0092756 A1 | 4/2012 | Yoshida et al. |
| 2014/0268337 A1 | 9/2014 | Lu et al. |
| 2016/0011346 A1 | 1/2016 | Vasylyev |
| 2016/0018582 A1 | 1/2016 | Fiorentino et al. |
| 2016/0209559 A1 | 7/2016 | McCarthy et al. |
| 2017/0193312 A1 | 7/2017 | Ai et al. |
| 2017/0243913 A1 | 8/2017 | Lee et al. |
| 2017/0257617 A1 | 9/2017 | Retterath |
| 2018/0017679 A1 | 1/2018 | Valouch et al. |
| 2018/0117863 A1 | 5/2018 | Smith et al. |
| 2018/0196194 A1 | 7/2018 | Fattal |
| 2018/0214023 A1 | 8/2018 | Chen et al. |
| 2018/0295344 A1 | 10/2018 | Retterath |
| 2019/0058867 A1 | 2/2019 | Retterath |
| 2019/0101751 A1 | 4/2019 | Chou et al. |
| 2019/0163992 A1 | 5/2019 | Mahon |
| 2019/0364262 A1 | 11/2019 | Retterath |
| 2020/0036958 A1 | 1/2020 | Retterath |
| 2020/0048847 A1 | 2/2020 | Retterath |
| 2021/0404129 A1 | 12/2021 | Retterath |
| 2022/0178094 A1* | 6/2022 | Retterath ............... E01F 9/512 |

FOREIGN PATENT DOCUMENTS

| | | |
|---|---|---|
| CN | 101672939 B | 6/2011 |
| CN | 101561523 B | 9/2011 |
| CN | 102354009 A | 2/2012 |
| CN | 101952747 B | 9/2012 |
| CN | 203623051 U | 6/2014 |
| CN | 204898550 U | 12/2015 |
| DE | 102007003766 B4 | 9/2008 |
| EP | 0879430 B1 | 9/2003 |
| EP | 0988573 B1 | 8/2004 |
| EP | 1053490 B1 | 3/2005 |
| EP | 1136847 B1 | 7/2005 |
| EP | 1166159 B1 | 2/2006 |
| EP | 2020348 B1 | 8/2016 |
| GB | 2546265 A | 7/2017 |
| JP | 3834596 B2 | 10/2006 |
| JP | 4009751 B2 | 11/2007 |
| JP | 6512868 B2 | 5/2019 |
| KR | 10-0459779 B1 | 12/2004 |
| KR | 10-2008-0066063 A | 7/2008 |
| KR | 10-2010-0009432 A | 1/2010 |
| WO | WO 2012/088921 A1 | 7/2012 |
| WO | WO 2017/007816 A1 | 1/2017 |
| WO | WO 2017/093453 A1 | 6/2017 |

OTHER PUBLICATIONS

ASTM, "D4956," Oct. 2017 (Year 2017).

Johnson, "High Temperature Thermoplastics," ThoughtCo., Jul. 21, 2018, 3 pages.

Land Infrared, "Temperature Measurement with Infrared Thermometers," 43 pages.

Wikipedia, "Sellmeier Equation," 3 pages.

Application and File history for U.S. Appl. No. 16/537,275, filed Sep. 9, 2019.

Application and File history for U.S. Appl. No. 16/863,511, filed Apr. 30, 2020.

Application and File history for U.S. Appl. No. 17/316,481, filed May 10, 2021.

Application and File history for U.S. Appl. No. 17/544,600, filed Dec. 7, 2021.

Application and File history for U.S. Appl. No. 17/744,377, filed May 13, 2022.

* cited by examiner

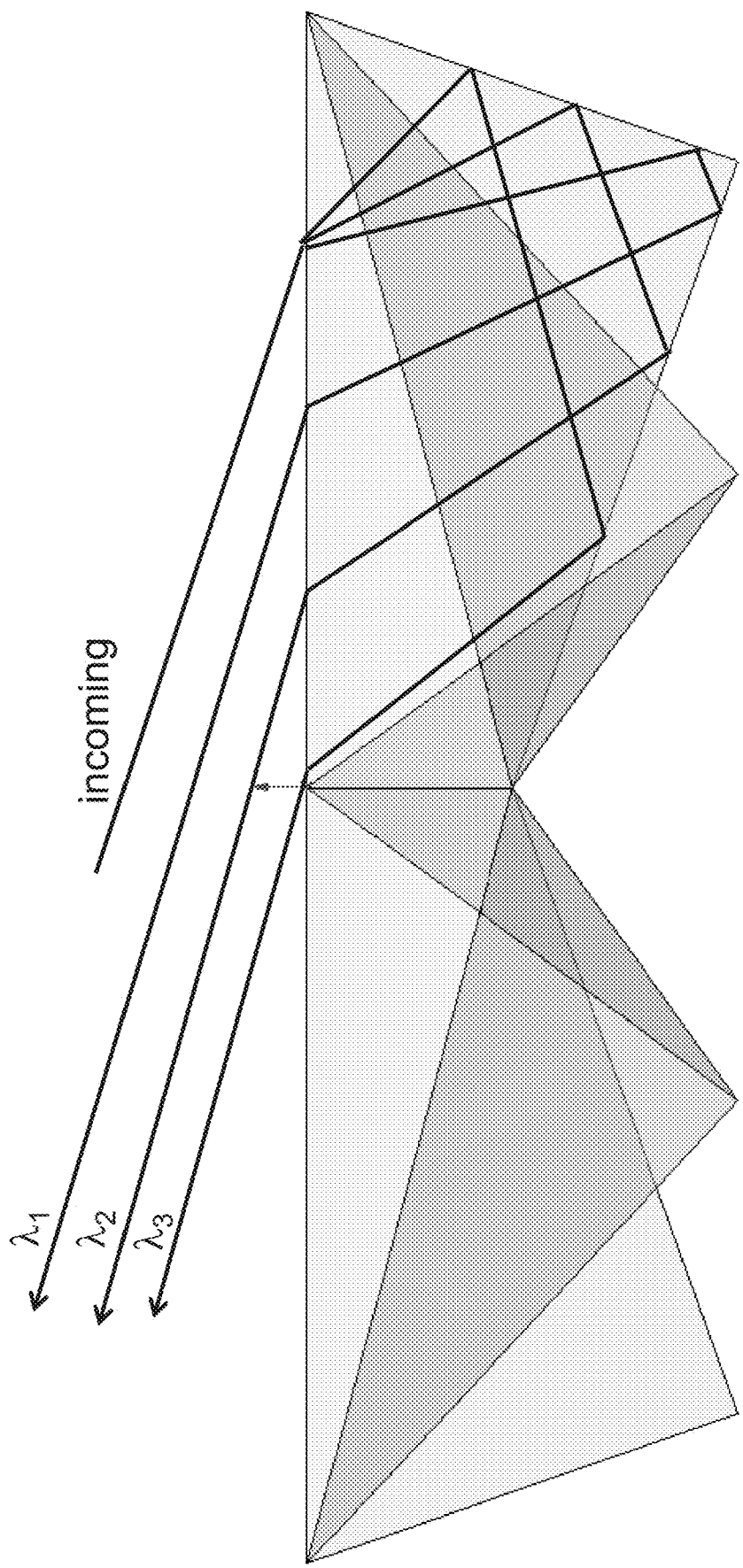

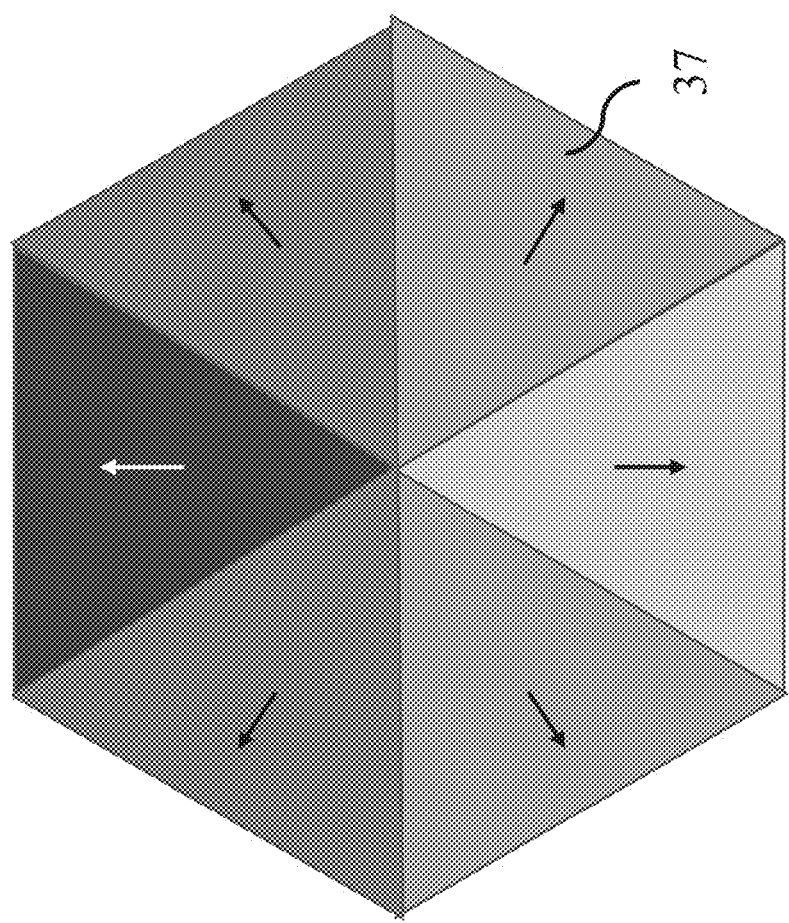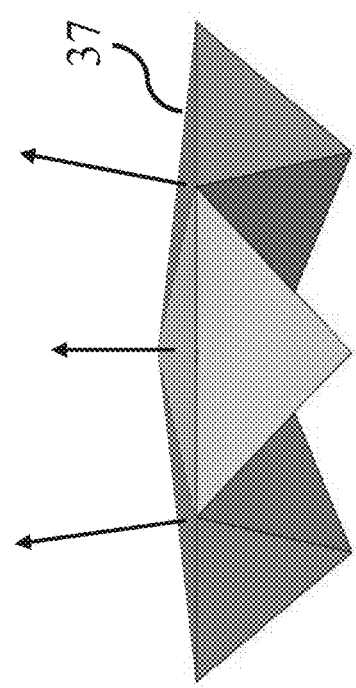
Fig. 8A
Fig. 8B

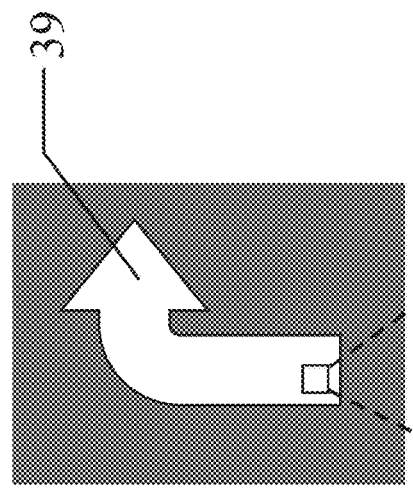
Fig. 9A
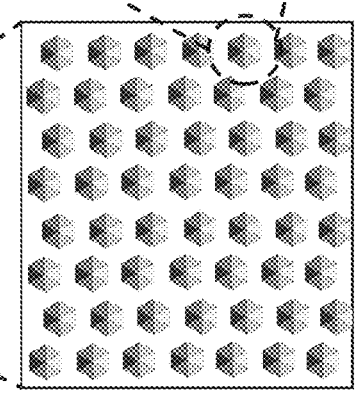
Fig. 9B
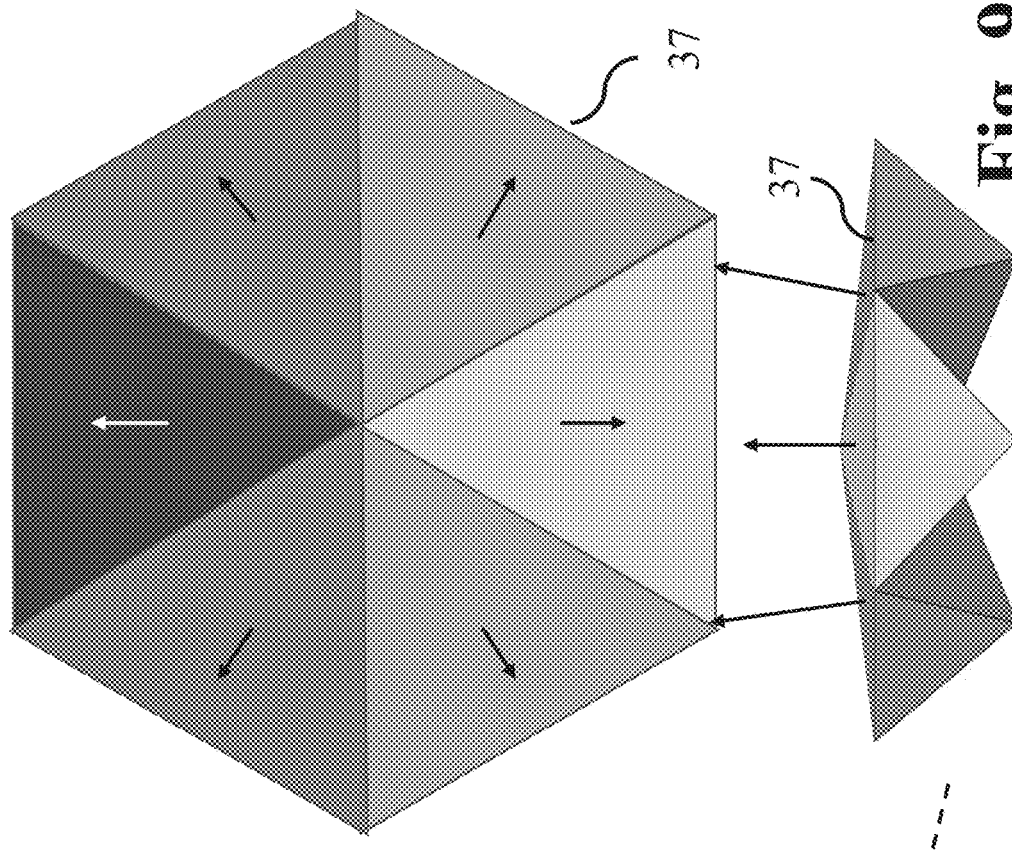
Fig. 9C
Fig. 9D

Fig. 23

| Parameter | Value | Unit |
|---|---|---|
| Article Index of Refraction | 2.4 | |
| Backing Index of Refraction | 1.5 | |
| Apex Axis Angle | 140 | degrees |
| Face Roughness | 0.001 | microns |
| Specular Reflectance % | 70 | percent |
| Article reflectivity | 0.96 | |

| 140 | -90 | -80 | -70 | -60 | -50 | -40 | -30 | -20 | -10 | 0 | 10 | 20 | 30 | 40 | 50 | 60 | 70 | 80 | 90 |
|---|---|---|---|---|---|---|---|---|---|---|---|---|---|---|---|---|---|---|---|
| 90 | 0.91 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 | 0.91 |
| 80 | 0.91 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 | 0.91 |
| 70 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 |
| 60 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 |
| 50 | 0.92 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.92 |
| 40 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| 30 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| 20 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| 10 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| 0 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| -10 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| -20 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| -30 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| -40 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 |
| -50 | 0.92 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.92 |
| -60 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 |
| -70 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 |
| -80 | 0.91 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 | 0.91 |
| -90 | 0.91 | 0.92 | 0.92 | 0.96 | 0.96 | 0.96 | 0.96 | 0.96 | 0.96 | 0.96 | 0.96 | 0.96 | 0.96 | 0.96 | 0.96 | 0.96 | 0.92 | 0.92 | 0.91 |

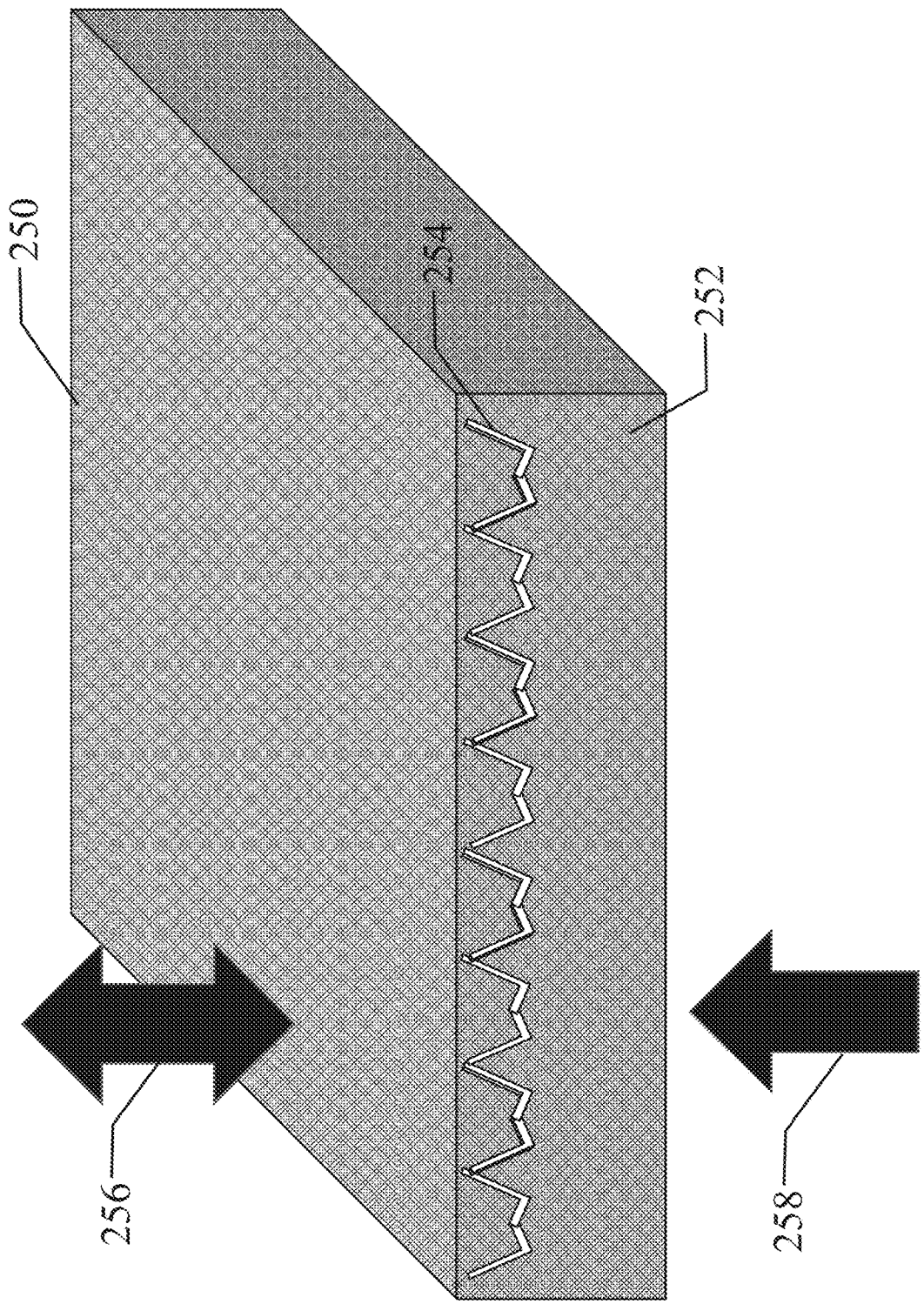

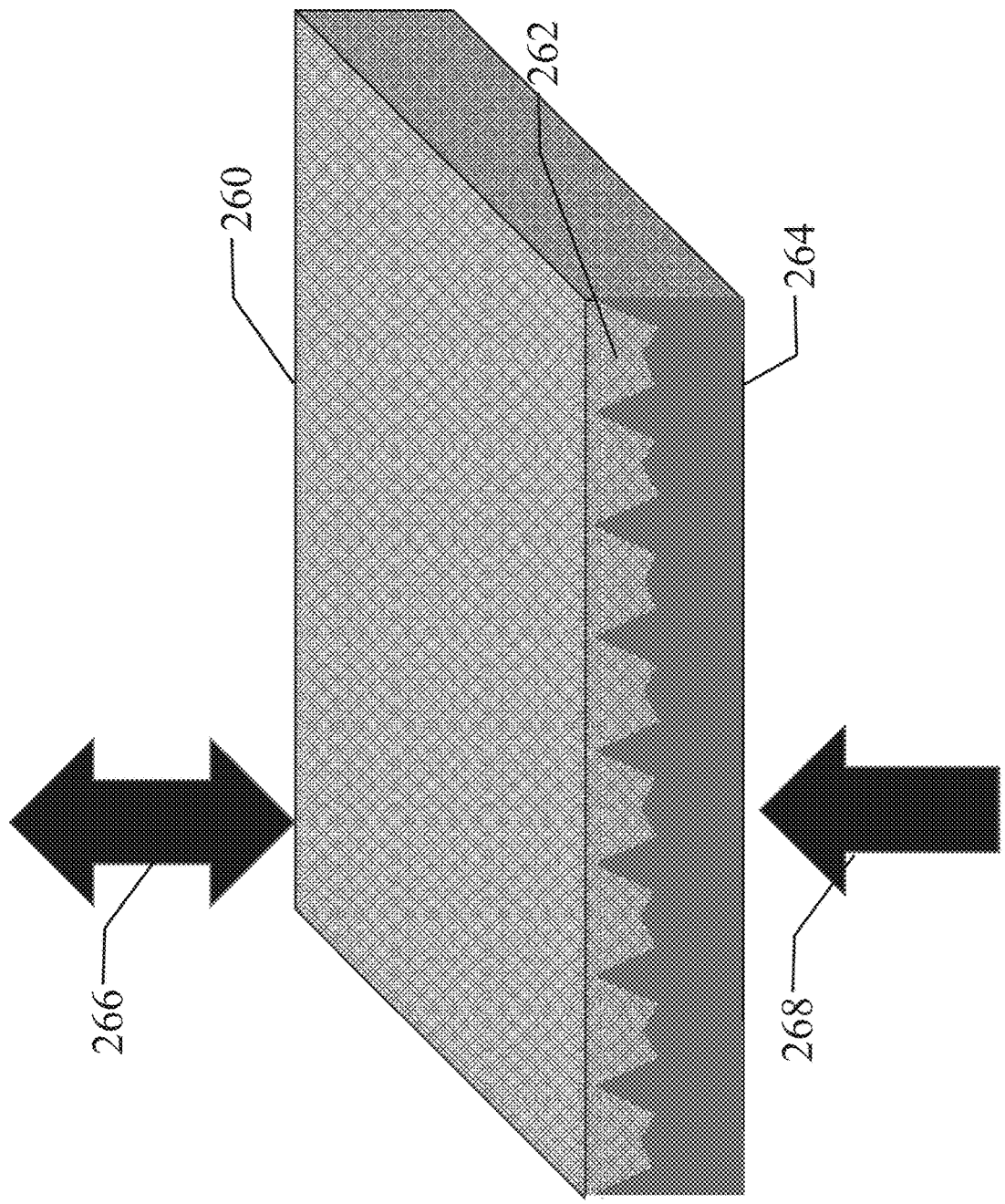

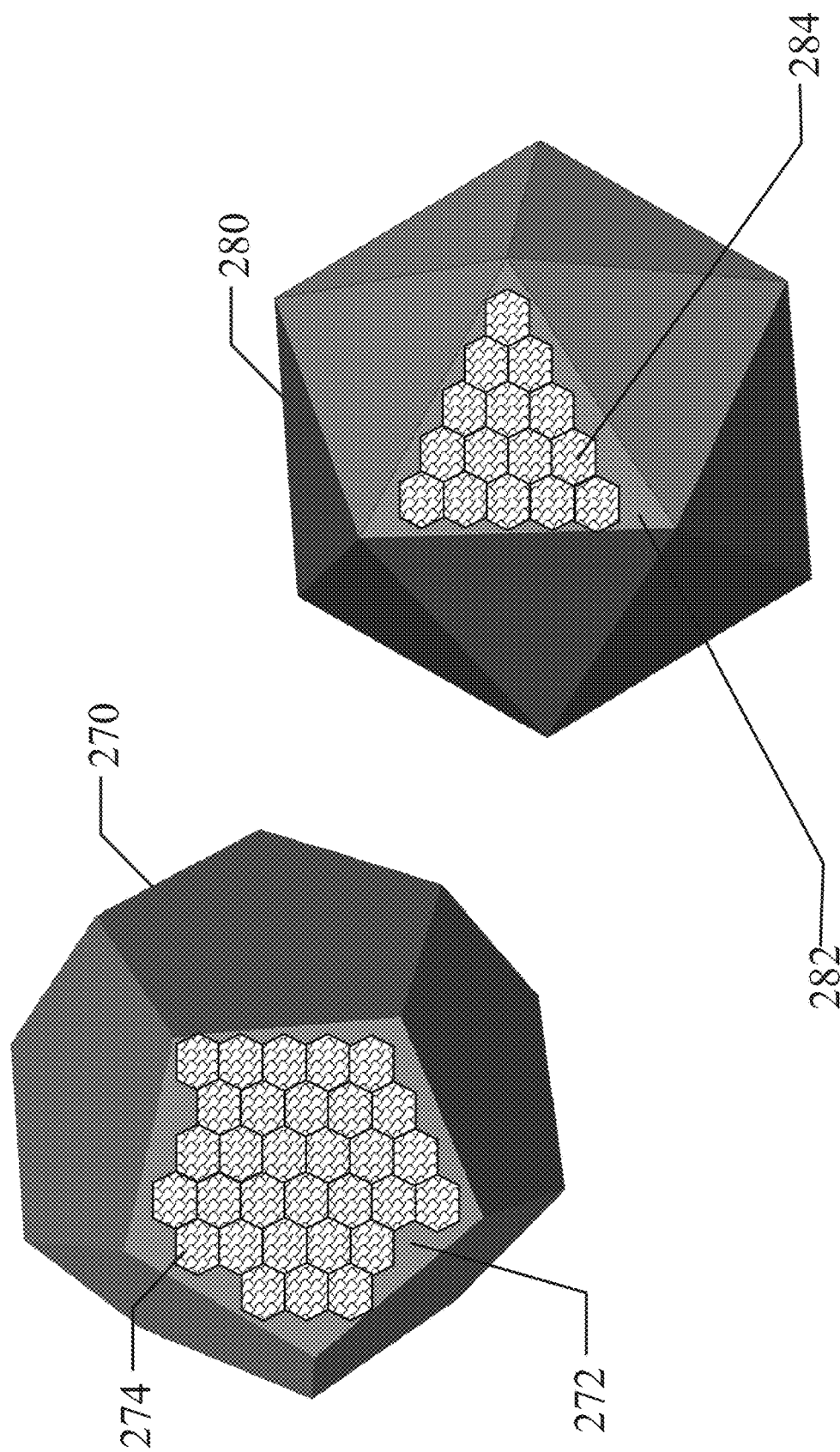

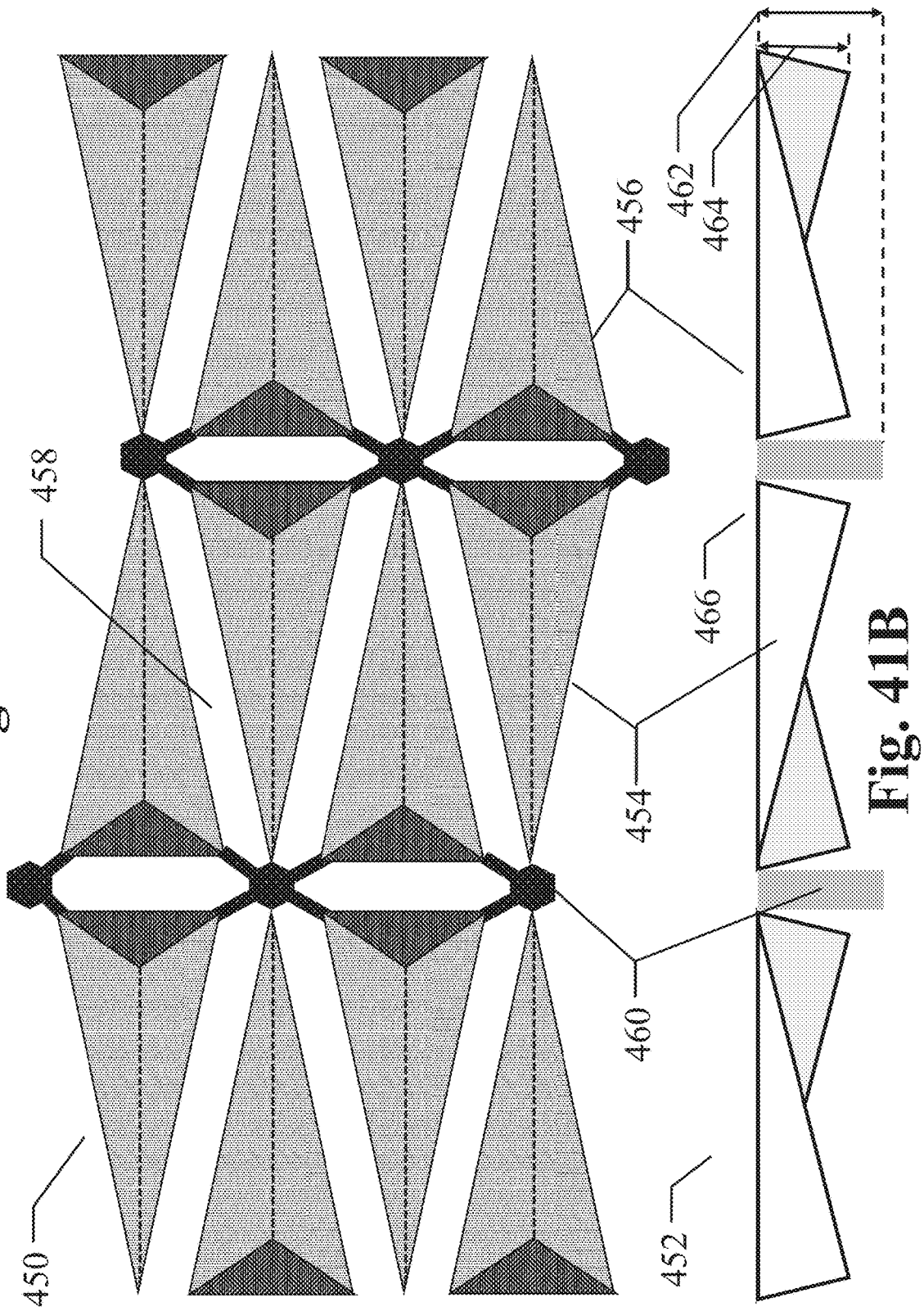

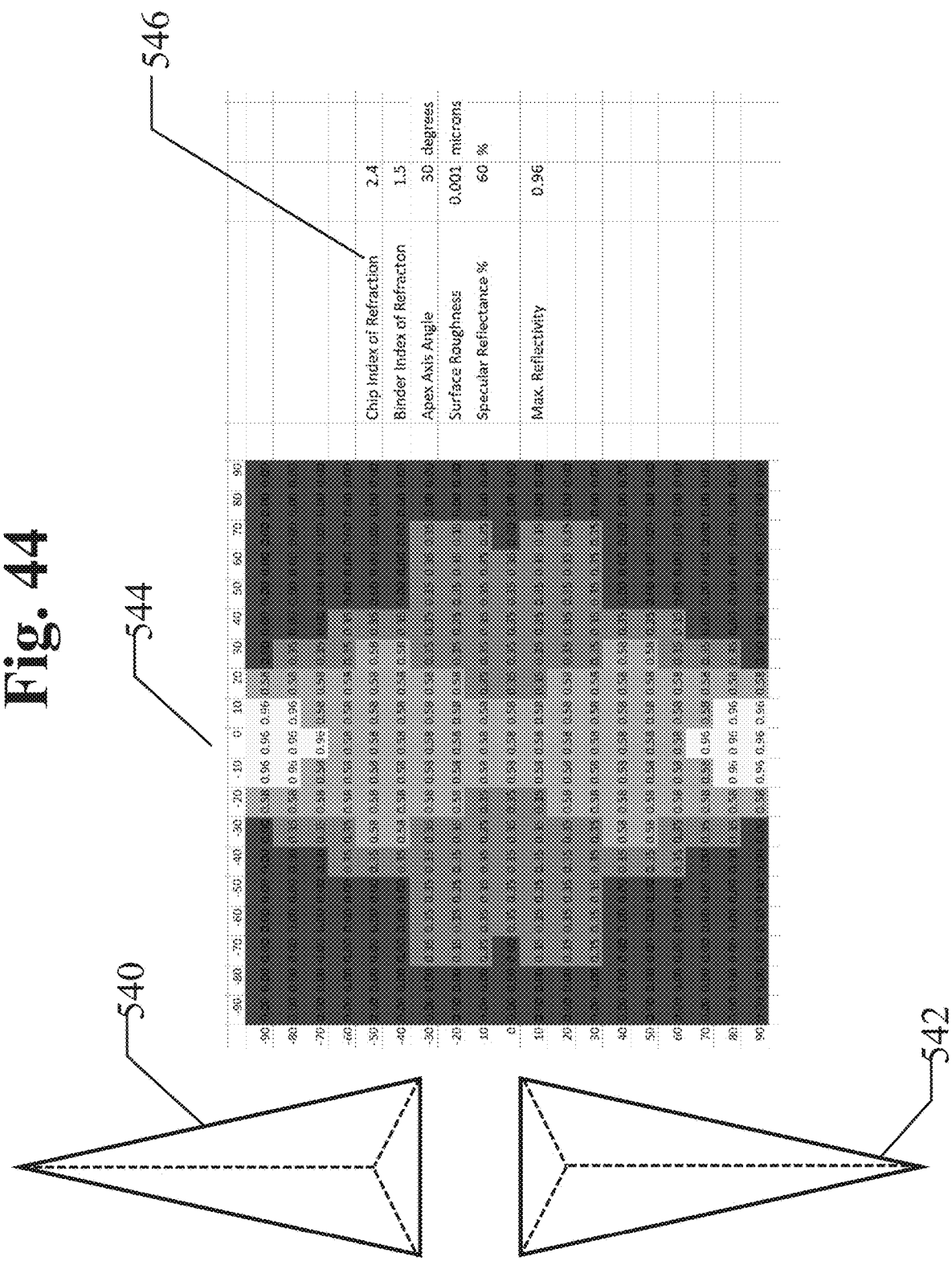

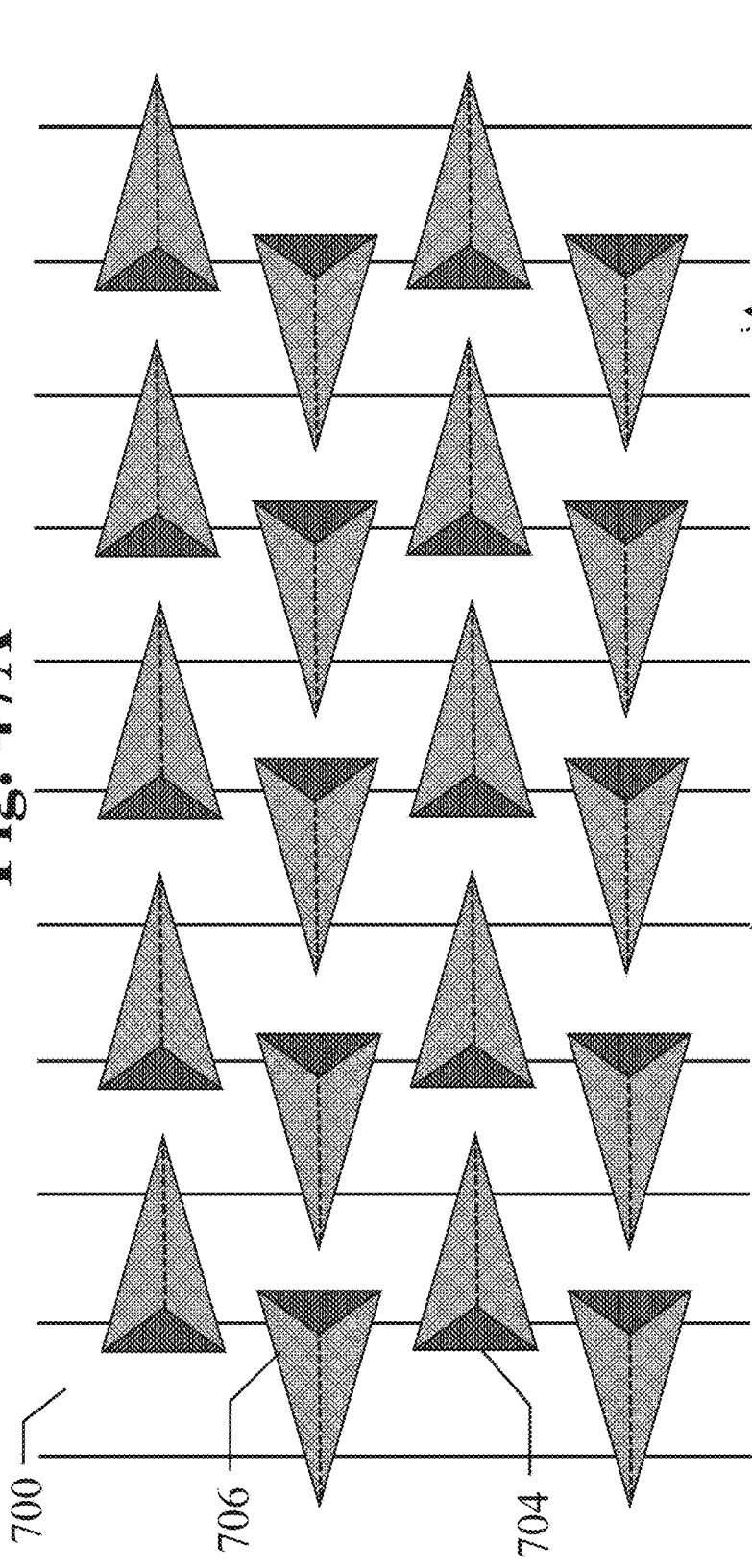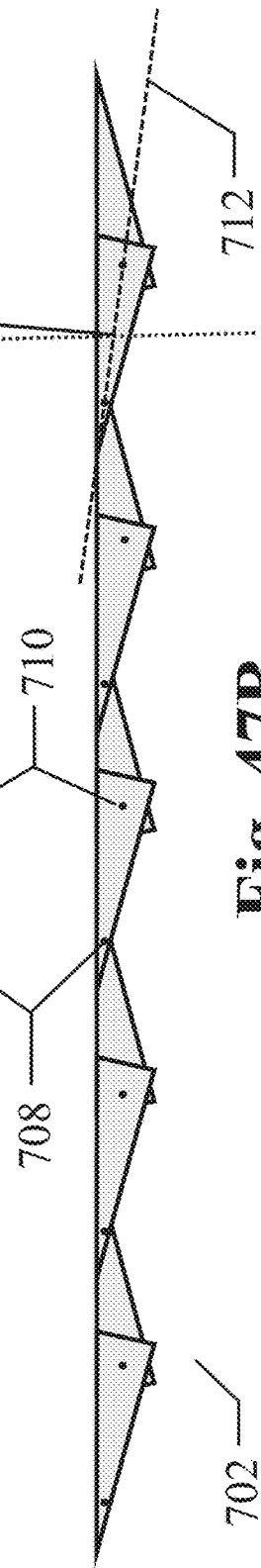

RETROREFLECTIVE MATERIALS AND ARTICLES INCORPORATING NEAR-IDEAL TOTAL INTERNAL RETROREFLECTIVE ELEMENTS

PRIORITY

This application is a continuation of U.S. Pat. No. 16/563,523, filed Sep. 6, 2019 and also claims priority to U.S. Provisional Applications Nos. 62/730,941, filed Sep. 13, 2018, 62/753,218, filed Oct. 31, 2018 and 62/874,100, filed Jul. 15, 2019, the contents of each of which are hereby incorporated by reference.

FIELD

The present disclosure relates to roadway and automotive materials and articles that are reflective, such as reflective road markers. More particularly, the present disclosure relates to reflective materials and articles incorporating a mesh arrangement of multiple, discrete retroreflective canted cube corner reflectors having generally flat incident surfaces and high transparency, with a refractive index ratio high enough to produce a high degree of total internal reflection (TIR) that results in near-ideal retroreflectivity under dry or wet conditions and improved road visibility for both human operators and vehicle machine vision systems.

BACKGROUND

Retroreflectivity refers to a physical property of reflecting light back in an incident direction of the light. Reflective materials and articles having high retroreflectivity properties are used for road signs and roadway markings to enhance visibility while promoting driver safety. Retroreflectivity may be affected by surface characteristics, composition of materials, refractive index, and/or transparency of the materials. Retroreflective materials and articles like road signs and pavement markings have generally been developed based on retroreflective elements associated with the materials or articles.

Because of the differences in where and how they are used, the techniques for enhancing retroreflectivity for roadway materials and articles have differed for pavement markings versus road signs. For pavement markings, retroreflectivity is typically enhanced by embedding discrete retroreflective elements in a binder or adhesive material such that the pavement markings exhibit specular reflectance. The most common retroreflective elements used for pavement marking are beads or similar microsphere elements having a higher index of refraction than the binder or adhesive material. For road signs, retroreflectivity is typically enhanced by using retroreflective sheeting with contiguous retroreflective elements that utilize the phenomenon of total internal reflection (TIR). The most common types of retroreflective sheeting consist of a layer of transparent material with a smooth front surface and a rear surface having a pattern of retroreflective elements or geometric features, such as a series of trihedral-shaped features referred to as cube corners because of the internal corner that is formed by the three mutually perpendicular flat surfaces of the trihedral structure.

Pavement markings that rely on specular reflection and are thus considered either non-TIR or low-TIR generally include microspheres as the retroreflective elements and are produced in prefabricated form like reflective tapes or are produced in situ by applying binder materials to roadways and applying a layer of one or more microsphere types to the unset binder layer. The binder typically consists of paint, thermoplastic material, thermoset material, or other curable material. Examples of reflective pavement marking constructions utilizing microsphere beads as the retroreflective elements are disclosed in U.S. Pat. No. 3,946,130 (Tung), U.S. Pat. No. 7,045,475 (Senturk), U.S. Pat. No. 7,168,815 (Shipman), U.S. Pat. No. 7,784,952 (Yukawa), U.S. Pat. No. 9,670,091 (Ryu), U.S. Pat. No. 9,790,372 (Greer), and Korean Appl. Nos. 10-2008-0066063 and 10-2010-0009432. Most such microsphere beads are formed by melting a raw material to form droplets which are then quenched by air or water to create the microsphere beads. U.S. Pat. No. 8,591,044 (Budd) discloses microsphere construction utilizing mixtures of high index of refraction compounds in an attempt to lower the overall melting points necessary for making such microsphere beads.

Multi-layer pavement markings with microspheres suffer from several shortcomings that inhibit their use for machine vision systems utilized in vehicle safety systems. First, microspheres utilize specular reflectance at the microsphere-to-binder layer, which results in lower levels of reflectivity due to loss. Second, microspheres rapidly lose adhesion with the binder layer, thus dramatically lowering the reflectivity of the article very early in the life cycle. Third, different types of microspheres must be utilized for improved performance in both wet and dry conditions. Because wet-type microspheres do not reflect well in dry conditions and because dry-type microspheres do not reflect well in wet conditions, reflective efficiency of the overall article is reduced. Furthermore, the non-flat incident surface of the produced materials makes them less durable and produces inconsistent performance for wet/dry surface conditions.

Reflective sign sheeting has been utilizing cube corner construction in flexible materials to enhance sign sheeting retroreflectivity. The flexible materials typically utilize a cube corner construction that utilizes TIR to enhance the article reflective properties at low entrance angles, or those angles that are near-parallel to and in the opposite direction of the normal vector for the sign. Illustrative examples of cube corner type retroreflectors that are used in reflective sheeting are disclosed in U.S. Pat. No. 3,541,606 (Heenan), U.S. Pat. No. 3,712,706 (Stamm), U.S. Pat. No. 3,810,804 (Rowland), U.S. Pat. No. 4,025,159 (McGrath), U.S. Pat. No. 4,123,140 (Ryan), U.S. Pat. No. 4,202,600 (Burke), U.S. Pat. No. 4,243,618 (Van Arnam), U.S. Pat. No. 4,349,598 (White), U.S. Pat. No. 4,576,850 (Martens), U.S. Pat. No. 4,588,258 (Hoopman), U.S. Pat. No. 4,775,219 (Appeldorn), U.S. Pat. No. 4,895,428 (Nelson), (Smith), U.S. Pat. No. 5,691,846 (Benson), U.S. Pat. No. 6,470,610 (Northey), U.S. Pat. No. 6,540,367 (Benson), U.S. Pat. No. 7,156,527 (Smith), and U.S. Pat. No. 9,703,023 (Smith).

Light beams or waves entering the incident surface of a retroreflective sheeting or material are measured according to an entrance angle that, like an angle of incidence, is determined relative to a normal of the surface where the beam or wave enters the surface. Depending upon the entrance angle and the differences in the indices of refraction, the light beams may experience TIR within the medium of the retroreflective sheeting or material and are then completely reflected internally within the medium and back out in the direction from which the light beams came. Ideally, such retroreflective sheeting or material should be able to retroreflect light beams entering the front surface not only at low entrance angles that are near zero (i.e., in a direction near normal to the sheeting), but also at high entrance angles. Because the ability to internally reflect light at high entrance angles is dependent on the difference between the indices of refraction of the material forming the retroreflective elements and the material that interfaces with the back surface, many versions of retroreflective sheeting provide an air space behind the retroreflective elements in order to maximize this difference. For example, U.S. Pat. No. 4,123,140 (Ryan) describes reflecting sheeting having a wide response angle, which is accomplished by positioning spaced apart cavities along one face (and also producing retroreflectivity by positioning light-reflecting beads along the other, opposite side of the sheeting). However, even when such an air space is used, light entering the retroreflective elements beyond a certain critical angle will leak out as partially refracted light, thereby reducing the retroreflectivity of the sheeting. Air spaces behind the reflective base material can also cause problems with durability and with the infusion of foreign, life-reducing materials.

Another solution that has been proposed for improving retroreflectivity is a series of parallel, specularly reflective repeating structures arranged along a reflective backing, and coated in a high index of refraction material, as disclosed, for example, in U.S. Publ. Appl. No. 2016-0011346 A1 (Vasylyev) (ledges) and in U.S. Pat. No. 3,975,083 (Rowland) (prismatic components) and U.S. Pat. No. 9,182,525 (Kim) (combinations of ledges and prismatic components). These materials are suitable only for very specific applications, as light incident from any direction except a very narrow cone can be "trapped" in the ladder style structure and scattered in any of a variety of directions that do not promote retroreflectivity.

To overcome these shortcomings, retroreflective sheeting has been developed that employs, in lieu of air spaces, a solid backing layer having an index of refraction that is lower than the index of refraction of the material used to form the retroreflective elements. One such approach using cube-corner retroreflecting units and septa embossed on one surface, with the septa being disposed to divide the surface into a multiplicity of separately sealable cells each holding several units is described in U.S. Pat. No. 3,924,929 (Holmen). While such sheeting is structurally sounder and stronger than comparable sheeting employing air spaces behind the retroreflective elements, the ability of such sheeting to provide TIR for a broad range of entrance angles is significantly less than that of air-backed articles because the difference in the index of refraction between the material forming the retroreflective elements and the material forming the solid backing layer is less. For example, if the retroreflective elements are cube corners formed from polycarbonate having an index of refraction n=1.59, and the solid backing material is cryolite having an index of refraction of n=1.32, the difference between the indices of refraction is 1.59−1.32=0.27. By contrast, when the backing layer is formed from air having an index of refraction n=1.00, the difference between the indices of refraction is 1.59 −1.00=0.59 which is more than twice as much as 0.27. Unfortunately, high entrance angle performance has been difficult to achieve due to the requirement that sign sheeting be produced in flexible form and, as a result, requiring materials with a low index of refraction.

Another approach to producing retroreflective sheeting uses an open-faced cube-corner surfaces in which the cube-corner features are on the front or incident surface instead of the rear surface as in conventional cube corner sheeting and are formed of a substantially rigid material to keep the cube-corner surfaces from flexing which can distort the shape of the cube-corner features. Instead of using the TIR phenomenon to enhance retroreflectivity, the open-face cube corner surfaces rely on specular reflection similar to the microsphere beads used in pavement markings. Examples of retroreflective sheeting with substantially rigid open-faced cube-corner elements that rely on specular reflection instead of TIR are disclosed in U.S. Pat. No. 6,967,053 (Mullen). Similar examples of retroreflective sheeting with open-faced cube-corner elements that rely on specular reflection instead of TIR are disclosed in U.S. Pat. No. 5,450,235 (Smith), U.S. Pat. No. 6,155,689 (Smith) and U.S. Pat. No. 6,287,680 (Benson), and U.S. Publ. Appl. No. 2006-0087735A1 (Nilsen).

In some versions, the retroreflective components can extend out of the sheeting material itself by slitting the sheeting material and expanding or stretching the sheeting material and then coating it in a clear polymer as described, for example, in U.S. Pat. No. 4,712,868 (Tung) for use in light-weight, portable reflective barricades. Although this technique improves incidence-angle reflection, such three-dimensional structures are susceptible to wear and tear and are generally not be acceptable for use on a roadway or other surface subject to mechanical impact or abrasion. Conversely, retroreflective features can be made that are indented into a sheet to provide retroreflectivity, such as by including materials that shrink to release parallel surfaces that exhibit TIR as described in U.S. Pat. No. 8,469,578 (Cornelissen).

Still another approach to increase the entrance angle at which a retroreflector exhibits some degree of retroreflectivity is to apply a reflective metallic layer such as vacuum-deposited aluminum to the back surface. In such a structure, when light enters the cube corners, for example, it exhibits specular reflection off of the metallic layer when it reaches the faces of the cube corners, and is retroreflected back toward its source, even when entering at angles beyond the critical angle for TIR in an air-backed structure. In addition to increasing the entrance angle at which the retroreflector exhibits some degree of retroreflectivity, metallization provides a seal over the back surface of the retroreflective elements that prevents TIR-destroying dirt and moisture from lodging on the back surfaces which would in turn degrade or destroy the ability of the retroreflective elements to provide TIR. Unfortunately, metallization has the disadvantage of reducing the overall retroreflectance of the article. Unlike TIR, for which reflectance is 100%, aluminum has a reflectance of only about 85%. Consequently, the intensity of a retroreflected ray of light that is reflected off of three aluminized faces is reduced to about $(85\%)^3$ or roughly 61% of its corresponding TIR intensity. Illustrative examples of various attempts to produce retroreflectors that enhance performance and/or improve on the entrance angles at which TIR occurs are disclosed in U.S. Pat. No. 6,172,810 (Fleming), U.S. Pat. No. 6,883,921 (Mimura), U.S. Pat. No. 8,651,720 (Sherman), U.S. Pat. No. 9,575,225 (Kim), U.S. Pat. No. 9,651,721 (Chapman), U.S. Pat. No. 9,910,194 (Benton Free), and U.S. Pat. No. 9,971,074 (Chatterjee). Most retroreflective articles used in connection with transportation applications have been optimized for nighttime detection in the visible spectrum, roughly 400-700 nanometers. With the advent of ADAS (Advanced Driver Assist Systems), ACC (Adaptive Cruise Control), LDW (Lane Departure Warning) Systems, LKS (Lane Keep Systems), and CAVs (Connected and Automated Vehicles), many automotive deployments are resorting to NIR (Near Infrared) active sensors to perform object sensing and detecting. Various attempts have been made to enhance and/or provide selective retroreflective articles in different spectral ranges other than the visible spectrum. Illustrative examples of such broader spectrum retroreflective articles and materials are disclosed in U.S. Pat. No. 8,496,339 (Nakajima), U.S. Pat. No. 8,783,879 (Smith), U.S. Pat. No. 9,746,591 (Lu), and U.S. Pat. No. 9,964,676 (Nagahama).

Most retroreflective articles used in connection with transportation applications for application to generally horizontal surfaces such as roadways have been optimized for application to surfaces that are not necessarily smooth. Conformance layers, such as the ones described in U.S. Pat. No. 6,127,020 (Bacon), maintain the upward configuration of the cube corners that provide retroreflectivity. By making the retroreflector flatter using the conformance layer, the reflectance angle cone need not be as great as embodiments in which the macrostructure of a retroreflective tape was not as smooth. Other approaches for retroreflective articles for transportation applications disclose discrete pavement elements held in a carrier web that are then produce separated elements as a result of frangible connections between the discrete paving elements, as described in U.S. Publ. Appl. No. 2003/0123931 A1 (Khieu) or a retroreflective tape that use transparent spheres embedded in a matrix and includes the addition of advanced materials such as high-index-of-refraction reflective elements, quantum emitters, dichroic pigments, and passive, machine-readable emitting tags for improved visibility as those described in U.S. Publ. Appl. No. 2016/0209559 A1 (McCarthy).

Prior art pavement marking materials, and even road signage, can exhibit reduced performance in wet conditions due to varying optical paths for wet and dry conditions. Techniques used to increase performance for wet/dry pavement marking articles, for example, include approaches like adding glass or ceramic beads of different diameters to the article surface to account for varying optical paths for wet and dry conditions. This construction increases the cost of the article and reduces the durability.

In view of the increased requirements for retroreflective materials and articles designed for use with autonomous vehicle machine visions systems, there is a need for new approaches to the design, construction and use of retroreflective materials and articles for roadway and automotive purposes that can improve both daytime and nighttime performance, can be applicable to both visible and NIR spectrums, and/or can provide more consistent performance in different environmental conditions.

SUMMARY

In embodiments, retroreflective materials and articles are enabled that increase the retroreflectivity of reflective materials or articles for roadway, automotive, and safety purposes by incorporating retroreflective elements that exhibit near-ideal Total Internal Reflection (TIR).

According to a first embodiment, a retroreflective material for creating roadway markers having a near-ideal retroreflectivity includes a mesh made of a flexible material and a plurality of discrete retroreflective elements made of a rigid material within the mesh in an array pattern that defines an incident surface. Each retroreflective element is formed of an array of cube corner elements with at least some of the cube corner elements having an apex axis having an orientation generally tilted relative to a normal of the incident surface. Each retroreflective element includes at least at least one surface exposed to the incident surface having a tilted surface normal angle of between about 2 degrees and 8 degrees relative to the normal of the incident surface that produces a near-ideal total internal reflection (TIR) of electromagnetic radiation incident upon the plurality of retroreflective elements when the retroreflective material is installed on a roadway.

In various embodiments, the retroreflective material is configured to be installed with a body layer presenting a generally flat surface corresponding to the incident surface and having a high transparency and a first index of refraction, and wherein each retroreflective element has a second index of refraction such that a refractive index ratio of the second index of refraction to the first index of refraction is sufficiently high to produce a high degree of total internal reflection (TIR) of light incident upon the incident surface.

In various embodiments, the flexible material is a plastic material and the rigid material is a crystalline material. In some embodiments, the plastic material consists of polycarbonate or acrylic and the crystalline material consists of zirconium, crystallized carbon, or silicon carbide. In some embodiments, the flexible material is transparent to wavelengths of electromagnetic radiation from 400-1000 nanometers. In some embodiments, the flexible material is a degradable material and in certain embodiments consists of an ultraviolet degradable material or a water soluble degradable material.

According to a second embodiment, a reflective article having a near-ideal retroreflectivity includes a body presenting a generally flat incident surface and having a high transparency and a first index of refraction, and a plurality of discrete, rigid retroreflective elements incorporated with the body. Each retroreflective element has an array of cube corner elements defining a plane parallel with the incident surface with at least some of the cube corner elements having an apex axis having an orientation generally tilted relative to a normal of the incident surface; and a second index of refraction such that a refractive index ratio of the second index of refraction to the first index of refraction is sufficiently high to produce a high degree of total internal reflection (TIR) of light incident upon the incident surface, wherein the plurality of discrete, rigid retroreflective elements are aligned within the body to form a mesh.

In embodiments, the mesh and/or body layer is transparent to wavelengths of light from 400-1000 nanometers. The retroreflective article can produce retroreflectivity greater than 90% of the light incident upon the incident surface at entrance angles from 80 degrees to 90 degrees. The angular performance range of retroreflectivity at the entrance angles can be essentially similar for both dry and wet roadway conditions. The retroreflective article can produce retroreflectivity greater than 95% of the light incident upon the incident. The retroreflective article can produce retroreflectivity greater than 98% of the light incident upon the incident. The body layer can be a sheet of flexible material, or the body layer can be a binder material. The body layer can be a road surface material. The body layer can include an adhesive layer intermediate at least a portion of the road surface material and at least one of the plurality of retroreflective elements.

In embodiments, the cube corner elements can have a surface roughness of each surface of the cube corner element that ranges 0.0005 microns to 0.01 microns. Each retroreflective element can have a thickness of less than 30 microns. In some embodiments, the array of cube corner elements can include a single near-ideal TIR retroreflective element having eighteen cube corner surfaces organized as six groups each of three cube corner surfaces with each of the surfaces of the cube corner groups aligned generally 90 degrees from each other. Each retroreflective element can include a configuration of multiple near-ideal TIR retroreflective elements, each near-ideal TIR retroreflective element comprising a subset of the array of cube corner elements. Each of the multiple near-ideal TIR retroreflective elements can have eighteen cube corner faces organized as six groups each of three cube corner surfaces with each of the surfaces of the cube corner groups aligned generally 90 degrees from each other.

In various embodiments, the array of cube corner elements can include one or more near-ideal TIR retroreflective elements, and each near-ideal TIR retroreflective element has a flat upper surface having an average width in the range of 0.2 to 20 millimeters. The array of cube corner elements can include one or more near-ideal TIR retroreflective elements, and each near-ideal TIR retroreflective element has an aspect ratio of an average diameter to an average depth of 4:1 or greater. The retroreflective element can have an average diameter that is less than 1 cm, or even less than 0.1 cm. The retroreflective element can be made of a material consisting of zirconium, crystallized carbon, or silicon carbide. The retroreflective article can be a roadway marker, or a road sign, or a safety article.

According to various embodiments, a retroreflective element having a near-ideal retroreflectivity and configured to be incorporated as one of a plurality of retroreflective elements within a mesh having a backing material of a first index of refraction is disclosed. The retroreflective element includes a discrete, rigid retroreflective element made of a material having a second index of refraction, the element having a front surface presenting a generally flat surface, an array of cube corner elements defining a plane parallel to the front surface with at least some of the cube corner elements having an apex axis having an orientation generally tilted relative to a normal of the plane. When the element is incorporated with the backing material of the article a refractive index ratio of the second index of refraction to the first index of refraction is at or above an amount that produces a near-ideal total internal reflection (TIR) of light incident upon the front surface.

In various embodiments, the retroreflective material may be used for longitudinal roadway markings, contrast roadway markings, high-index-of-refraction reflective mesh materials, and high-index-of-refraction reflective tape materials.

In embodiments, a reflective safety garment is enabled that exhibits sufficient flexibility to allow full range of motion for wearers of the garment. A flexible safety garment with improved entrance angle TIR allows for improved visibility over prior art garments that rely on spectral reflectivity and/or narrow-angle TIR. In embodiments, a flexible safety garment material is enabled with a medium material that exhibits the desired flexibility of the manufactured article. In embodiments, a flexible safety garment construction is enabled by embedding small, rigid, near-ideal TIR articles in a flexible, transparent medium.

In embodiments, a conspicuity material is enabled that exhibits sufficient flexibility to allow full adherence of the material to a non-flat surface. A conspicuity material with improved entrance angle TIR allows for improved visibility over prior art materials that rely on spectral reflectivity and/or narrow-angle TIR. In embodiments, a flexible conspicuity material is enabled with a medium material that exhibits the desired flexibility of the manufactured and adhered article. In embodiments, a flexible conspicuity material construction is enabled by embedding small, rigid, near-ideal TIR articles in a flexible, transparent medium.

In embodiments, a one-way, near-ideal retroreflective article is enabled with a non-reflective side and a reflective side. The transmissivity of the non-reflective side will be sufficiently high to allow propagation of most of the incident photons. Construction of the TIR layer is sufficient to allow photon transmission via an appreciably-unaltered optical path through the retroreflector. The reflectivity of the reflective side of the appreciably-flat, near-ideal retroreflector will exhibit a high degree of reflectivity throughout the range of incident angles. The amount of TIR is dependent on the incident angle of the incoming wave and the type of material used in the article. In embodiments, a one-way, near-ideal retroreflective article will describe an article that approaches 100% TIR for all incident angles from −90 degrees to +90 degrees.

In embodiments, a two-way, near-ideal retroreflective article is enabled with two reflective sides. The reflectivity of each side of the appreciably-flat, near-ideal retroreflector will exhibit a high degree of reflectivity throughout the range of incident angles. The amount of TIR is dependent on the incident angle of the incoming wave and the type of material used in the article. In embodiments, a two-way, near-ideal retroreflective article describes an article that approaches 100% TIR for all incident angles per side of −90 degrees to +90 degrees.

In embodiments, a one-way, near-ideal retroreflective article is enabled with a medium material that is transparent to wavelengths from 400 to 1000 nanometers, a relatively high index or refraction—typically higher than 2.1, and a structured medium backing of air or other material of with a relatively low index of refraction—typically lower than 1.5.

In embodiments, a one-way, near-ideal retroreflective article with backside near-ideal transmissivity is enabled with a medium material that is transparent to wavelengths from 400 to 1000 nanometers, a relatively high index or refraction—typically higher than 2.1, and a structured medium backing of air or other material of with a relatively low index of refraction—typically lower than 1.5, wherein the medium backing is transparent to wavelengths from 400 to 1000 nanometers.

In embodiments, a two-way, near-ideal retroreflective article is enabled with a medium material that is transparent to wavelengths from 400 to 1000 nanometers, a relatively high index or refraction—typically higher than 2.1, and two structured medium backings of air or other material of with a relatively low index of refraction—typically lower than 1.5.

In embodiments, a two-way, near-ideal retroreflective article is enabled with a medium material that is transparent to wavelengths from 400 to 1000 nanometers, a relatively high index or refraction—typically higher than 2.1, and a single structured medium backing of air or other material of with a relatively low index of refraction—typically lower than 1.5, wherein each of the two medium materials shares the common medium backing material.

In embodiments, a one-way, near-ideal retroreflective article or a two-way, near-ideal retroreflective article is enabled utilizing a material with a high index of refraction that is transparent to wavelengths from 400 to 1000 nanometers. Articles are manufactured with a typically rigid medium material and are capable of being produced in high volume and at very low cost. Articles may be very thin (less than 30 microns) and may have small lateral dimensions as low as 0.2 millimeters. Medium materials used in embodiments include, but are not limited to, zirconium, crystallized carbon, and silicon carbide.

In embodiments, a near-ideal, n-sided retroreflective polyhedron is enabled for use as an alternative to conventional glass of ceramic microspheres as the reflective articles for traffic signs and pavement markings. Constructions of a polyhedron include affixing a flat near-ideal retroreflective article to multiple sides of a polyhedral solid or manufacturing a low-refractive-index structure into one or more of the faces of the polyhedron.

Near-ideal, one-way retroreflective articles exhibit near-ideal retroreflectivity for the reflective side of the article and near-ideal transmissivity for the non-reflective side of the article. Such articles, in accordance with embodiments, will exhibit opaque invisibility at the non-reflective side of the article. In embodiments, miniature, near-ideal, one-way retroreflective articles are integrated into clothing fabrics with the non-reflective side out. Garments produced from such article-infused fabrics will render wearers opaquely invisible to sensors and living beings, thus effectively opaquely cloaking them. In embodiments, garments are produced with standard fabrics and article-infused fabrics in combinations that make the wearer of such garments appear taller or thinner to sensors and to living beings. In embodiments, near-ideal, one-way retroreflective articles constructed as glitter, when applied to human skin with the non-reflective side facing out, will render such skin opaquely transparent to sensors and living beings.

In embodiments, military vehicles are coated with opaquely invisible articles to cloak them from enemy sensors and enemy personnel. In embodiments, military personnel wear garments infused with opaquely invisible articles to reduce or eliminate detection by enemy personnel or sensors. In embodiments, the structured layer of opaquely invisible articles used in surface coatings and garments are produced with a material or materials that have low index of refraction in one state and a higher index of refraction in a second state. The structured layer, when in a low-refractive-index state enables optical cloaking capabilities. In contrast, the structured layer, when in a higher-refractive-index state enables partial of full optical viewing capabilities. In embodiments, the transmissivity of the structured layer is modifiable for a select wavelength region. Altering the transmissivity properties of the structured layer allow the cloaking properties of the opaquely-invisible article to be selectively enabled and disabled. In embodiment, cloaking activation and deactivation is achieved via means including, but not limited to, optical, electrical, inductive, electromagnetic, or magnetic means.

Electromagnetic radiation in the visible and near-infrared spectrums converts to heat when it is absorbed by objects. In various embodiments, the use of materials in the construction of near-ideal, one-way reflective articles that are transparent to solar radiation and exhibit high transmissivity to near-infrared wavelengths enables high efficiency, passive heat transfer for cooling applications. Examples of existing structures for radiative cooling that reflect most radiation in the solar spectrum (ultraviolet, visible and near-IR wavelengths) while having high transmissivity for thermally-generated emissions for mid-infrared wavelengths are disclosed in U.S. Pat. Nos. 9,709,349, 9,923,111, and 10,088,251. In various embodiments, one-way reflective element construction consistent with embodiments will exhibit more rejection of solar wavelengths than Raman because TIR is more efficient than the use of the material properties taught by Raman to block or reflect solar radiation.

Heat production via photon absorption from the sun is a phenomenon that has possibly immeasurable economic and social impacts. The reduction of heat due to lower levels of photon absorption can have economic impact on a local scale and on a planetary scale. In embodiments, near-ideal retroreflectors are added to, integrated with, or completely coated on the surfaces of photon absorbing, and thus heat-producing, surfaces. Examples of objects with heat reduction properties provided by the use of near-ideal retroreflectors in accordance with various embodiments include, but are not limited to roofing and building surfaces, such as roof shingles and roof toppings, paved or concrete surfaces such as sidewalks, roadways, and parking lots, vehicles, such as cars, truck, trains, planes, and ships, as well and shipping containers.

In other embodiments, a near-ideal, one-way retroreflective plate with the reflective side away from the sun is enabled for applications where entrapment of thermal energy by retroreflection within a structure or confinement is important. Greenhouses, solar panel collection arrays, and cold-weather buildings exhibit electromagnetic energy loss that translates to loss of heat. In embodiments, use of near-ideal retroreflectors on an underside or interior surface of such structures can reduce such energy loss from within or under a surface of a structure.

BRIEF DESCRIPTION OF THE DRAWINGS

FIG. 7E is a schematic drawing of light passing through a canted cube corner retroreflective feature.

FIGS. 8A and 8B are a top view and a side view, respectively, of a retroreflective element according to an embodiment.

FIGS. 9A-9D show various details of a pavement marking according to an embodiment.

FIG. 23 illustrates a retroreflectivity plot for a near-ideal TIR retroreflective element for use with a binder to produce a reflective pavement marking.

FIG. 33 illustrates a one-way, near-ideal TIR retroreflective element with structured air elements.

FIG. 34 illustrates a one-way, near-ideal TIR retroreflective element with a low index of refraction transmissive layer.

FIG. 35 illustrates polyhedron constructions with discrete, rigid near-ideal TIR retroreflective elements on at least one surface of the polyhedron.

FIGS. 41A and 41B illustrate highly-directional reflective elements, according to embodiments.

FIG. 44 illustrates a radiance model retroreflectivity plot for a reflective mesh produced with highly-directional reflective elements oriented along a longitudinal axis in opposite directions, according to an embodiment.

FIGS. 47A and 47B illustrate a top and side view of a reflective mesh produced with high-index-of-refraction elements in a bi-directionally-tensioned configuration.

DETAILED DESCRIPTION OF THE EMBODIMENTS

Figure 1A:
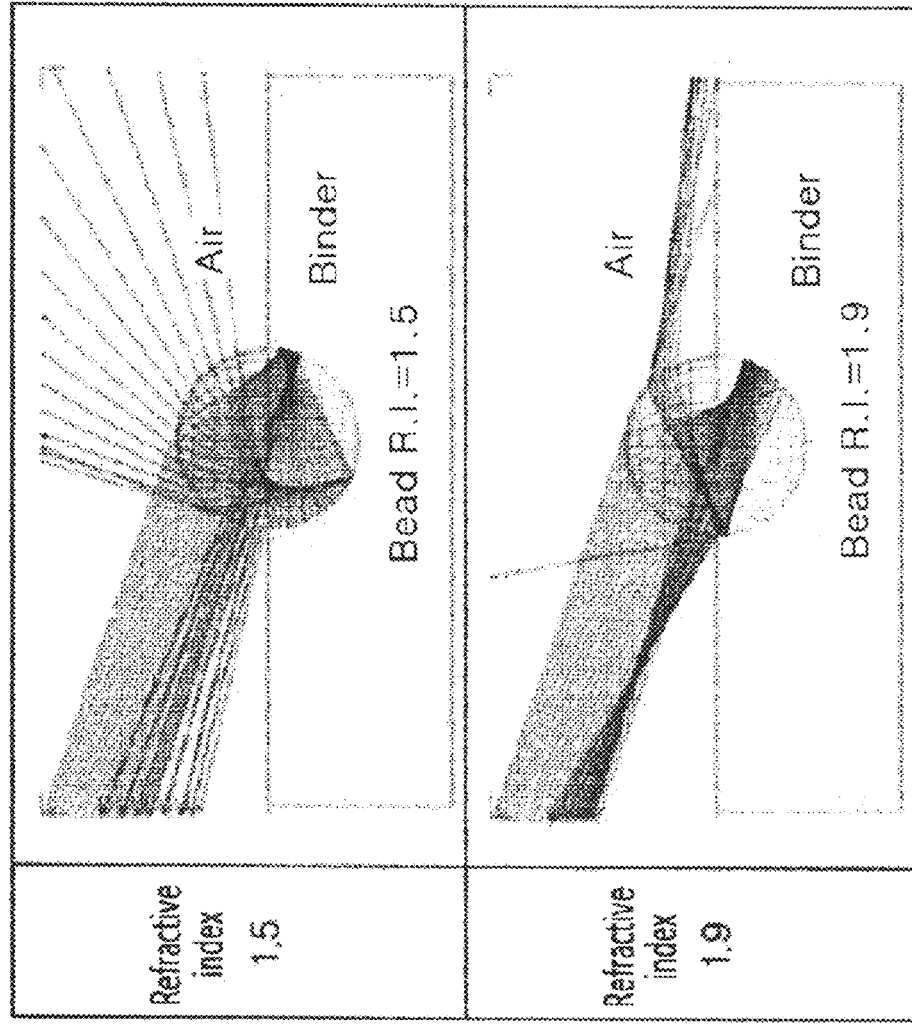
FIG. 1A illustrates prior art microsphere performance for dry conditions.

FIG. 1A illustrates a simulation of two prior art microspheres in dry conditions that are subjected to similar amounts of incident light. The microspheres are the same size and shape but have different indices of refraction. As illustrated, both microspheres retroreflect a portion of the incident light, specularly reflect a portion of the light in a direction that is not parallel to and in the opposite direction of the incident light, with the remainder of the light absorbed by the binder. FIG. 1A suggests that a higher index of refraction yields a higher degree of retroreflection for microspheres and binder.

Figure 1B:
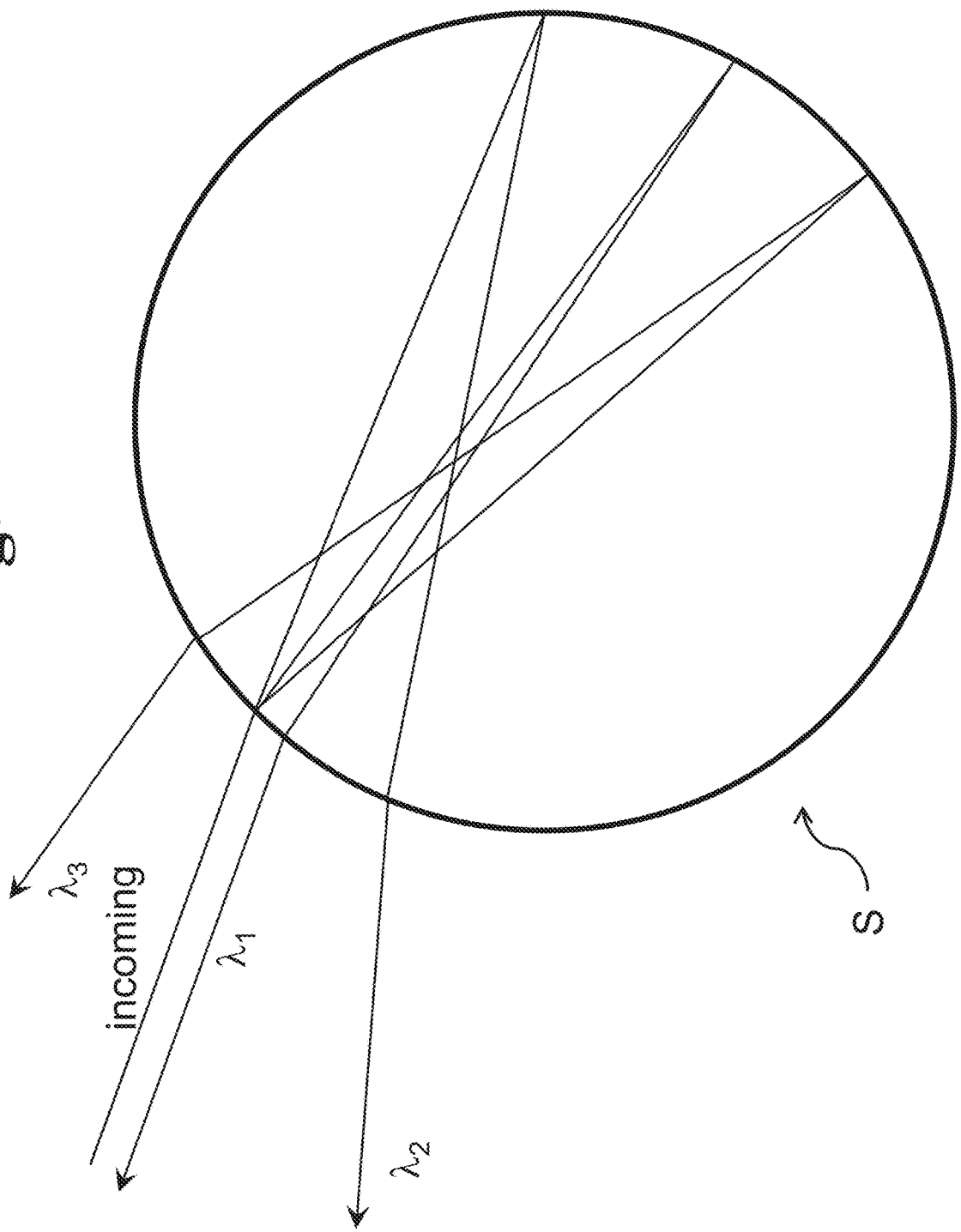
FIG. 1B is a schematic drawing of light passing through a conventional microsphere.

FIG. 1B is a cross-sectional view of a glass bead optimized for a first wavelength $\lambda_1$. As shown in FIG. 1B, incoming light is refracted at the incident surface of the glass sphere S based upon its wavelength. Light at a first wavelength $\lambda_1$ that is at or near the optimization wavelength is reflected off of the opposite side of the sphere S from where it entered and exits at roughly the same angle as the incoming light. Accordingly, $\lambda_1$ exhibits the best alignment of incident and reflected angles for returned light signal when sphere S is optimized for incoming light at the first wavelength $\lambda_1$.

On the other hand, where the wavelength is higher or lower than an optimized wavelength $\lambda_1$, refraction can occur at an angle that results in light being returned in a different direction than it was received. Two alternative wavelengths are shown, $\lambda_2$ and $\lambda_3$. Second wavelength $\lambda_2$ is higher than $\lambda_1$, whereas $\lambda_3$ is lower than $\lambda_1$. Due to the differences in wavelength, the light is refracted more sharply (for the lower wavelength light) or more shallowly (for the higher wavelength light) according to Snell's law as it is incoming into the sphere S.

This effect is multiplied by the internal reflection within the sphere S, since the initial refraction angle determines the point along the internal wall of sphere S where the light is reflected. While the angle of total internal reflection is unaffected by wavelengths from 400 to 1000 nanometers, it is entirely dependent upon the angle of the light with respect to the inside surface of the sphere (i.e., the angle between the tangent line of the circle that represents sphere S in FIG. 1B relative to the light beam). The effect is again increased in accordance with Snell's law as the light exits the sphere S.

As shown in FIG. 1B, the cumulative effect is that incoming light is reflected along an axis parallel to and in the opposite direction for light at $\lambda_1$, while other light sources at different wavelengths are reflected at angles that are not parallel to the incident light. The on-axis retroreflected signal strength is up to 20% less at 850 nm than 550 nm for conventional glass beads, for example.

Figure 2:
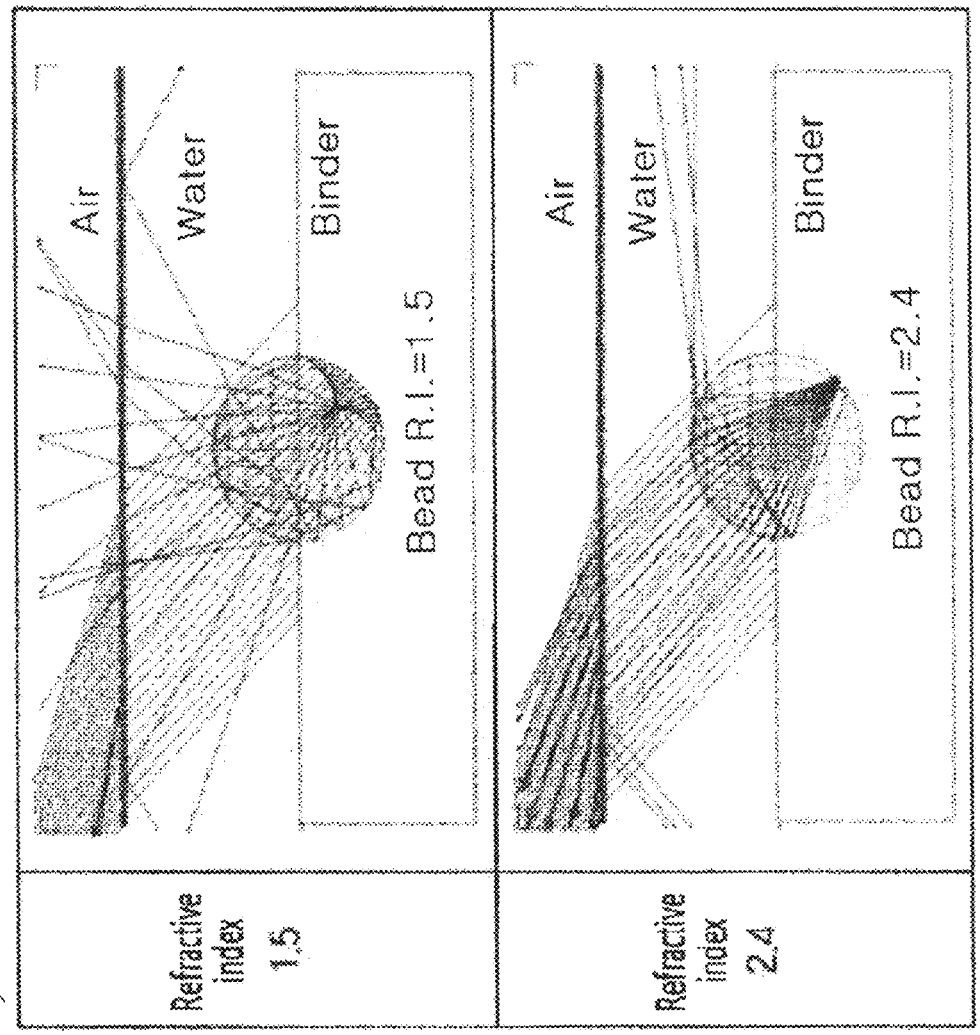
FIG. 2 illustrates prior art microsphere performance for wet conditions.

Environmental conditions can also have an effect on conventional microspheres. FIG. 2 illustrates a simulation of two prior art microspheres in wet conditions that are subjected to similar amounts of incident light. The microspheres, as in FIGS. 1A and 1B, are the same size and shape, but have different indices of refraction. The better-performing wet microsphere, however, has a dramatically higher index of refraction than the corresponding better microsphere illustrated in dry conditions. As before, both microspheres exhibit losses that make them far-from-ideal retroreflectors.

Figure 3:
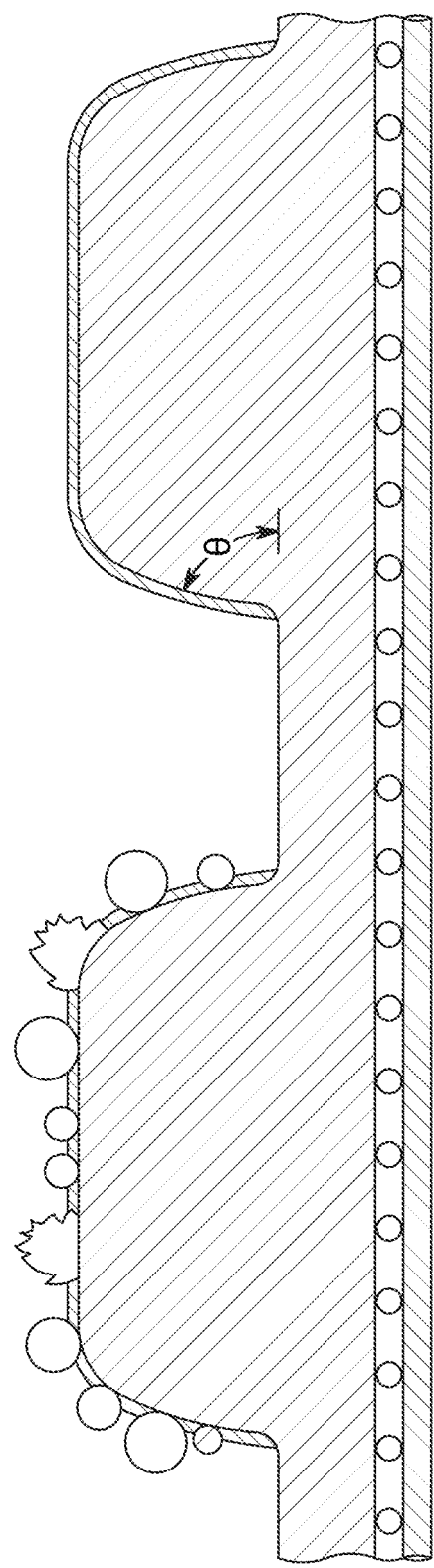
FIG. 3 illustrates prior art microsphere performance for a raised profile article.

FIG. 3 illustrates an alternate construction for prior art reflective pavement markings as described in U.S. Pat. No. 8,591,044 (Budd) utilizing reflective microspheres and a structured binder layer. By utilizing a contoured binder layer, the reflective marking attempts to increase the amount of retroreflected light by increasing the surface area of the microspheres as viewed from the source of the incident light. Such structures can increase retroreflectivity for short periods of time, but normal vehicular traffic passing over the articles will rapidly dislodge the microspheres and lower the overall reflective properties of the marking. In addition, Budd discloses microsphere construction utilizing mixtures of high index of refraction (greater than 2.3) compounds in an attempt to lower overall melting points and exhibit favorable crystallization on heat treatment.

According to Budd, beads formed with high lanthana content are known to provide high refractive index, good melting behavior, and favorable crystallization on heat treatment. However, lanthana can be expensive, and can contain impurities such as ceria that can impart undesired color to the beads. Smaller amounts of lanthana, in combination with one or more alkaline earths, can sometimes provide desirable combinations of melting behavior and other properties. Beads of the referenced disclosure, with combinations of primarily calcia and lanthana as modifiers (CLT) melt exceptionally well and provide surprisingly high refractive index values for given (AL)T base compositions. Calcia precursors are relatively inexpensive, and CLT beads crystallize to transparent nanocrystalline beads during rapid heat treatments.

In accordance with Budd, titania is a high index of refraction metal oxide with a melting point of 1840° C. and is typically used because of its optical and electrical properties, but not generally for hardness or strength. Similar to zirconia, titania is a strong nucleating agent known to cause crystallization of glass materials. Despite its high individual melting point, as a component in a mixture of certain oxides, titania can lower the liquidus temperature, while significantly raising the index of refraction of microspheres comprising such mixtures of oxides. Compositions comprising titania and optionally zirconia provide relatively low liquidus temperatures, very high index of refraction values, high crystallinity when heat-treated appropriately, useful mechanical properties, and high transparency.

According to Budd, the microspheres described therein can be prepared from a melt process. Microspheres prepared from a melt process are described therein as "fused." For ease in manufacturing, it is preferred that the microsphere composition exhibits a relatively low liquidus temperature, such as less than about 1700° C., and preferably less than about 1600° C. Typically, the liquidus temperature is less than about 1500° C. Generally, formulations including those at or near a eutectic composition(s) (e.g., binary or ternary eutectic compositions) will have lowest melting points in the system and, therefore, will be particularly useful.

Figure 4:
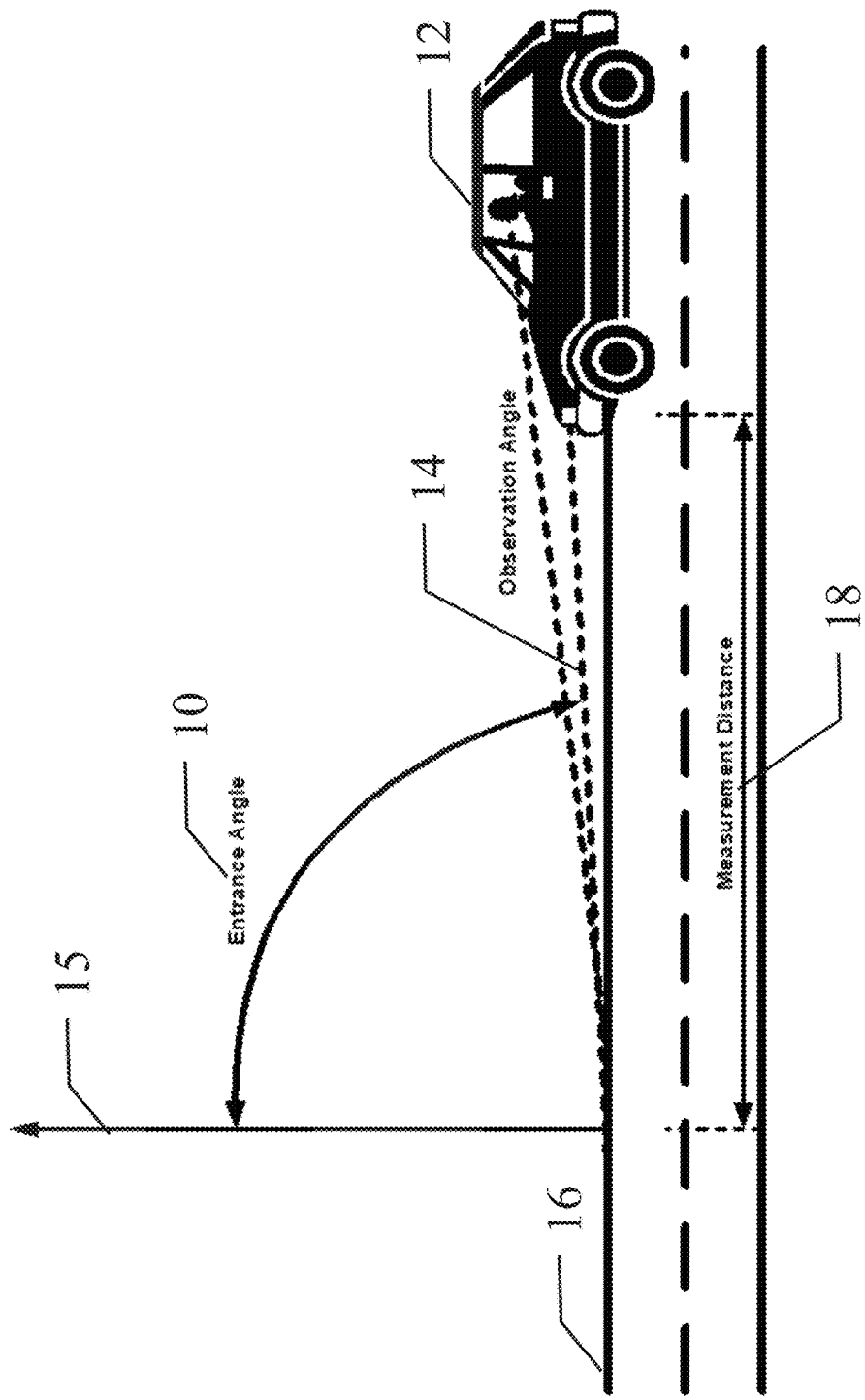
FIG. 4 illustrates entrance angle definitions for reflective pavement markings.

FIG. 4 shows a description of the geometry for a pavement marking 16. A sensor is shown in a vehicle 12 for which the headlamps function as the sensor illuminator. The entrance angle 10 is defined as the angle formed by the vector 14 from the illuminator (the headlamps) to a point on the pavement marking 16 and the normal vector 15 to the same point on the pavement marking 16. In the U.S., pavement markers 16 are typically evaluated utilizing 30-meter geometry, consisting of a measurement distance of 30 meters (shown at 18) and an entrance angle of 88.76 degrees (shown at 12).

Figure 5:
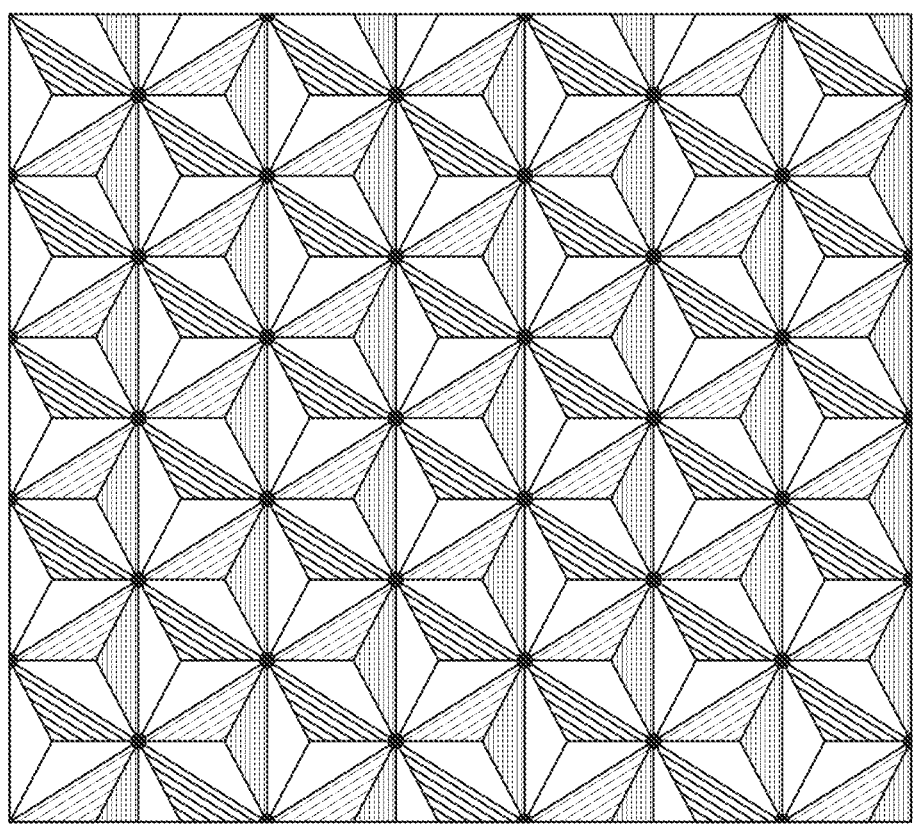
FIG. 5 illustrates prior art cube corner geometry for reflective sign sheeting.
Figure 6:
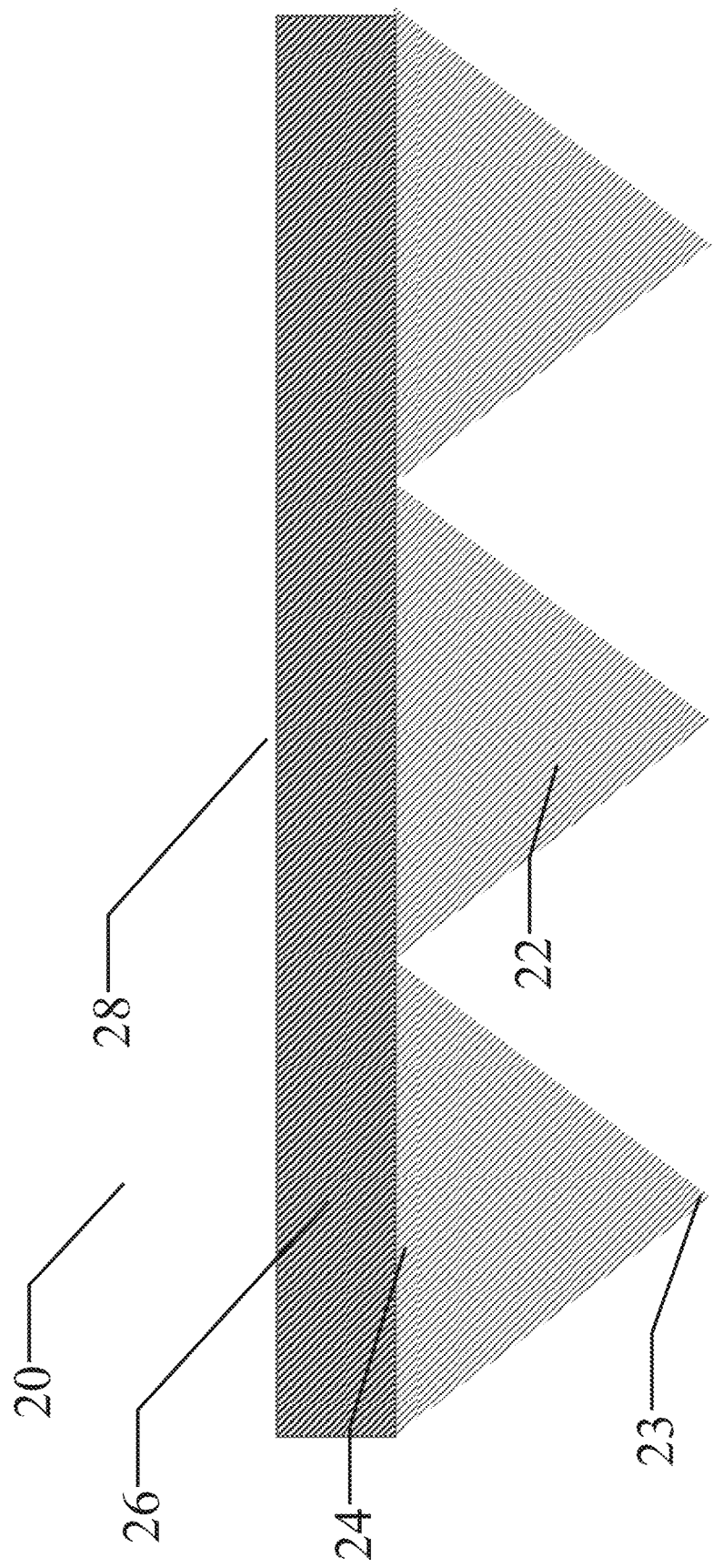
FIG. 6 illustrates prior art cross-sectional view of geometry for reflective sign sheeting.

FIGS. 5 and 6 illustrate a portion of a typical replicated cube corner retroreflective sheet known in the prior art. Referring to both FIGS. 5 and 6, reference 22 generally designates one of the minute cube corner elements of formed prism features disposed in an array on one side of sheeting 20. Each retroreflective element 22 has the shape of a trihedral prism with three exposed planar faces, substantially perpendicular to one another, and an apex axis defined by a line intersecting the apex of the trihedral prism that is equidistant to each of the planar faces. The angle between the faces of the trihedral prism is the same for each cube corner element in the array and will be about 90 degrees.

As is illustrated in FIG. 6, cube corner elements 22 in sheet 20 can be all of the same dimensions and aligned in an array or pattern of rows and columns, the bases being in the same plane, and adjacent elements being contiguous at the edges of their bases such that there are no margins or flats between adjacent elements or spaced apart as desired. Body portion 26 is typically integral with cube corner optical elements 22, constituting what is referred to as a land that defines a front surface 28 into which electromagnetic radiation enters. The dimensions of the land portion of the sheeting relative to the individual cube corner optical elements will vary depending on the material of the medium of the sheeting, the method chosen for manufacture and, ultimately, the end purpose of the sheeting.

It is helpful to note that the trihedral prism elements 22 in cross-sectional FIG. 6 are shown as effectively being upside-down from a conventional pyramid in that the apex 23 is below the base 24 which is operably connected to the body portion 26. The triangular structure of the trihedral prism element 22 that provides the TIR phenomenon is the inverted shaded shape shown in this cross-section as the figure portion of a figure-ground representation, and not the corresponding unshaded upright triangular shape that is effectively the ground portion in this representation. It should be noted that for open-faced cube-corner constructions in some of the prior art, the trihedral prism elements are inverted as compared to conventional cube-corner feature orientation as these open-faced cube-corner constructions are oriented in a tip-side up configuration.

Cube corner elements of the prior art that are not of an open-faced construction produce retroreflection due to total internal reflection (TIR). Faces of cube corner elements will produce TIR when rays, beams, or electromagnetic waves strike the internal boundaries of the medium forming the retroreflective elements at an angle of incidence greater than the critical angle. The critical angle is measured from the normal vector to each boundary. For retroreflective articles and materials, it is common to refer to the angle of the incoming rays, beams or electromagnetic waves that strike the front surface of the material or article as being the entrance angle, whereas the angles of the ray, beam or wave as it propagates internally within the medium and encounters one or more additional boundaries, such as the face of a cube corner, are referred to as the incidence angles or angles of incidence.

For purposes of describing the various embodiments, the following terminology and references may be used with respect to reflective articles or materials in accordance with one or more embodiments as described.

"Surface" or "face" means a generally planar boundary of an article or material with another material or environment, where the two materials forming the boundary have both a different composition and a different index of refraction. A surface or face that is generally planar may have varying surface roughness up to some maximum roughness above which the peak/valley characteristics of the surface must be analyzed for retroreflective purposes as a set of individual sub-surfaces. In some embodiments, a surface or face refers to a generally planar aspect of a feature of a retroreflective element of an article or material, such as a cube corner element, chip element or trihedral element. The surface or face feature may be either an internal or external portion of the retroreflective element and the external portion may directly interface with air or vacuum at least partially surrounding the article or material. In other embodiments, a surface may interface with another object, such as a lens or coating or even a layer of water or moisture. A surface may be comprised of one or more facets, and may be either rigid or flexible in form, smooth or rough in texture, and homogenous or heterogeneous in composition.

"Top surface," "front surface," or "incident surface" mean a surface of an article or material exposed to electromagnetic waves, beams, or rays that strike the article or material and may be reflected or refracted by the article or material.

"Back surface" means a surface of an article or material generally opposite from a front surface.

"Layer" means a region of an article, material, element, or chip having thickness relative to a front surface of the article, material, element, or chip. In some embodiments, a layer may be a region of a medium of generally uniform thickness presenting an area that is substantially parallel in orientation to an orientation of the front surface of the article, material, element, or chip, and in some embodiments a layer may have varying thickness and present an area that is not of generally uniform thickness or substantially parallel in orientation to an orientation of the front surface of the article, material, element, or chip. In some embodiments, a layer may be coextensive with an area of the front surface of the article, material, element, or chip, and in other embodiments, a layer may not be coextensive with an area of the front surface. In some embodiments, a layer may be generally rigid and planar, and in other embodiments, a layer may be generally flexible. In some embodiments, a layer may be a medium that is homogenous in composition or construction, and in other embodiments, a layer may be of a medium that is non-homogenous and non-uniform in composition or construction. For example, in most situations involving a relatively thin layer of water on the external surface or face of a retroreflective element having a tilted surface normal angle, the water can be treated as a film for optical purposes and the external surface angle of that film will generally correspond to the tilted surface normal angle. However, in situations where there is enough water on the external surface or face of a retroreflective element to create standing droplets or otherwise pool into depressions in a region of the overall surface structure of the article or material, then the water surface may not correspond to the tilted surface normal angle for those regions.

"Normal" describes a direction that intersects a surface or boundary at right angles.

"Entrance angle" is defined as the angle of a ray, beam, or wave of incident electromagnetic radiation relative to a normal angle for a sign, pavement marking or other reflective product.

"Boundary" is a change of medium defined by a face, facet, surface, and/or material having a different index of refraction.

"Incidence angle" or "angle of incidence" is defined as the angle relative to normal of a ray, beam, or wave of electromagnetic radiation as it strikes a boundary within an article or material.

"Critical angle" is measured from a normal angle to a surface and is defined as the minimum incident angle at which TIR occurs at a surface. A critical angle is defined in the medium exhibiting the higher index of refraction.

"Cube corner element" describes a TIR retroreflective element, such as a trihedral pyramid, having multiple faces of the pyramid oriented at 90 degrees with respect to each other.

"Apex" means the tip of a cube corner pyramid as defined by the intersection of the edges of the faces of the pyramid other than the edges of the base of the pyramid.

"Apex axis" means a line intersecting the apex of a cube corner pyramid that is equidistant from each face of the pyramid.

"Rigid" means substantially rigid under normal conditions such that the planar nature of the retroreflective element or near-ideal TIR retroreflective element is maintained.

"Longitudinal Pavement Marking" means a reflective element adhered, affixed to, or embedded into a top layer of a road surface used to identify the horizontal boundary, relative to a direction of travel, for an allowable lane of travel for a vehicle. Longitudinal refers to an orientation that is operably parallel to a direction of travel for a lane.

"Anisotropic" or "Anisotropy" refers to characteristics that are variant depending upon direction.

"Anisotropic Retroreflectors" or "Anisotropic Retroreflectivity" refers to an article or material that has retroreflective properties (caused by TIR) in at least one direction that is significantly stronger (with respect to the amount of light returned along a primary axis of that direction) and significantly weaker along a direction perpendicular or otherwise non-parallel to that primary axis. This behavior is also referred to herein as "highly directional performance."

"Mesh" refers to an arrangement of reflector elements in a patterned, grid or interlaced manner to provide a spaced relationship among those reflector elements. The mesh arrangement may be created by a material, construct, carrier, net, web, or binder, or by a roller or other delivery mechanism that defines, maintains or supports the pattern of spaced relationship among the reflector elements.

"Fresnel Equations" refer to mathematical constructs that define the reflection and transmission coefficients for parallel and polarized light at various entrance angles. Fresnal Equations illustrate that as an entrance angle approaches 90 degrees, the transmission coefficient for parallel and polarized light decreases exponentially.

"Transparent" means a degree of clarity of a material as measured by the ability to transmit image-forming light through the material. The measure of light transmission expressed in terms of transparency or transmissivity is a ratio of the light intensity measured with a sample of the material present in the light beam versus with the sample of the material not present in the light beam. For various embodiments, a material is considered to be transparent if the transmissivity is at least 95% for light at 550 nm as measured according to ASTM International standard ASTM D1746-17. Standard Test Method for Transparency of Plastic Sheeting, ASTM International, West Conshohocken, P A, 2019, www.astm.org. For other embodiments with more transparency, a material is considered to be transparent if the transmissivity is at least 97% for light at 550 nm as measured according to ASTM D1746. For even more transparency for other embodiments, a material is considered to be transparent if the transmissivity is at least 98% for light at 550 nm as measured according to ASTM D1746. Like retroreflectivity, standards for measuring transparent materials are measured in the visible spectrum. Given that the ultrawide angle performance in embodiments includes light spectrums beyond the visible spectrum that includes near-infrared wavelengths of light, the measure of transparency or transmissivity for visible light frequencies and for frequencies beyond those of the visible spectrum would be made consistent with the standards for measuring transparency. For the present disclosure a material is consider transmissive of a sheet-type material in the wavelengths beyond 700 nm if the transmissivity as measured consistent with ASTM D1746 for light at 850 nm is at least set forth in the at least 90% of the transmissivity as measured for light at 550 nm, and the transmissivity as measured consistent with ASTM D1746 for light at 1000 nm is at least set forth in the at least 85% of the transmissivity as measured for light at 550 nm. For embodiments with transmissivity over a range of 400-1800 nm, for example, the material is considered transmissive beyond 1000 nm if the transmissivity as measured consistent with ASTM D1746 for light at 1300 nm is at least set forth in the at least 75% of the transmissivity as measured for light at 550 nm, and the transmissivity as measured consistent with ASTM D1746 for light at 1600 nm is at least set forth in the at least 65% of the transmissivity as measured for light at 550 nm.

TIR retroreflectivity for an article with a flat front surface and a cube corner back surface will be defined by the indexes of refraction of the medium that contains the article (typically air), the index of refraction of the material used to produce the article, and the index of refraction of the material behind the cube corner elements. The critical angle at the cube corner surface is referenced from the cube corner normal vector and is defined by Snell's law:

$$\eta_1 * \sin\theta_1 = \eta_2 * \sin\theta_2 \quad \text{Eq. 1}$$

where $\eta_1$ is the index of refraction of medium 1
$\theta_1$ is the angle of the wave in medium 1
$\eta_2$ is the index of refraction of medium 2
$\theta_2$ is the angle of the wave in medium 2

Figure 7A:
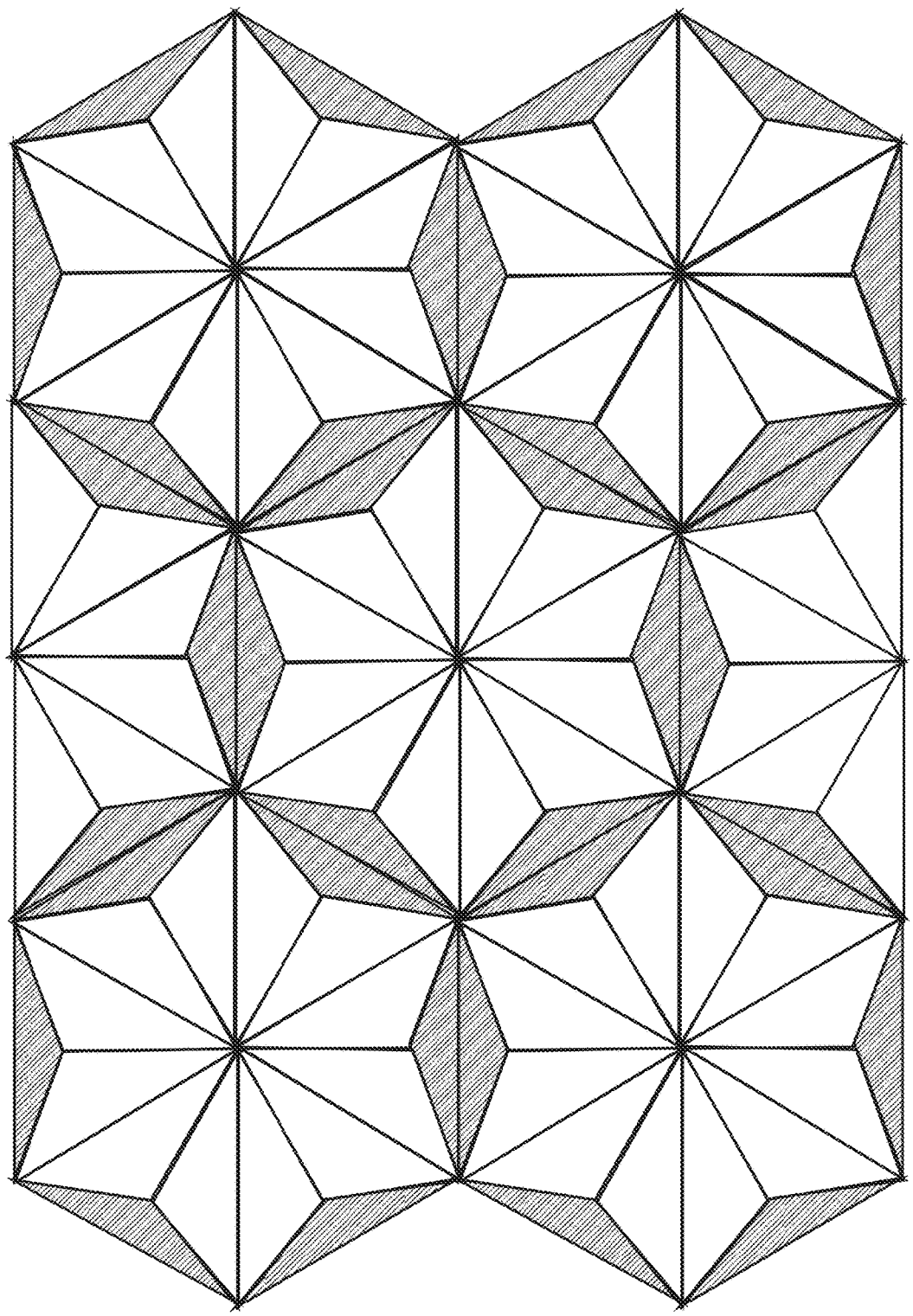
FIG. 7A illustrates a plan view for tilted apex axis cube corner retroreflective features for an embodiment of the near-ideal TIR retroreflective element.
Figure 7D:
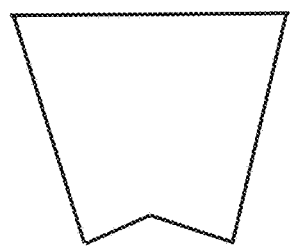
FIG. 7D illustrates a second cross-sectional view of a single tilted apex axis cube corner retroreflective feature for FIG. 7B.
Figure 7B:
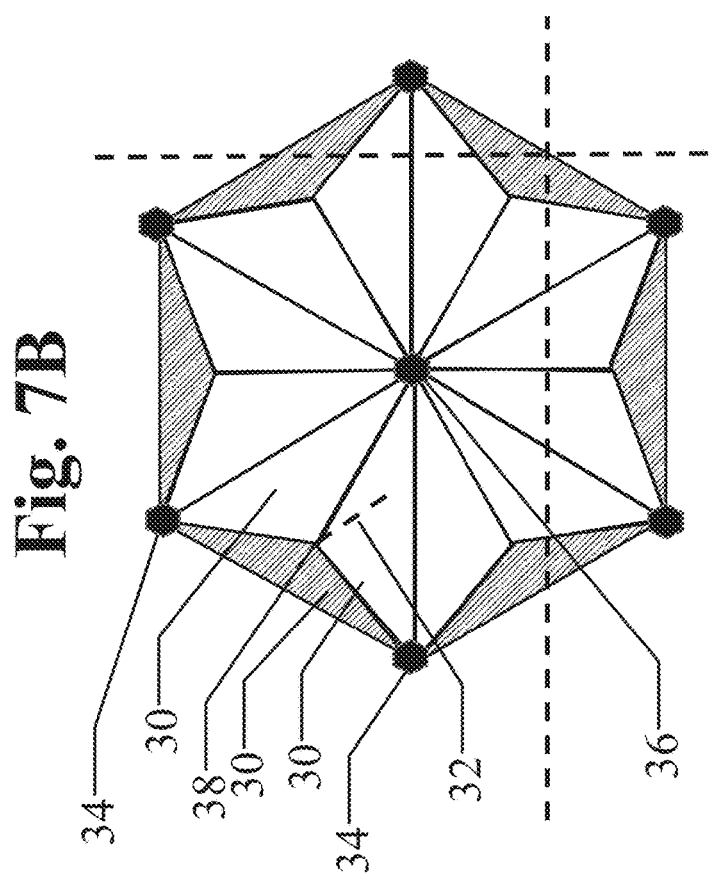
FIG. 7B illustrates a more detailed plan view of a single tilted apex axis cube corner retroreflective feature of the retroreflective element for FIG. 7A.
Figure 7C:
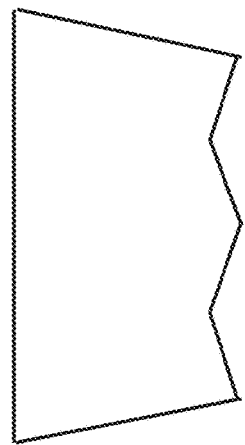
FIG. 7C illustrates a first cross-sectional view of a single tilted apex axis cube corner retroreflective feature for FIG. 7B.

FIG. 7A shows geometry of a cube corner architecture of embodiments of a single TIR retroreflective element wherein the apex axis of the faces of the trihedral prisms used as the retroreflective element are tilted relative to a normal of a front surface of the article or material. As shown, for example, in FIG. 7B, each repeating structure of a cube corner feature in this embodiment consists of 18 surfaces organized as six groups of three cube corner surfaces 30, with each of the surfaces 30 of the cube corner groups aligned generally 90 degrees from each other. The apex axis angle 32 relative to a vector directly opposite the normal vector is determined by the high points 34 of the cube corner structure and the low point 36 of the cube corner structure. The cube corner geometry of the high points 34, low point 36, and the refractive indexes of the interfacing materials will determine the TIR incident angles at the surface of retroreflective articles in accordance with these embodiments. The apex axis angle 32 as indicated along an apex 38 axis that is tilted relative to a vector directly opposite a normal vector entering the front surface indicates the relative tilt for the set of surfaces intersecting at that apex 38 of the trihedral cube corner for the base retroreflective layer. Cross-sectional representations of different aspects of the cube corner structure are shown in FIG. 7C and FIG. 7D. FIG. 7C shows what can be characterized as a double bottom W shape indicating the angles of the surfaces at the cross-sectional line taken at the bottom of FIG. 7B. FIG. 7D shows what can be characterized as a single bottom W shape (shown rotated 90 degrees) and indicating the angles of the surfaces at the cross-sectional line taken at the right side of FIG. 7B.

FIGS. 7A through 7D illustrate a minimal construct of embodiments of a near-ideal TIR retroreflective element that utilize eighteen surfaces consisting of six separate but connected three-surfaced cube corner features with a common apex axis angle for each feature. Those skilled in the art can envision minimal constructs that implement a different number of cube corner features that vary from one to thirty-six, with the number of surfaces varying from three to seventy-two. The use of constructs different from those that conform to the three-surfaced cube corner, six cube-corner construct are envisioned to be within the scope of various embodiments of a near-ideal TIR retroreflective element. For certain embodiments, the three-surfaced cube corner feature arranged in a six feature construct with each feature having a similar apex axis angle and produced with a material that has a high index of refraction (2.1 or higher) with air or a low index of refraction backing material shall be referred to as a "near-ideal TIR retroreflective element." The width of the upper surface of a single near-ideal TIR retroreflective element can be as large as 20 mm and as small as 0.2 mm. Rigid constructions of the retroreflective element consisting of one or more 18-face near-ideal TIR retroreflective elements are taught for various embodiments.

FIG. 7E depicts the paths of three incoming light beams, similar to those previously described with respect to FIG. 1B. Like FIG. 1B, three wavelengths $\lambda_1$, $\lambda_2$, and $\lambda_3$ are used, which range from highest to lowest wavelength (i.e., lowest to highest frequency). Unlike FIG. 1B, however, the geometry of the reflector itself results in all of the incoming light being returned in the same direction, even though the exit point of the returned light is displaced by some amount (which is typically negligible with respect to pavement markings and self-driving vehicle applications).

In various embodiments, the retroreflective elements such as those shown in FIGS. 7A-7E may be very thin (less than 30 microns), may have small lateral dimensions of the flat upper/incident surface in the range of 0.2 to 20 millimeters. In some embodiments, a single near-ideal TIR retroreflective element may have an aspect ratio of diameter to depth of 4:1 or greater. In some embodiments, the near-ideal TIR retroreflective elements may be comprised of one or more trihedral geometric shape features each defining a corresponding near-ideal TIR retroreflective element on a single discrete retroreflective element. In embodiments, an average diameter of the discrete retroreflective element is less than 1 cm, and in some embodiments less than 0.1 cm. Medium materials used in embodiments for the discrete retroreflective elements include, but are not limited to, zirconium, crystallized carbon, and silicon carbide.

FIGS. 8A and 8B are a top view and a side view, respectively, of a retroreflective element according to an embodiment. As shown in FIGS. 8A and 8B, top surfaces 37 are raised in the central portion of the top surface of the retroreflective element, and lower at the outer edges thereof to create an angle of incline of each top surface that can be between about 2 degrees and about 8 degrees, in embodiments. This angle of incline of each top surface is measured relative to the normal angle of the retroreflective element and is generally referred to as the "tilted surface normal angle." In other embodiments, the tilted surface normal angle may cover a range of angles corresponding to an expected angle of incidence of incoming light and based upon the refractive indices of the retroreflective element itself and any surrounding binder material. The tilted surface normal angle indicated by the arrows in FIG. 8B can be selected to further improve retroreflectivity, according to the same principles described above with respect to FIGS. 7A-7E. Tilted surface normal angles of between about 2 degrees and 8 degrees for pavement marking applications substantially increase the transmission coefficient as defined by the Fresnel Equations.

FIGS. 9A-9D depict the same retroreflective element of FIGS. 8A and 8B, shown in top view in FIG. 9C and inside view in FIG. 9D. As shown in FIG. 9B, the raised-center retroreflective element is incorporated in a grid pattern. As shown in FIG. 9A, this grid pattern has contours that form a road marking 39. The particular road marking in FIG. 9A is of a variety that must be viewed from the perspective of vehicles at various angles. That is, unlike a highway lane divider, vehicles can be expected to traverse a roadway in multiple directions, rather than following a predefined and relatively straight path. The retroreflective element with raised faces 37 each having a tilted surface normal angle has maximal retroreflectivity at any of the six directions corresponding to the six faces in this embodiment. Given that the direction of each face covers a range of viewing angles up to 60 degrees, the overall range of viewing angles of the retroreflective element is effectively visible from any direction.

Figure 10:
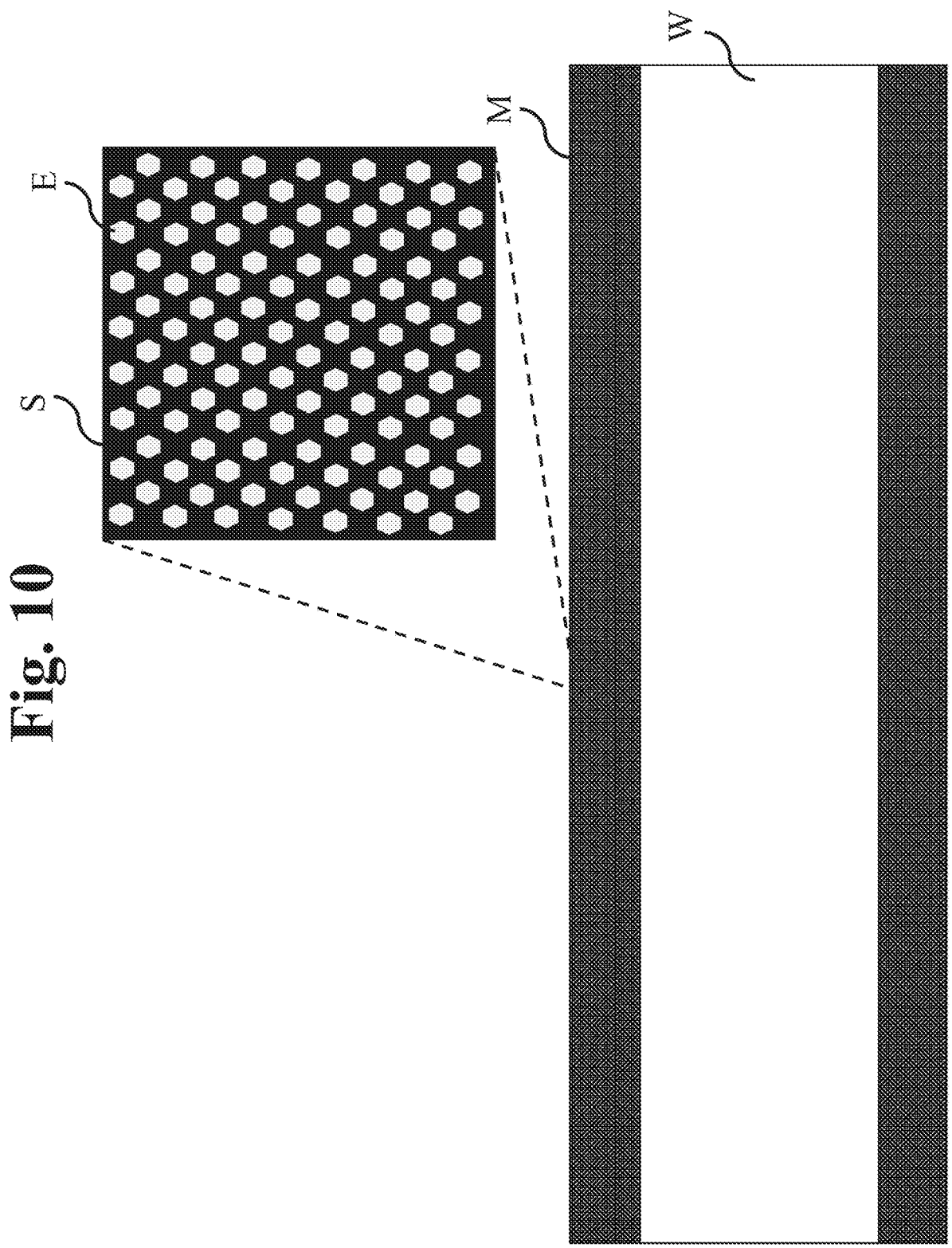
FIG. 10 shows retroreflective chips arranged in a contrast marking, according to an embodiment.

FIG. 10 depicts retroreflective elements E in a grid, embedded in the black contrast element substrate S to form a contrast marking M. One method to increase contrast is to embed reflective chips E to a black component S as well as a white component W of a contrast marking. This will have the effect of lowering the specular reflectance component of the signal that reaches a vehicle or other observer when in the presence of oblique light sources, thus increasing contrast between the road surface and the contrast marking. It has the additional benefit of increasing retroreflectivity of the black surface and the white surface when used with an active sensor or with headlamps, achieving better contrast with the roadway surface.

Figure 11C:
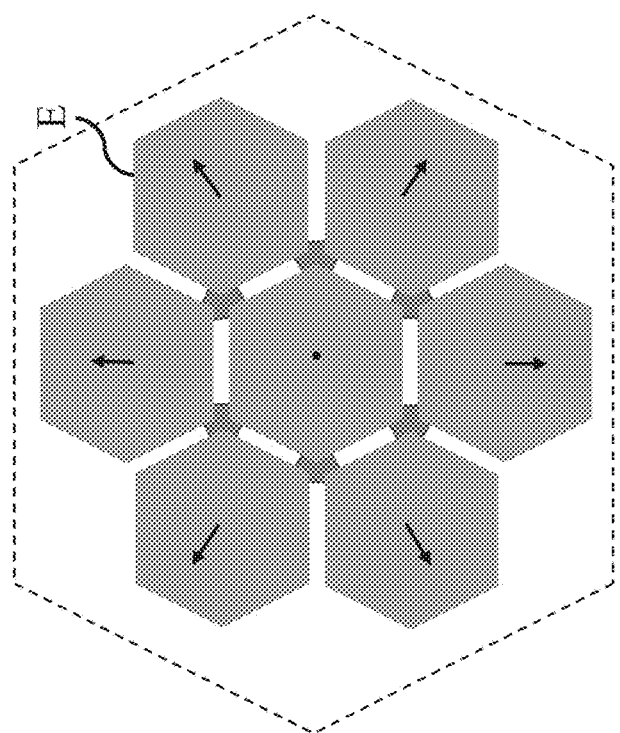
FIGS. 11A-11D show a pavement marking according to an embodiment.
Figure 11D:
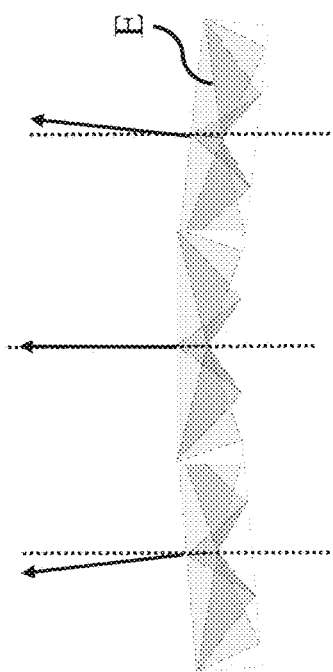
Figure 11A:
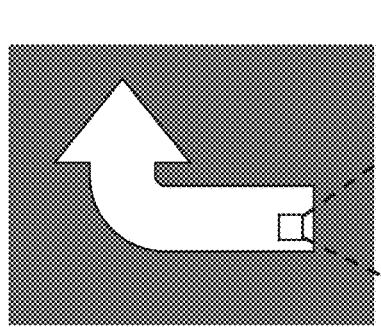
Figure 11B:
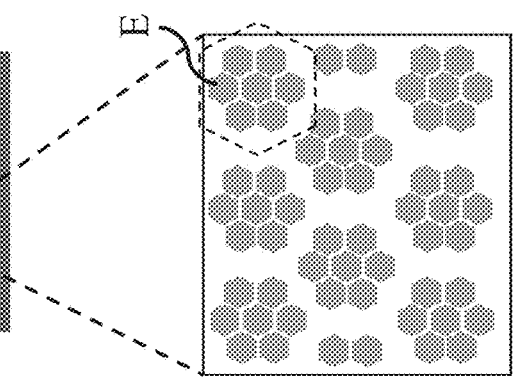

FIGS. 11A-11D depict a pavement marking similar to the one previously described with respect to FIGS. 9A-9D. In contrast to the previously-described pavement marking, however FIGS. 11A-11D achieve increased retroreflectivity in all directions by using a "flower pattern" of retroreflective elements. As shown in the plan view of FIG. 11B, retroreflective elements E (which can be elements with flat top surfaces as shown in FIGS. 7A-7E, or alternatively can be elements with raised faces 37 as shown in FIGS. 9A-9D) are arranged in clusters of seven. Within each cluster of seven elements (e.g., the cluster shown in FIG. 11C), the elements E are arranged so that the "petals" of the flower arrangement are tilted outwards at a tilted surface normal angle of between about 2 degrees and about 8 degrees, as shown in FIG. 11D.

Figure 12:
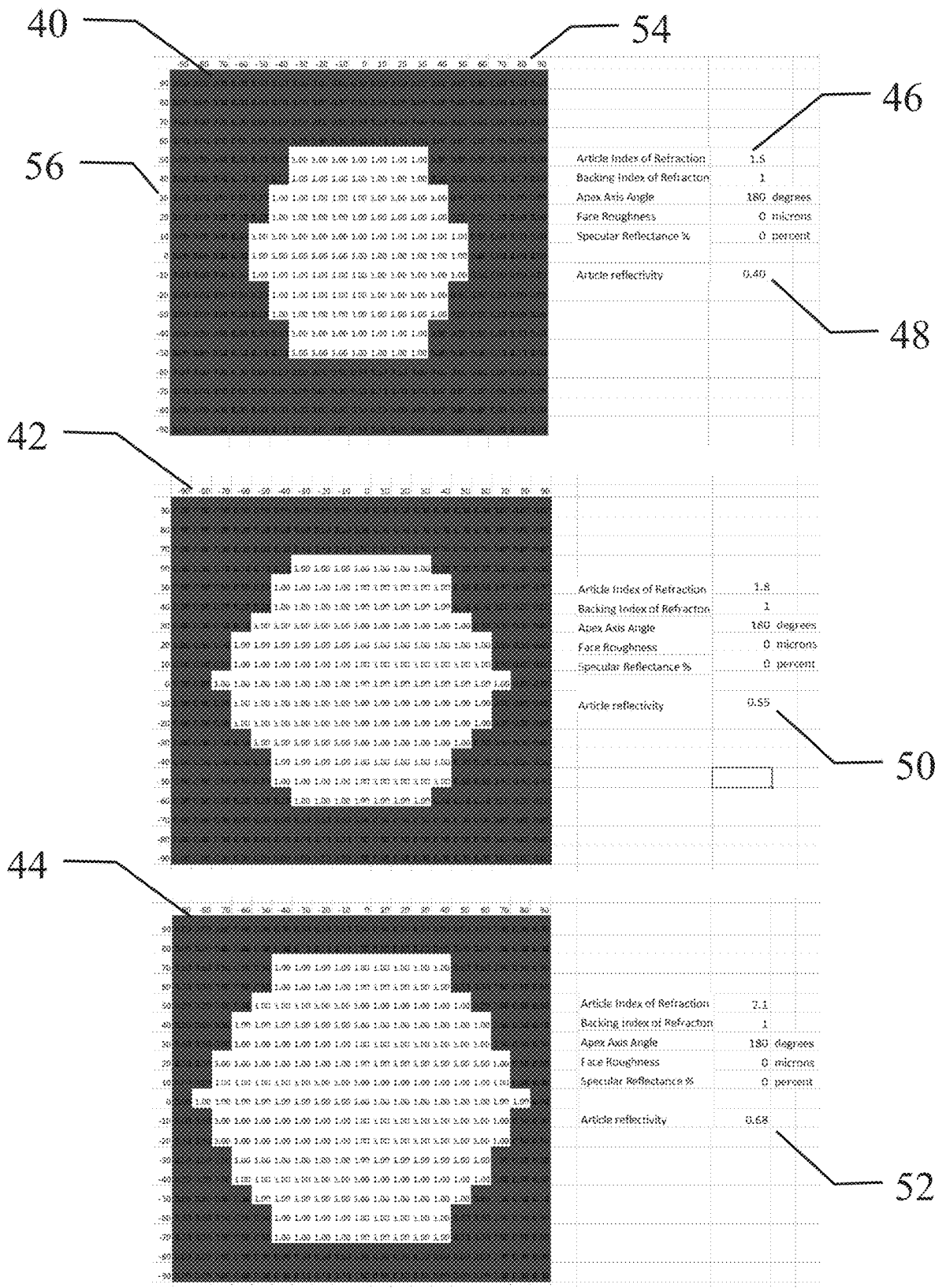
FIG. 12 illustrates a retroreflectivity plot for a near-ideal TIR retroreflective element that shows the effect of changes in the index of refraction.

FIG. 12 illustrates the reflective performance of a cube corner element in accordance with various embodiments. The numbers in the reflectivity plot 40 denote the retroreflectivity of a single near-ideal TIR retroreflective element and will range from 0.00 for no retroreflectivity to 1.00 for total retroreflectivity with no losses. The cells in the reflectivity plot 40 refer to intensities at various possible entrance angles for an article with a flat upper/incident surface. Entrance angles are determined according to a horizontal entrance angle axis 54 and a vertical entrance angle axis 56. A parameter table 46 denotes the construction of the TIR retroreflective element. Based on the parameters in the table 46, the reflectivity 48 is determined for the chosen geometry and material.

A reflectivity plot 40 is based on five selectable parameters. Article index of refraction refers to the refractive index of the material from which the element is produced. Backing index of refraction refers to the refractive index of the material that abuts, interfaces to, or is adhered to the cube corner element of the retroreflective element. Apex axis angle refers to the angle at which the faces of each three-face cube corner construction are equiangular. An apex axis angle of 180 degrees refers to prior art cube corner constructions whereby the apex axis angle is equal to and in the opposite direction of the normal vector at the upper surface of the retroreflective element. Face roughness refers to the average deviation of the ideal flat surface face from the actual surface face. Cube corner faces that exhibit TIR will reflect 100% of the incident signal. For incident signals at a cube corner face that encounter the surface at an angle that is less than the critical angle, some or all of the signal will cross the boundary and will be subjected to specular reflectivity at the surface boundary. The amount of specular reflectance will be less than 100% and will be determined by the specular reflectance properties of the backing material.

Element reflectivity for an eighteen surface, six-cube-corner construct is the total of all reflectivity at each and every surface of the cube corner element and is defined by Eq. 2 below:

$$\int_{\rho=-90}^{\rho=+90} \int_{\varphi=-90}^{\varphi=+90} \sum_{a=1}^{a=6} \prod_{b=1}^{b=3} pab(\rho, \varphi) * Rab(\rho, \varphi)$$

Where ρ=horizontal angle of incidence at the element surface

φ=vertical angle of incidence at the element surface a=variable representing the six groups of cube corner elements b=variable representing the three surfaces of a cube corner construct $p_{ab}$ is the probability that a refracted incident wave first strikes a surface $R_{ab}$ is the reflectivity of the wave at the face boundary, with $R_{ab}$=1 for TIR, and $R_{ab}$=percent reflectance for non-TIR Reflectivity plots in FIG. 12 illustrate the performance characteristics for a six-element, eighteen-surface cube corner construction for low (<=1.5), medium (1.5-2.1) and high (>=2.1) indices of refraction of the material from which the cube corner is constructed. All reflectivity plots in FIG. 12 are produced with non-canted cube corner elements (apex axis angle equal to 180 degrees), with an air interface (index of refraction=1.0) at the faces of the cube corner elements, smooth surfaces at each cube corner face (face roughness=0 microns), and a specular reflectance of 0% for non-TIR signals due to the air interface. Reflectivity plot data and Eq. 2 yield an element reflectivity 48 of 0.40 for an index of refraction of 1.5, an element reflectivity 50 of 0.55 for an index of refraction of 1.8, and an element reflectivity 52 of 0.68 for an index of refraction of 1.5.

Figure 13:
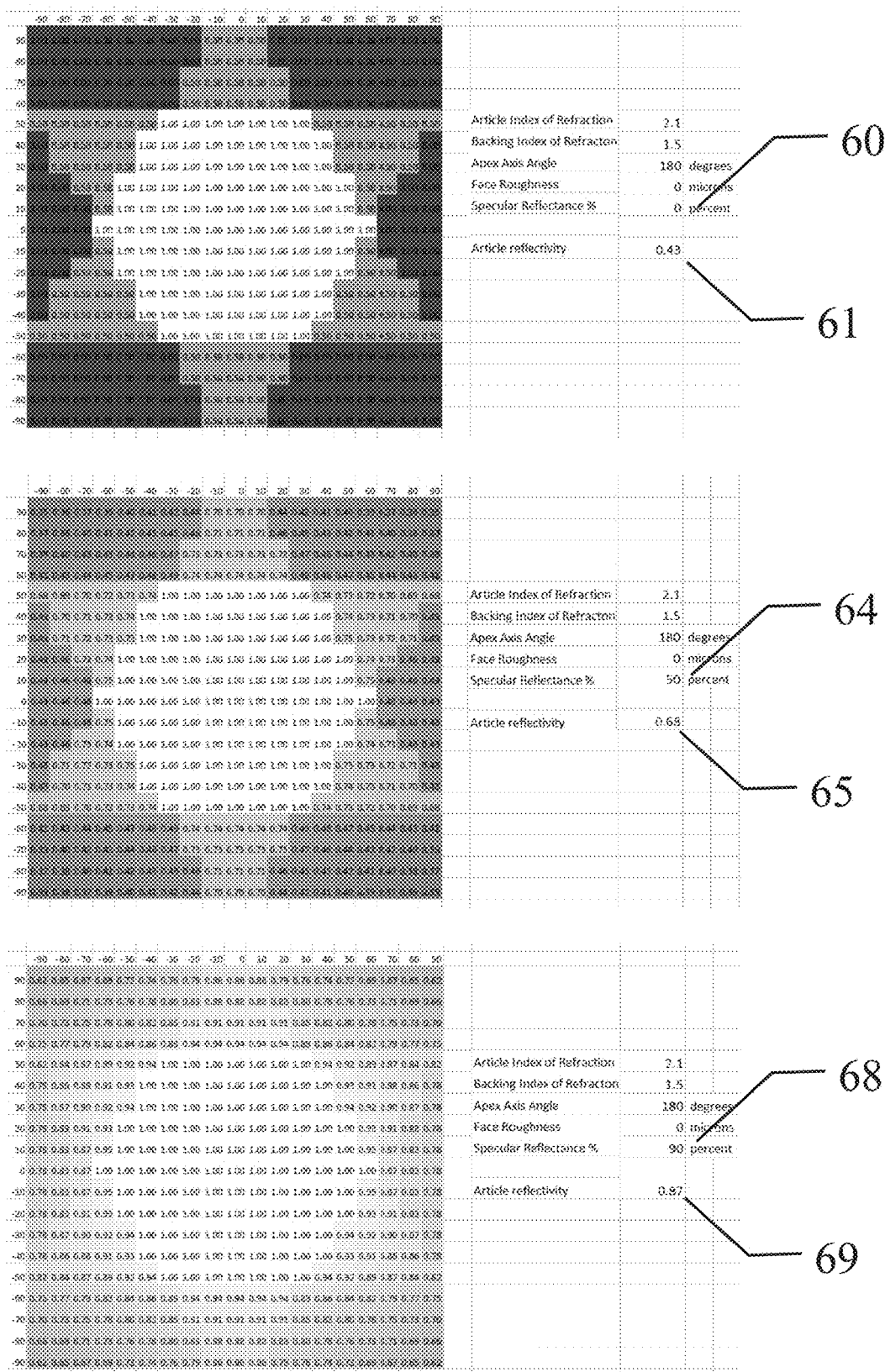
FIG. 13 illustrates a retroreflectivity plot for a near-ideal TIR retroreflective element that shows the effect of changes in the specular reflectance percentage.

Reflectivity plots in FIG. 13 illustrate the performance characteristics for a six-element, eighteen-surface cube corner construction for low, medium, and high levels of specular reflectance at the cube corner surface boundaries. Specular reflectance will occur at the cube corner surfaces whereby the angle of the incident waveform to the surface encounters the surface at an angle that is less than the critical angle for the surface. A backing index of refraction of 1.5 is used for three embodiments illustrated in FIG. 13. A specular reflectance percentage 60 of 0% results in an element reflectivity 61 of 0.43, a specular reflectance percentage 64 of 50% results in an element reflectivity 65 of 0.68, and a specular reflectance percentage 68 of 90% results in an element reflectivity 69 of 0.87.

Figure 14:
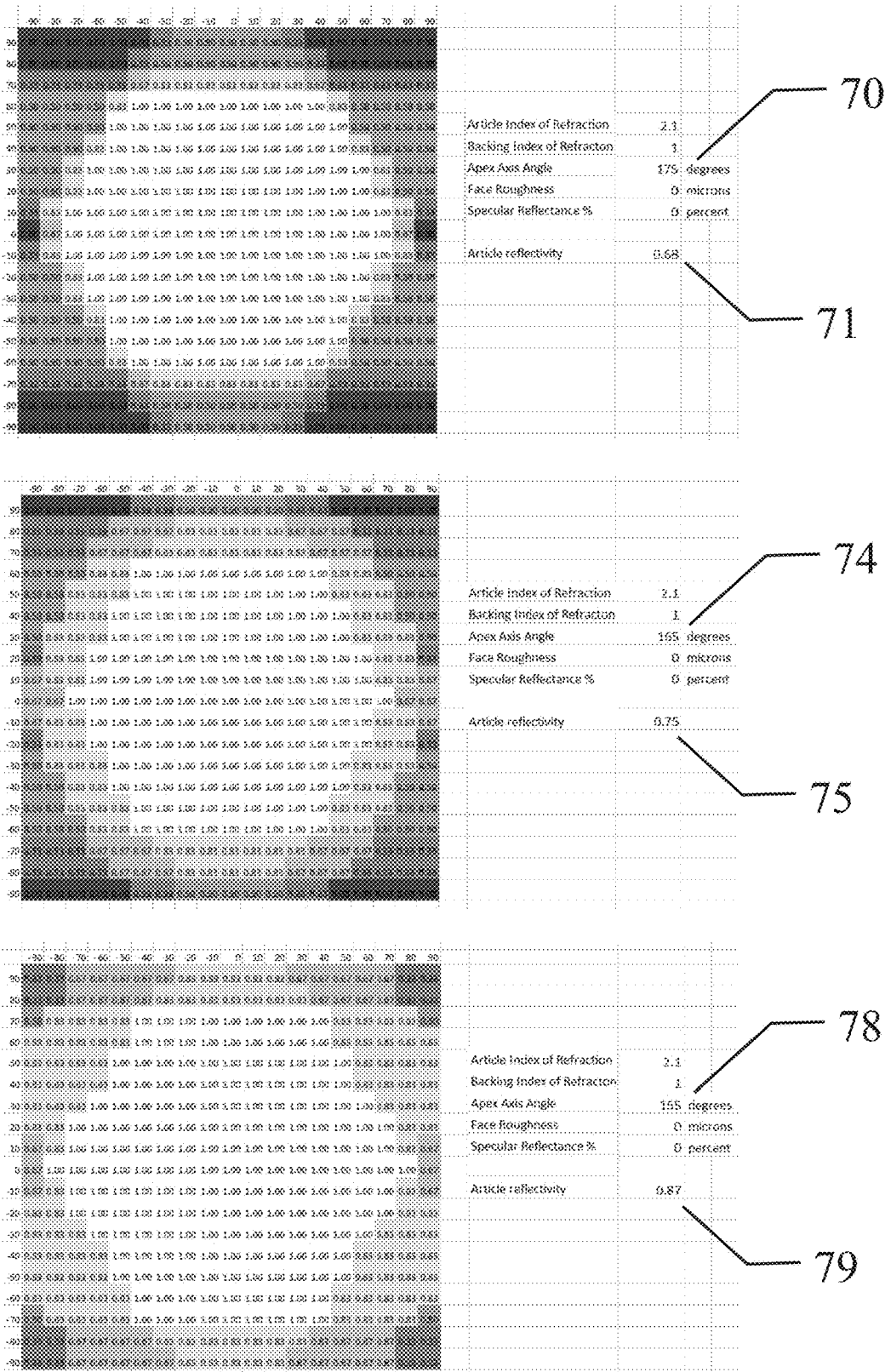
FIG. 14 illustrates a retroreflectivity plot for a near-ideal TIR retroreflective element that shows the effect of changes in the tilt angle of the apex axis angle.

Reflectivity plots in FIG. 14 illustrate the performance characteristics for a six-element, eighteen-surface cube corner construction with three different apex axis angles. A backing material consisting of air with index of refraction of 1.0 is used for three embodiments illustrated in FIG. 14. An apex axis angle 70 of 175 degrees results in an element reflectivity 71 of 0.68, an apex axis angle 74 of 165 degrees results in an element reflectivity 75 of 0.75, and an apex axis angle 78 of 155 degrees results in an element reflectivity 79 of 0.87.

Figure 15:
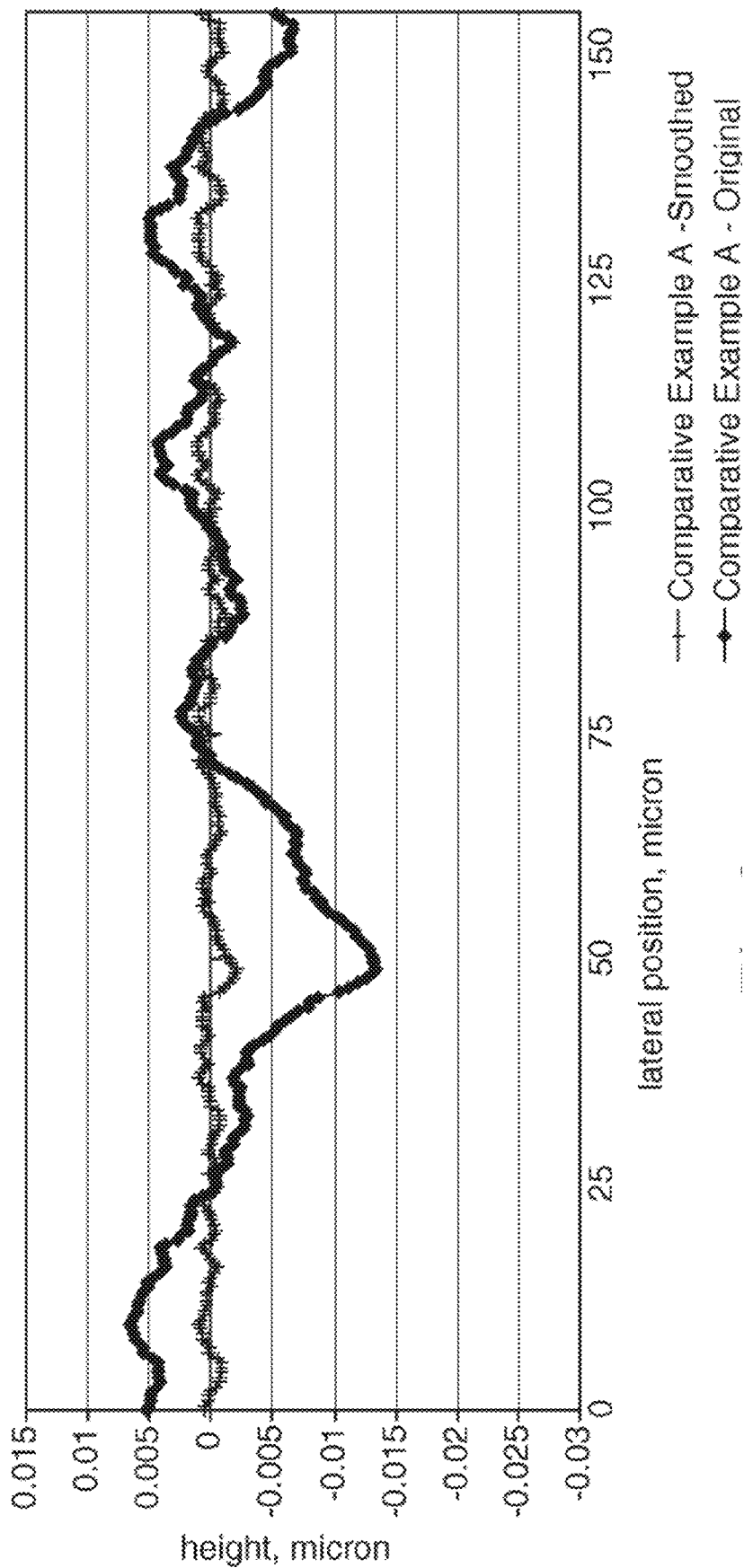
FIG. 15 illustrates a prior art representation of surface roughness for a cube corner construction.

FIG. 15 illustrates prior art cube corner roughness measurements as disclosed in U.S. Pat. No. 8,783,879 (Smith). Smith discloses a method of utilizing a moving average to smooth the data points and to remove the effects of surface form and curvature. FIG. 15 shows an original set and the resulting smoothed set of data points for a cube corner face. Smith further discloses the use of an equation for average roughness of a surface as:

$$R_a = (1/L)\Sigma(Z(x)*\Delta x) \qquad \text{Eq. 3}$$

Where $R_a$ is the average roughness

L is the length of the face for which measurements were made

Z(x) is the vertical position of the smoothed data as a function of lateral position Δx is distance of each point from zero Utilizing Eq. 3 from Smith and the data from FIG. 15, the sample produces an average roughness value of 0.00051 microns.

Figure 16:
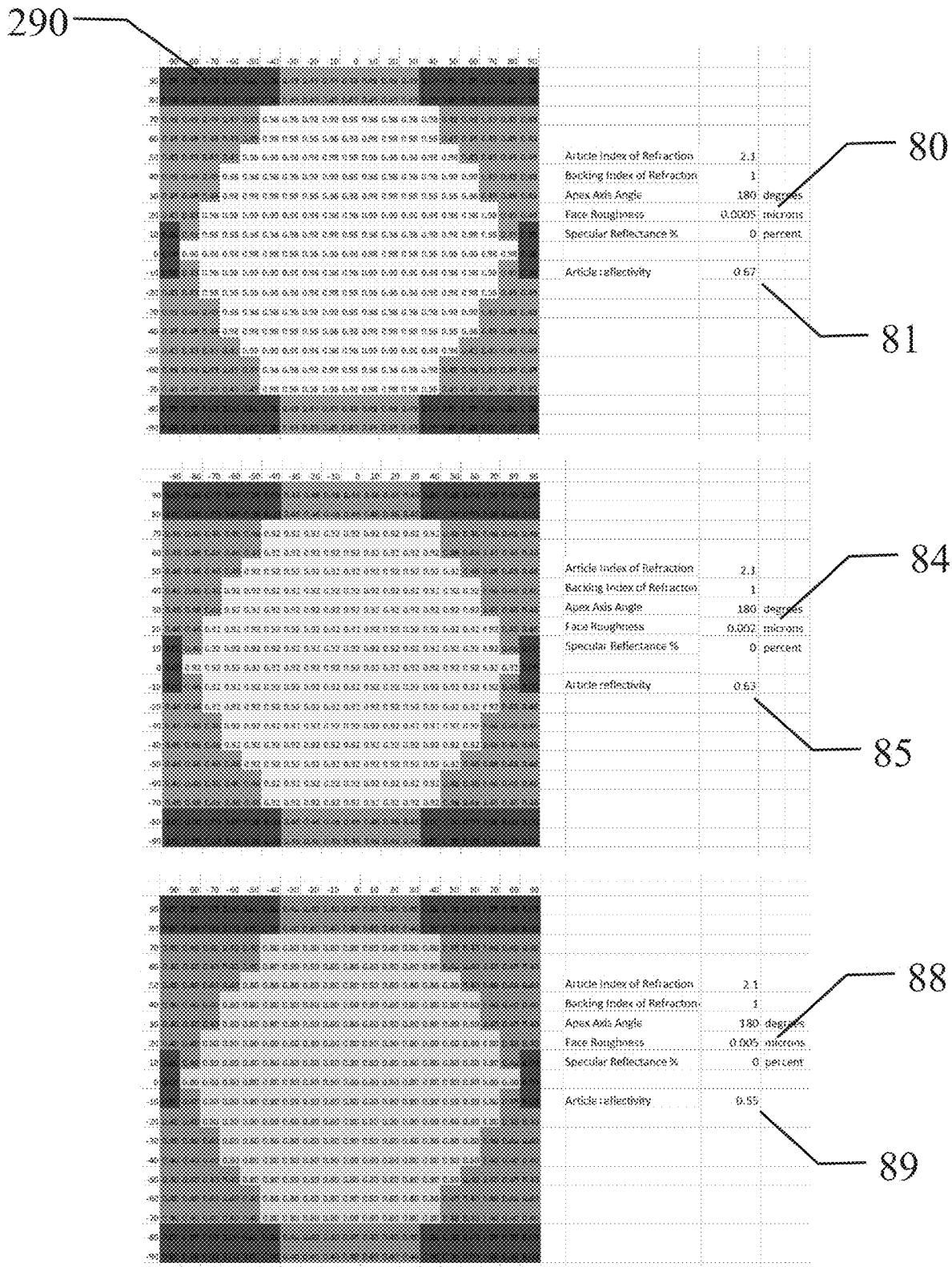
FIG. 16 illustrates a retroreflectivity plot for a near-ideal TIR retroreflective element that shows the effect of changes in the average surface roughness.

Average face roughness will exhibit multiple impacts on reflected signals based on the wavelengths of the surface roughness. High-frequency roughness will result in losses of TIR and of specular reflectance. Medium-frequency roughness, as disclosed in Smith, will impact the range of angles at which TIR occurs for each face. With respect to Eq. 2, average, medium-frequency roughness will impact the $R_{ab}$ terms. Intensity plots in FIG. 16 illustrate the performance characteristics for a retroreflective element constructed as a six-element, eighteen-surface cube corner construction of a single near-ideal TIR retroreflective element with three different average surface roughness values. An index of refraction of 1.0 is used for backing materials for three embodiments illustrated in FIG. 16. A surface roughness 80 of 0.0005 microns results in a retroreflective element reflectivity 81 of 0.67, a surface roughness 84 of 0.002 microns results in a retroreflective element reflectivity 85 of 0.63, and a surface roughness 88 of 0.005 microns results in a retroreflective element reflectivity 89 of 0.55.

Embodiments establish performance levels for near-ideal TIR reflective elements based on the reflectivity values of the retroreflective cube corner feature(s) that result from cube corner feature geometry, feature material, and backing material. Embodiments include, but are not limited to, 99% near-ideal TIR elements, 98% near-ideal TIR elements, 95% near-ideal TIR elements, and 90% near-ideal TIR elements. When specifying the percent element reflectivity for a near-ideal TIR element, the percentage is based on wavelengths that will realize the specified performance. Examples of specified wavelength ranges are 400-700 nm for visible spectrum elements and 400-1000 nm for elements to be utilized with visible spectrum and NIR (near-infrared) machine vision systems.

Figure 17:
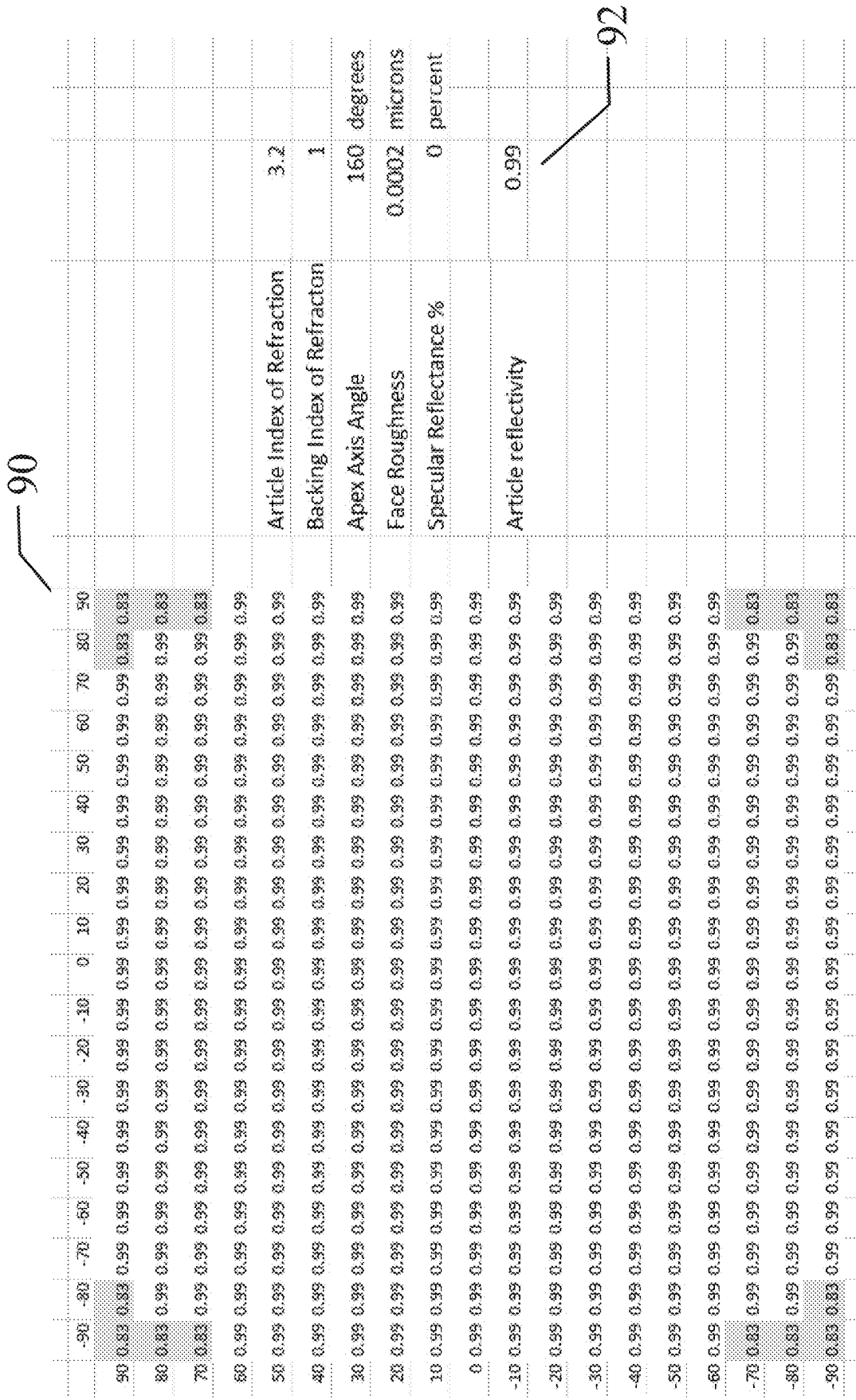
FIG. 17 illustrates a retroreflectivity plot for a near-ideal TIR retroreflective element with a retroreflectivity of 99%.
Figure 18:
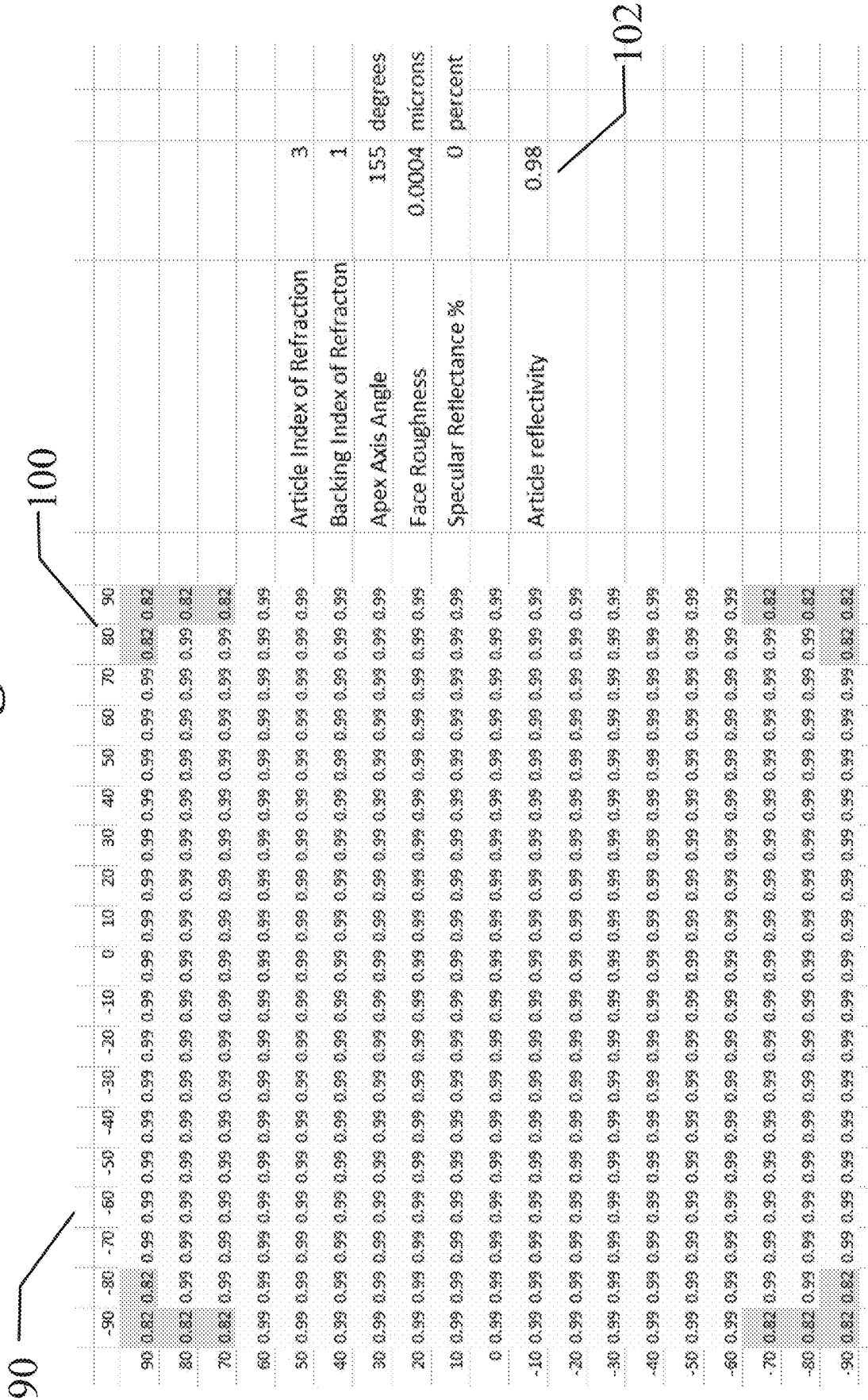
FIG. 18 illustrates a retroreflectivity plot for a near-ideal TIR retroreflective element with a retroreflectivity of 98%.
Figure 19:
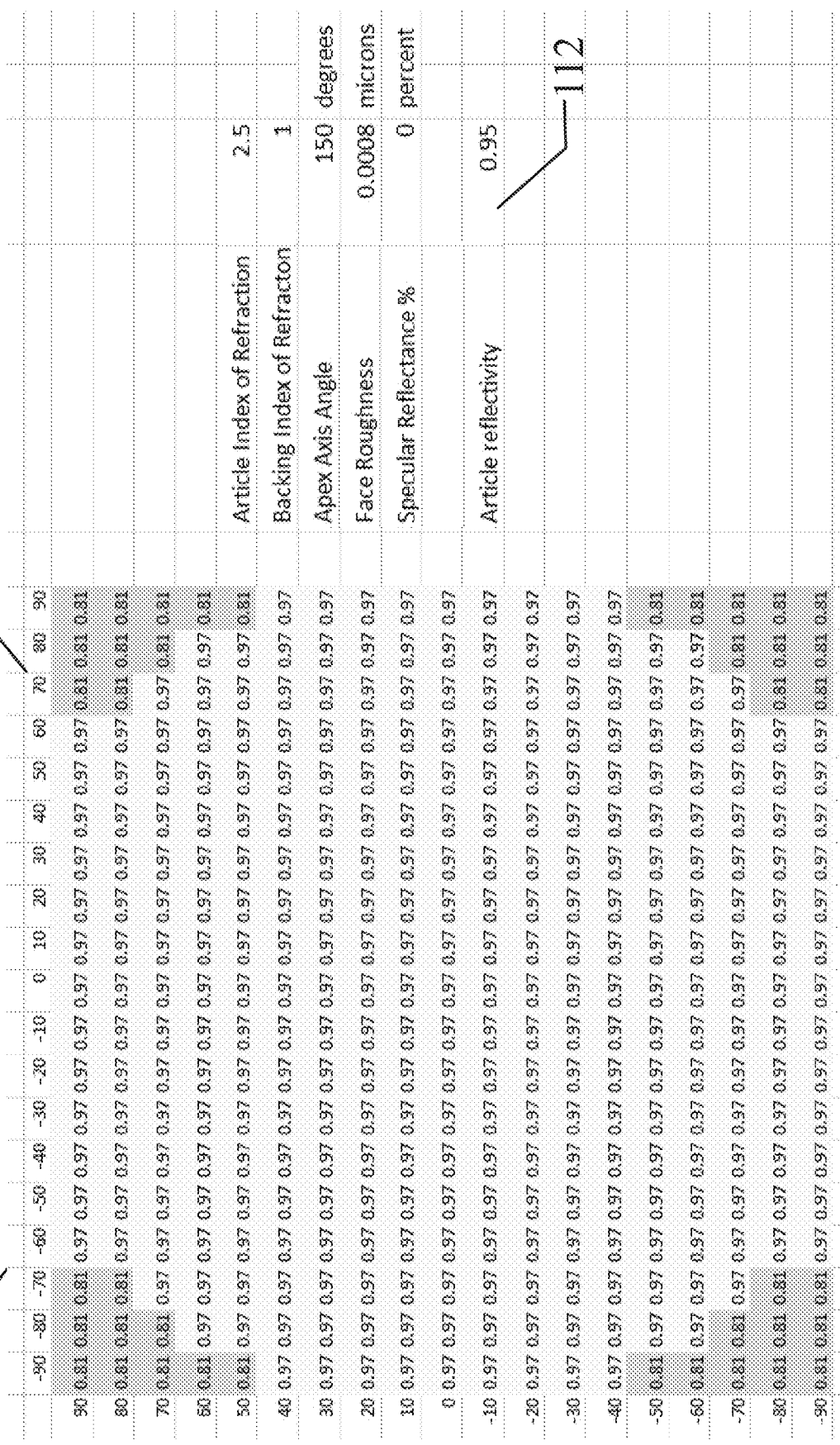
FIG. 19 illustrates a retroreflectivity plot for a near-ideal TIR retroreflective element with a retroreflectivity of 95%.

FIG. 17 illustrates a reflectivity plot 90 for a 99% near-ideal TIR element embodiment that interfaces to an air backing and results in an article reflectivity 92 of 0.99. FIG. 18 illustrates a reflectivity plot 100 for a 98% near-ideal TIR element embodiment that interfaces to an air backing and results in an article reflectivity 102 of 0.98. FIG. 19 illustrates a reflectivity plot 110 for a 95% near-ideal TIR element embodiment that interfaces to an air backing and results in an article reflectivity 112 of 0.95.

Figure 20:
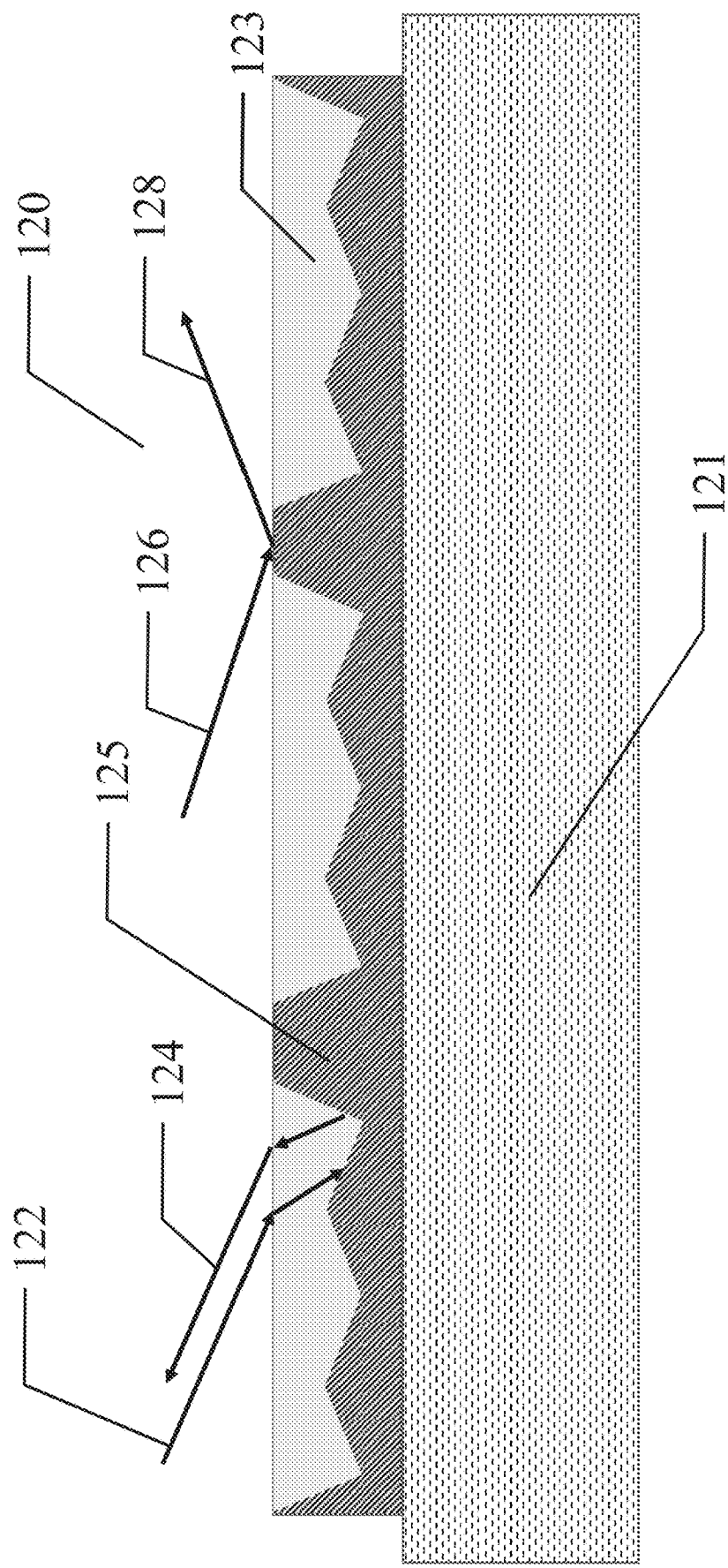
FIG. 20 illustrates a cross-sectional view of a dry pavement marking with a near-ideal TIR retroreflective element.

FIG. 20 illustrates a cross-sectional view of an embodiment of a roadway pavement marking 120 affixed to a roadway surface 121. A binder 125 material is affixed to the roadway surface 121 and near-ideal TIR retroreflective elements 123 are affixed to the binder 125 with the top of the binder 125 remaining essentially flat with the flat surface of the near-ideal TIR retroreflective elements 123. Incident radiation 122 at a near-horizontal entrance angle is refracted at the retroreflective element 123 top surface. The refracted wave experiences TIR or high reflectance due to partial TIR and specular reflection within the cube corner construction. The emitted wave is refracted at the surface of the retroreflective element 123 and the retroreflected wave 124 is parallel to and in the opposite direction of the incident wave 122. Incident radiation 126 that contacts the upper layer of the binder 125 will undergo mostly specular reflection. The reflected wave 128 from the incident radiation 126 is mostly due to specular reflection. A very small portion of the incident waveform 126 will be retroreflected at the binder surface for large entrance angles.

Figure 21:
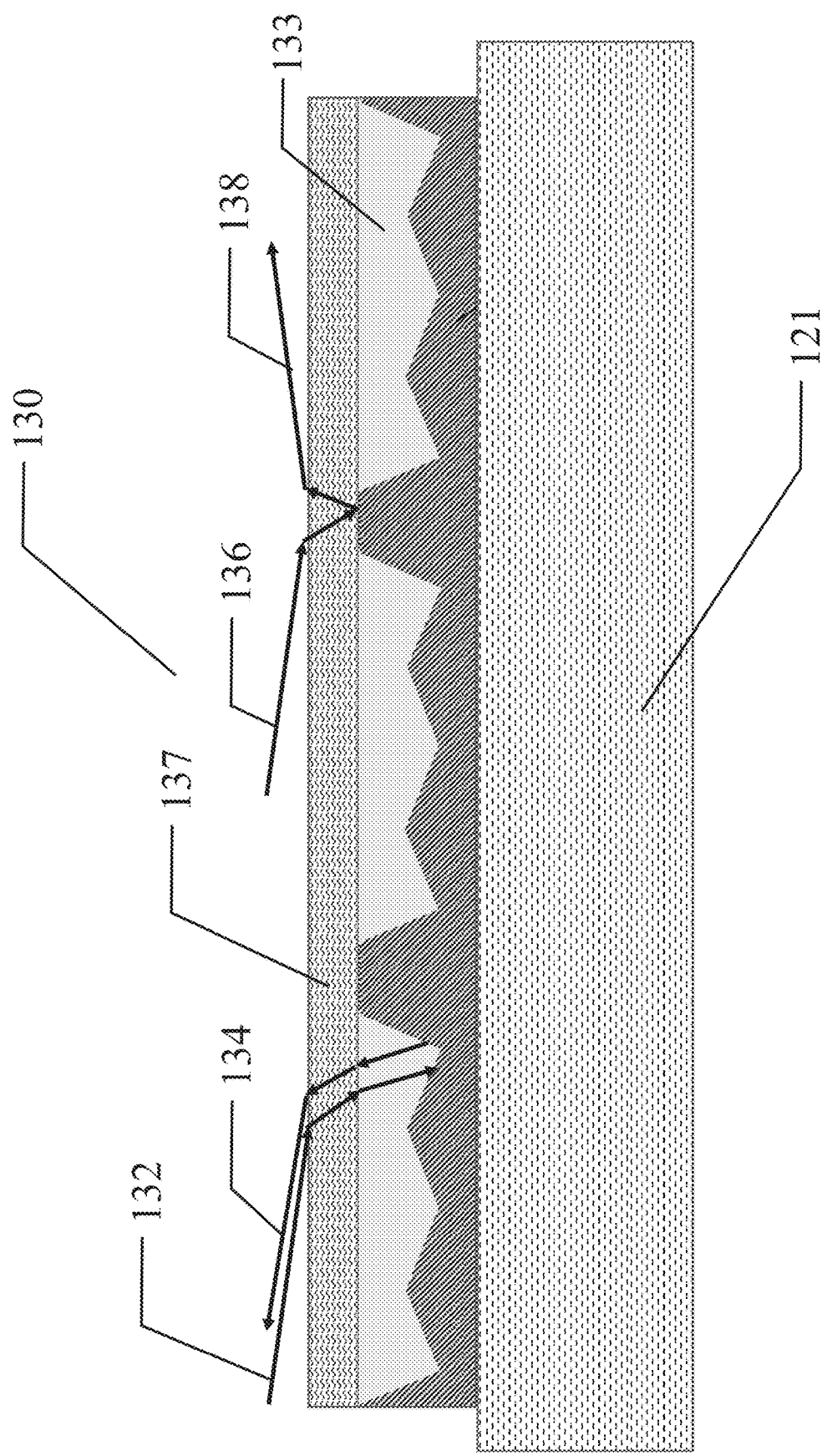
FIG. 21 illustrates a cross-sectional view of a water-covered pavement marking with a near-ideal TIR retroreflective element.

FIG. 21 illustrates embodiments with a cross-sectional view of a roadway pavement marking 130 affixed to a roadway surface 131 with a layer of water 137 resting on the top surface. A binder 135 material is affixed to the roadway surface and near-ideal TIR retroreflective elements 133 are affixed to the binder 135 with the top of the binder 135 remaining essentially flat with the flat surface of the near-ideal retroreflective TIR element 133. Incident radiation 132 at a near-horizontal entrance angle is refracted at the top surface of the water 137 and is subsequently refracted at the retroreflective element 133 surface. The refracted wave experiences TIR or high reflectance due to partial TIR and specular reflection within the cube corner construction. The emitted wave is refracted at the surface of the retroreflective element 133, further refracted at the surface of the water 137, and the retroreflected wave 134 is parallel to and in the opposite direction of the incident wave 132. Incident radiation 136 that contacts the upper layer of the binder 125 after being refracted at the water 137 surface will undergo mostly specular reflection. The reflected wave 138 from the incident radiation 136 is mostly due to specular reflection. A very small portion of the incident waveform 136 will be retroreflected at the binder surface for large entrance angles. FIGS. 20 and 21 utilize retroreflective elements with similar construction. The wet/dry performance of the pavement markings 120, 130 is similar, thereby offering advantages over prior microsphere constructions that must include separate microsphere elements for wet and dry performance.

Figure 22:
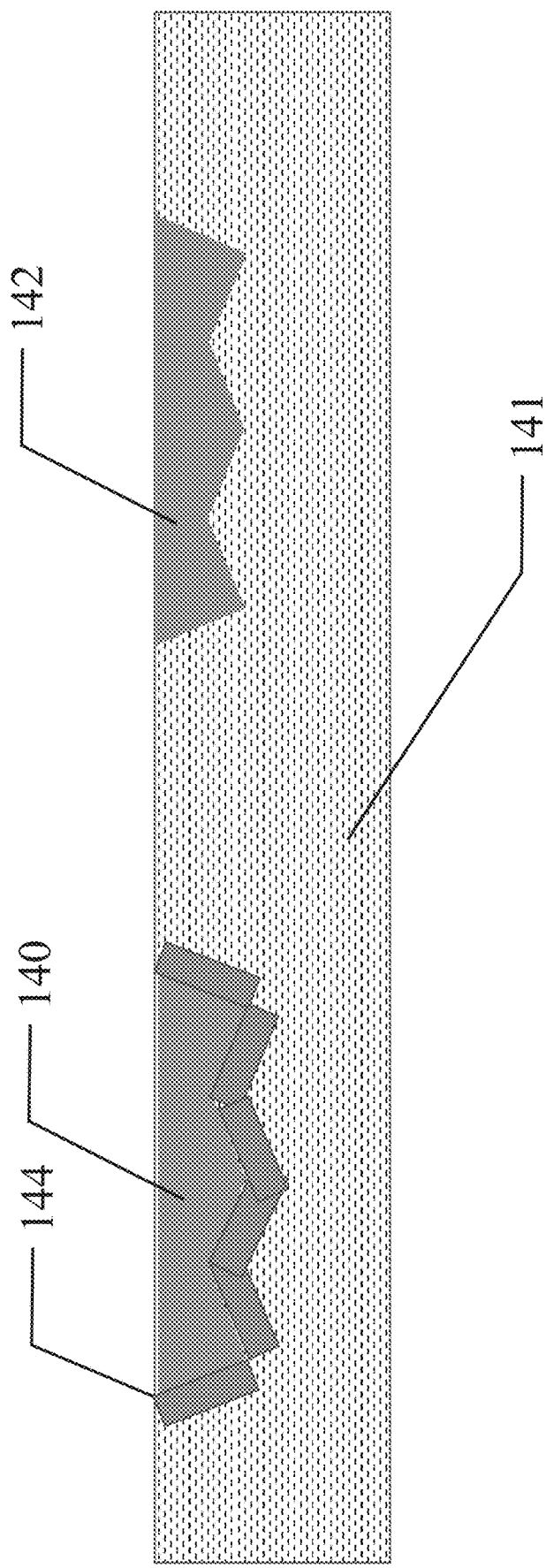
FIG. 22 illustrates a cross-sectional view of two embodiments of a pavement marking embedded flush with the surface of the asphalt of a roadway where the pavement marking includes retroreflective elements each having a single near-ideal TIR retroreflective element.

FIG. 22 illustrates embodiments with a cross-sectional view of a roadway pavement marking constructed with near-ideal TIR retroreflective elements 140 and 142 embedded into to a roadway surface 141, such as an asphalt roadway. The roadway marking near-ideal TIR retroreflective elements 140 and 142 can be embedded in a malleable roadway material, such as warmed asphalt, using a roller or other pressure technique that can, for example, be part of the installation process as shown in connection with FIG. 26. For roadway pavement marking retroreflective element 140, an adhesive layer or liquid 144 may be used to facilitate securing the pavement marking retroreflective element 140 as it is embedded within the roadway surface. Alternatively, the roadway pavement marking retroreflective element 142 may be embedded in direct contact with the roadway material.

FIG. 23 shows a reflectivity plot 140 of an embodiment for use in reflective pavement markings for roadways. The parameters for the reflective element are:

| | |
|---|---|
| Element index of refraction | 2.4 |
| Backing index of refraction | 1.5 |
| Apex Axis Angle | 140 degrees |
| Surface Roughness | 0.001 microns |
| Specular Reflectance % | 70 percent |
| Element Reflectivity | 0.96 |

For the pavement marking construction, near-ideal TIR retroreflective elements are embedded in a binder applied to a roadway. The index of refraction of the binder is 1.5, and the specular reflectance percentage of the binder is 70%, which means that 70% of non-TIR photons that pass through the medium-binder barrier will be reflected back across the medium barrier. The element produces TIR for small and medium entrance angles and produces a combination of TIR and specular reflectance for high entrance angles.

In embodiments, medium materials consist of high refractive indices that include, but are not limited to, oxides selected from a group consisting of $TiO_2$, $BaO$, $La_2O$, or $Bi_2O_3$, high-refractive-index elements like zirconium and crystallized carbon, and high-refractive-index compounds like silicon carbide. Retroreflected radiation at high entrance angles will experience coloration due to specular reflectance from the binder. For TIR reflected radiation, the return signal will consist of the wavelength of the incident radiation only. For roadway applications, it may be desirable to add colorants to the reflective element in order for the TIR signal to represent the desired color for visible-spectrum embodiments. Selections for colorants may include $CeO_2$, $Fe_2O_3$, $CoO$, $Cr_2O_3$, $NiO$, $CuO$, $MnO_2$, and $V^2O_5$. Rare earth elements such as praseodymium, neodymium, europium, erbium, thulium, and ytterbium may optionally be included for color or fluorescence.

Figure 24:
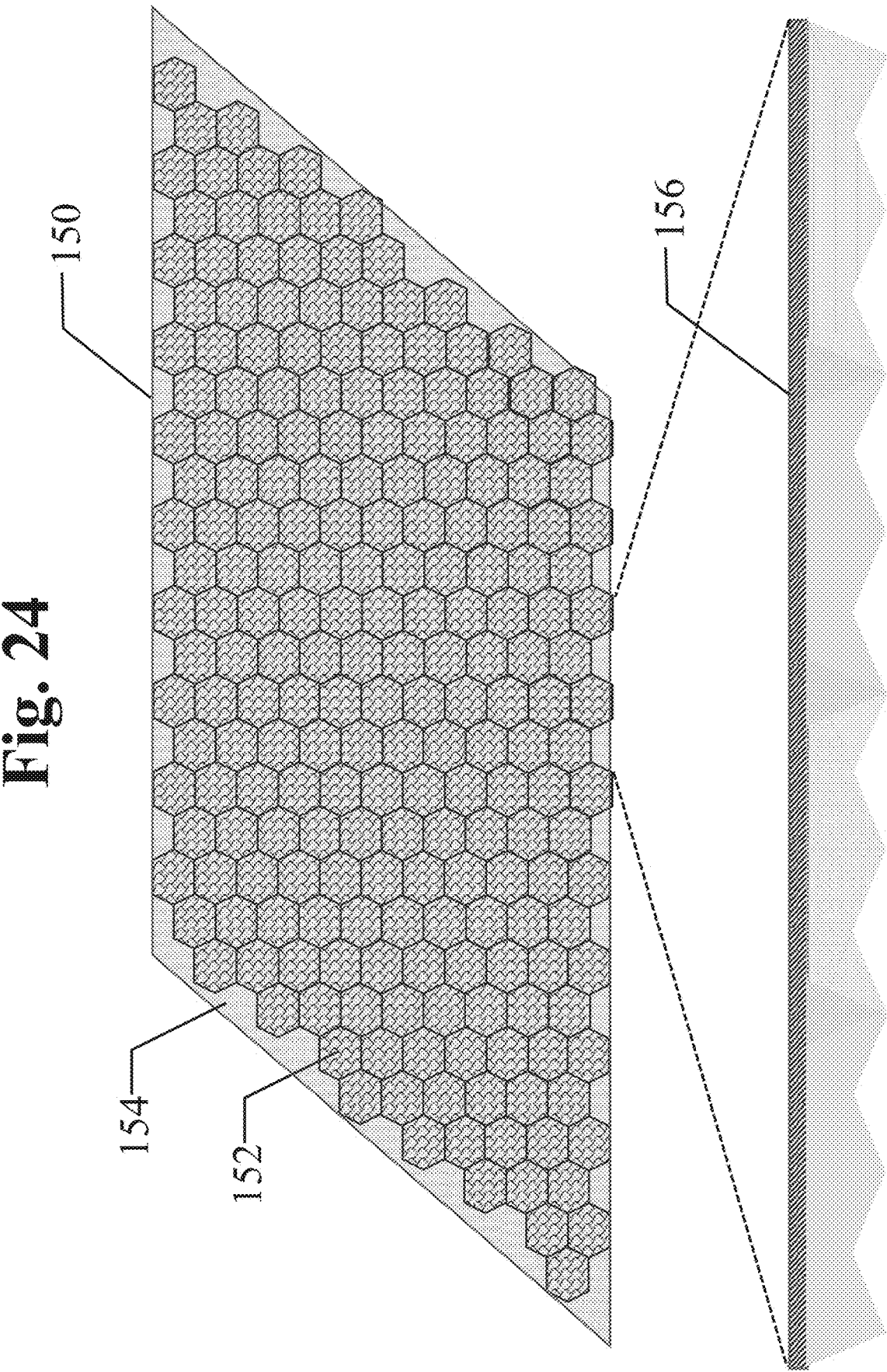
FIG. 24 illustrates a densely populated pattern of discrete, rigid near-ideal TIR retroreflective elements affixed to a flexible release layer.

FIG. 24 illustrates embodiments for a perspective view of a flexible construction 150 of arranged and oriented near-ideal TIR retroreflective elements 152 connected to a release layer 154 in a densely populated pattern. A cross-sectional view of the construction 150 illustrates the flexible top layer 156 affixes to a flat side of the retroreflective elements.

Figure 25:
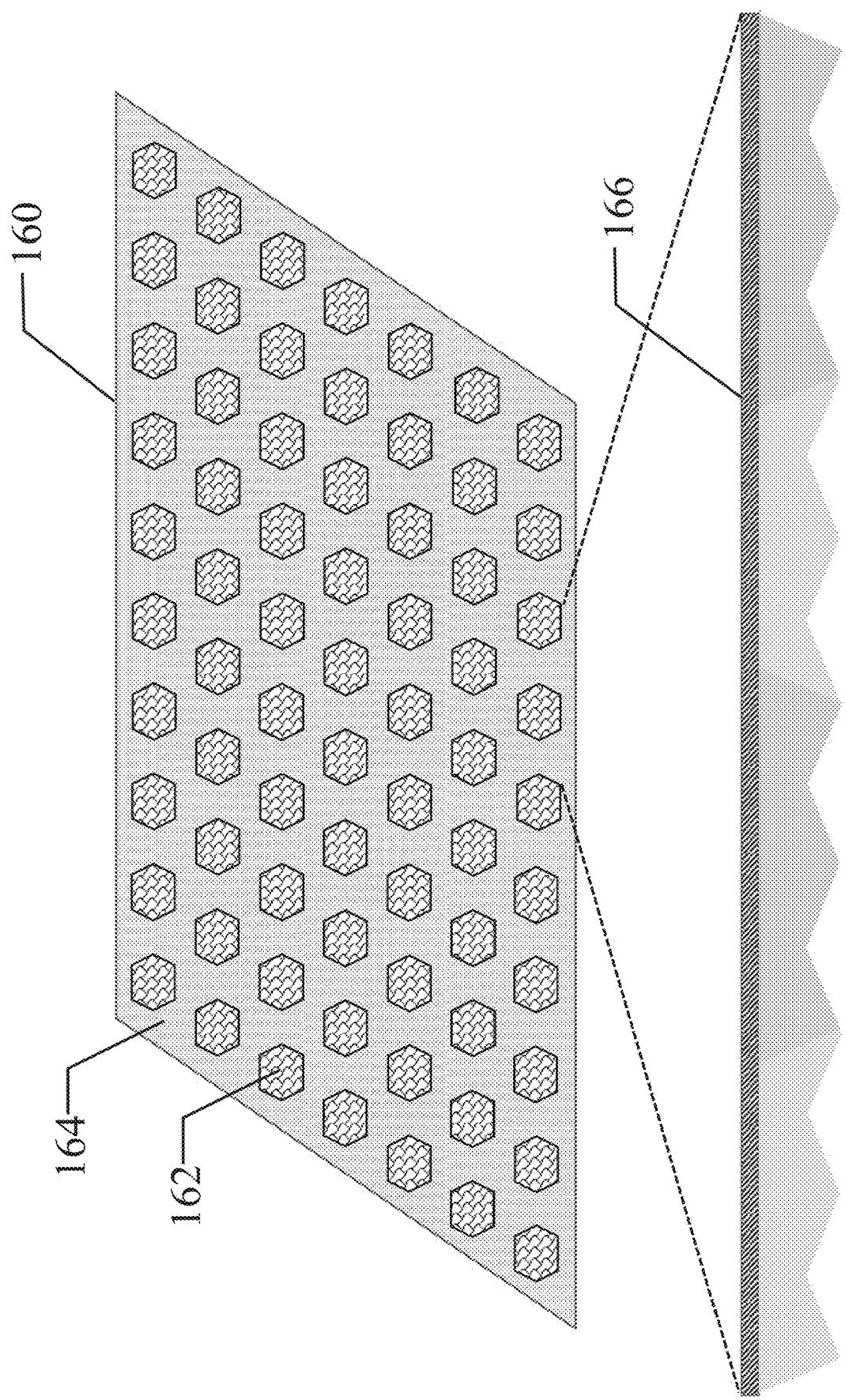
FIG. 25 illustrates sparsely-populated pattern of discrete, rigid near-ideal TIR retroreflective elements affixed to a release layer.

FIG. 25 illustrates embodiments for a perspective view of a sparsely-populated, more flexible construction 160 of arranged and oriented near-ideal TIR retroreflective elements 162 connected to a release layer 164. A cross-sectional view of the construction 160 illustrates the flexible top layer 166 affixes to a flat side of the retroreflective elements.

Figure 26:
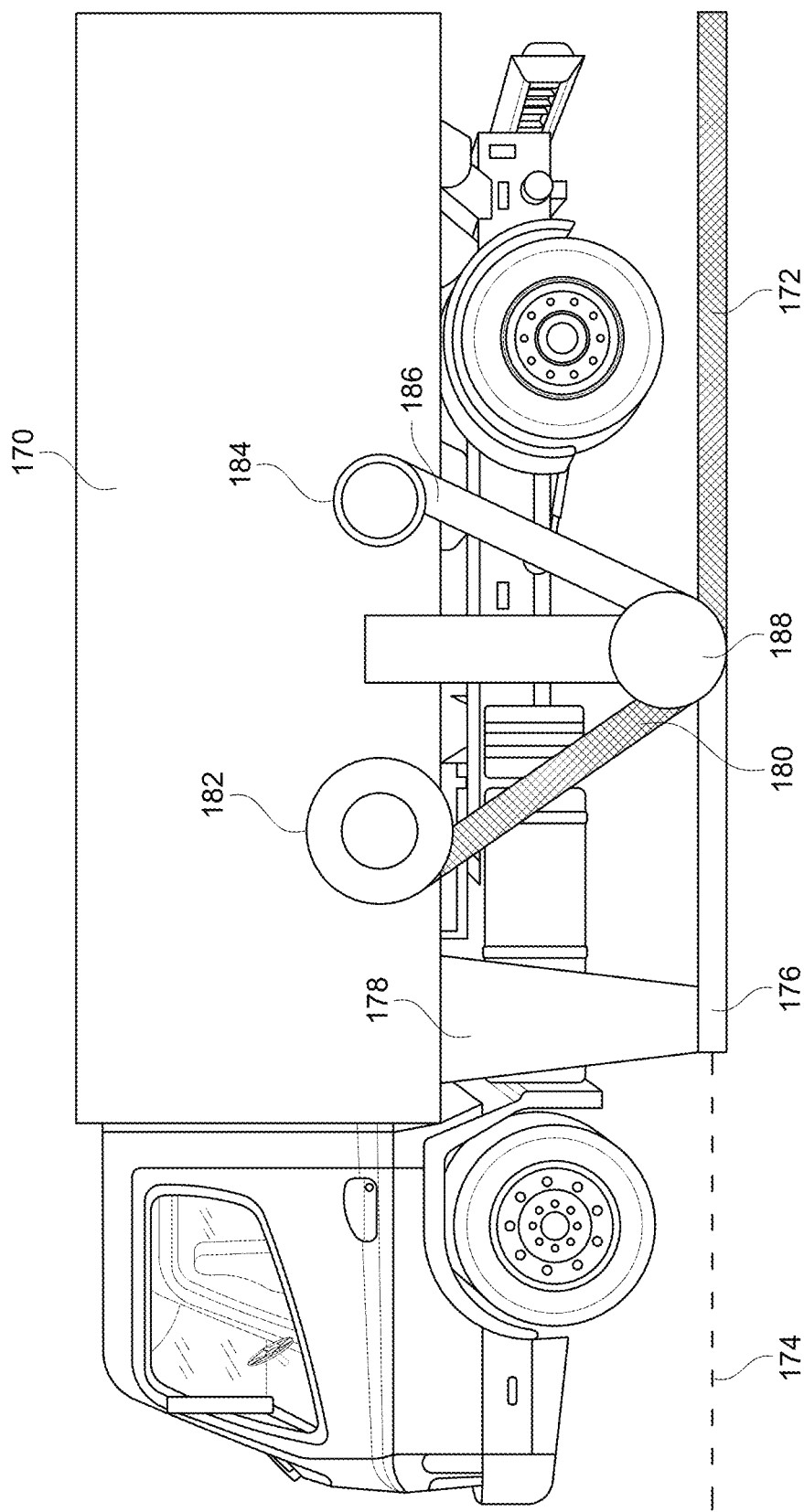
FIG. 26 illustrates field installation equipment for pavement markings.

FIG. 26 illustrates embodiments for a vehicle 170 utilized for installation of binder 176 and near-ideal TIR retroreflective elements 180 affixed to a release layer 186. A vehicle 170 disposes a binder 176 along a desired path 174 on a roadway. Binder 176 is disposed from a mechanism 178 that controls the thickness and location of the binder 176. Rigid retroreflective elements 180 affixed to a release layer 186 are directed by a supply spool 182. As the release-layer-affixed, rigid retroreflective elements 180 are directed below the pressure applicator 188, the retroreflective elements 180 are transferred to and embedded in the binder 176. The separated release layer 186 is collected on the tensioning spool 184.

Figure 27:
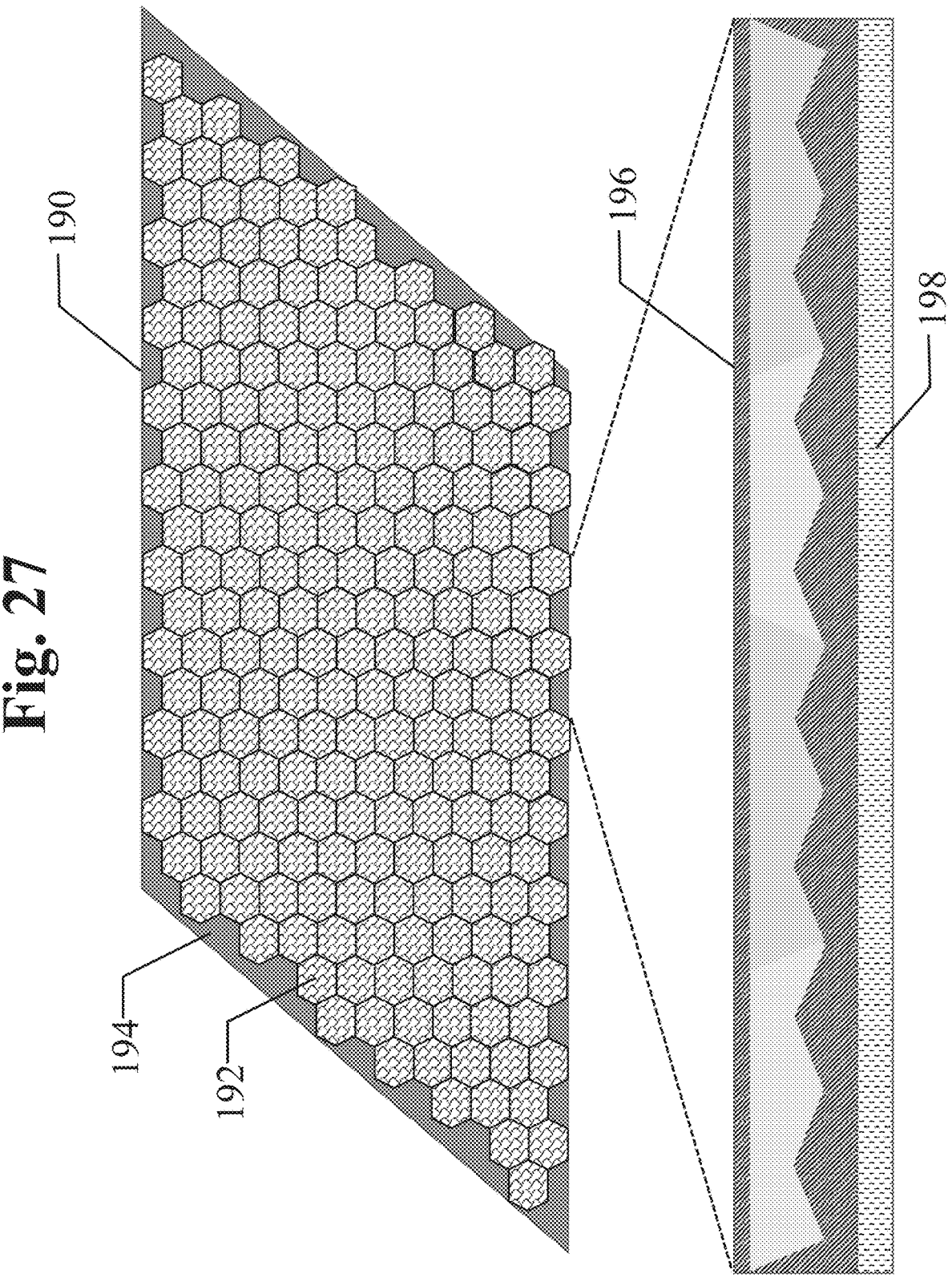
FIG. 27 illustrates a densely populated pattern of discrete, rigid near-ideal TIR retroreflective elements embedded in a flexible sheeting material.

FIG. 27 illustrates a perspective view of a flexible construction 190 for sign sheeting material with embedded, discrete, rigid near-ideal TIR retroreflective elements 192 in a densely populated configuration. Retroreflective elements 192 are embedded in a flexible material 194 that allows the manufactured construction 190 to be shipped in roll form. A cross-sectional view of the construction 190 illustrates the flexible top layer 196 extends above the flat surface of the TIR elements 192 and extends below the structured side of the retroreflective elements 192. A sign sheeting adhesive 198 layer is shown in the cross-sectional view.

Figure 28:
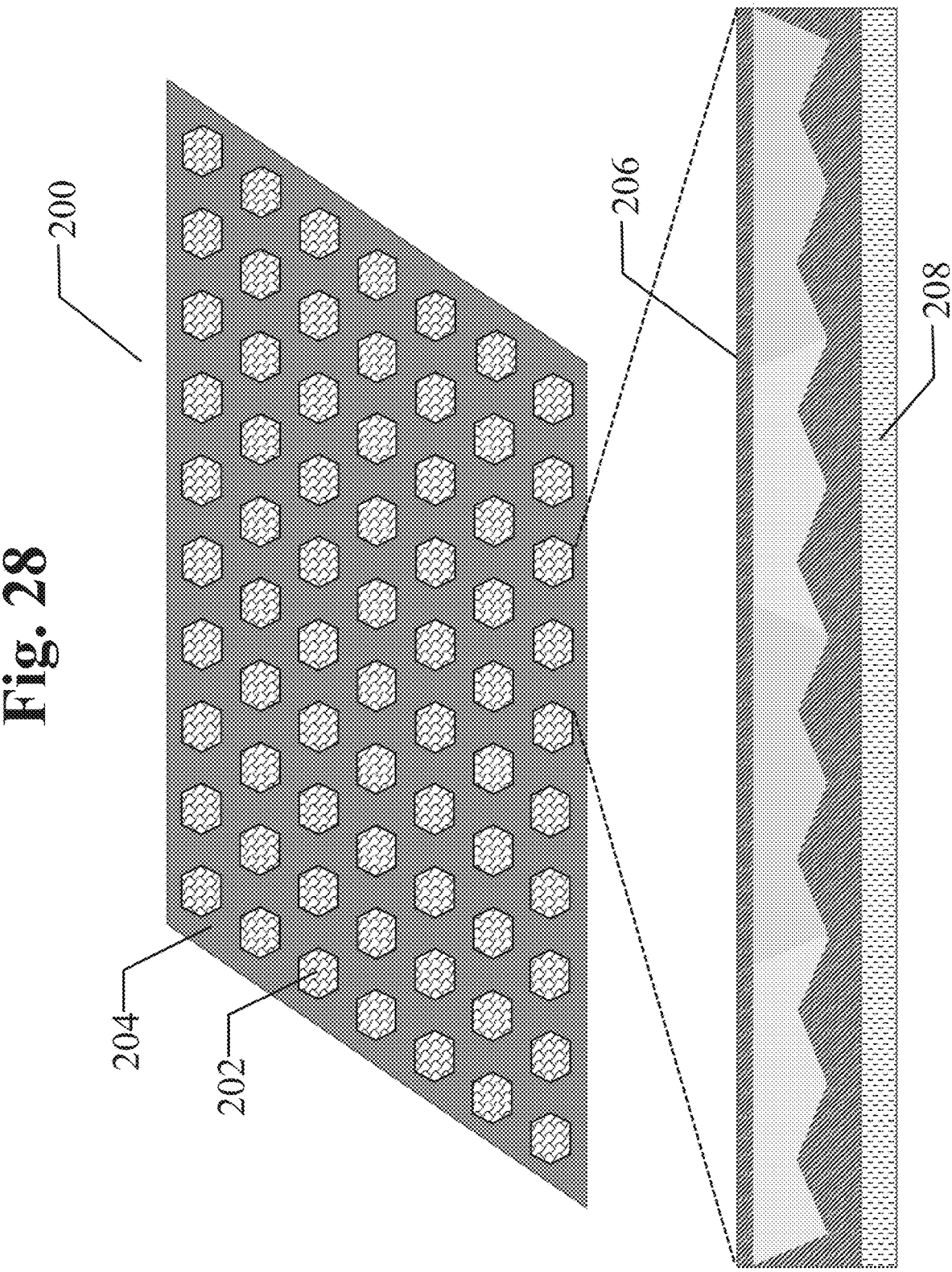
FIG. 28 illustrates sparsely-populated pattern of discrete, rigid near-ideal TIR retroreflective elements embedded in a flexible sheeting material.

FIG. 28 illustrates a perspective view of a sparsely-populated flexible construction 200 for sign sheeting material with embedded, discrete, rigid near-ideal TIR retroreflective elements 202. Retroreflective elements 202 are embedded in a flexible material 204 that allows the manufactured construction 200 to be shipped in roll form. A cross-sectional view of the construction 200 illustrates the flexible top layer 206 extends above the flat surface of the retroreflective elements 202 and extends below the structured side of the TIR elements 202. A sign sheeting adhesive 208 layer is shown in the cross-sectional view.

Figure 29:
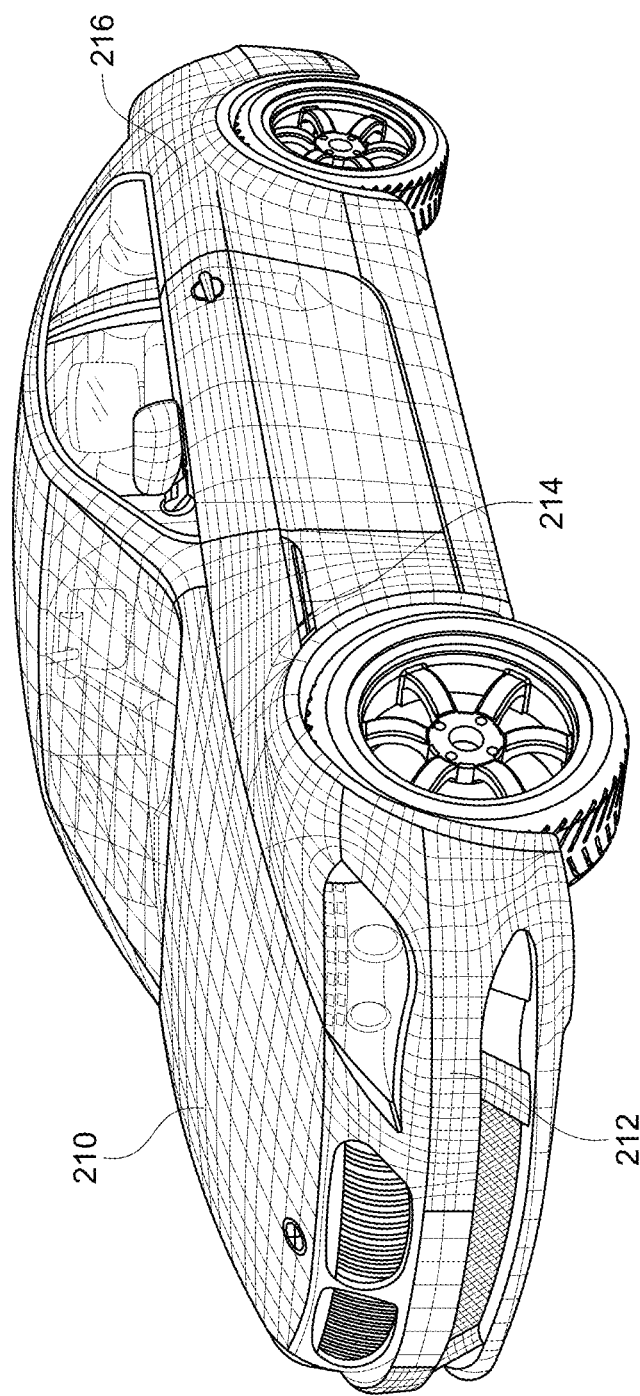
FIG. 29 illustrates automotive uses of conspicuity markings.

FIG. 29 shows a perspective view of a vehicle 210 with three examples of conspicuity structures produced with embodiments—a front bumper 212, a decorative highlight 214 on the vehicle 210 side, and a structure on a body element 216 like a fender.

Figure 30:
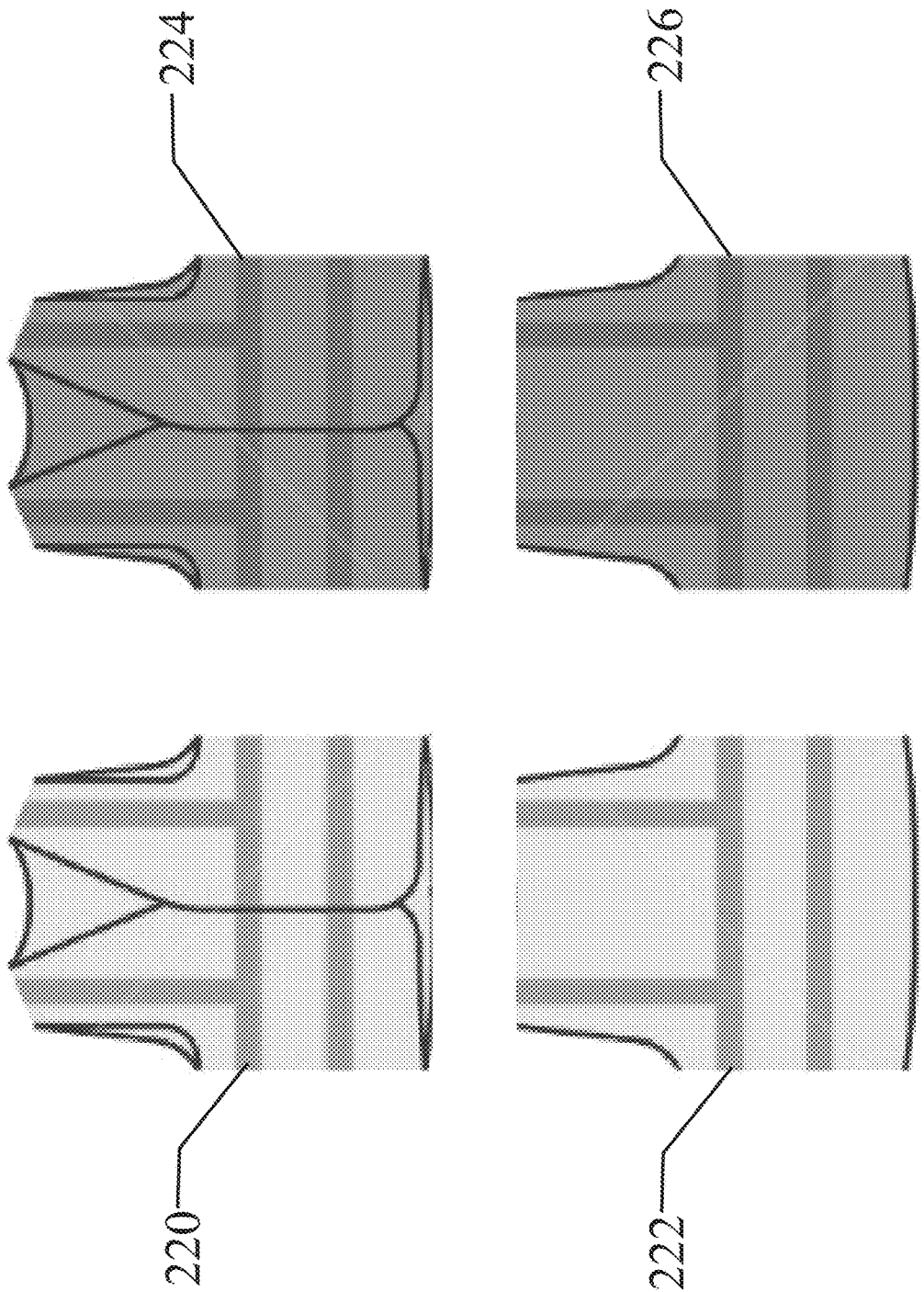
FIG. 30 illustrates embodiments of conspicuity garments.

FIG. 30 shows near-ideal TIR reflective articles 330, 332, 334, 336 affixed to the front and back of conspicuity safety vests.

Figure 31:
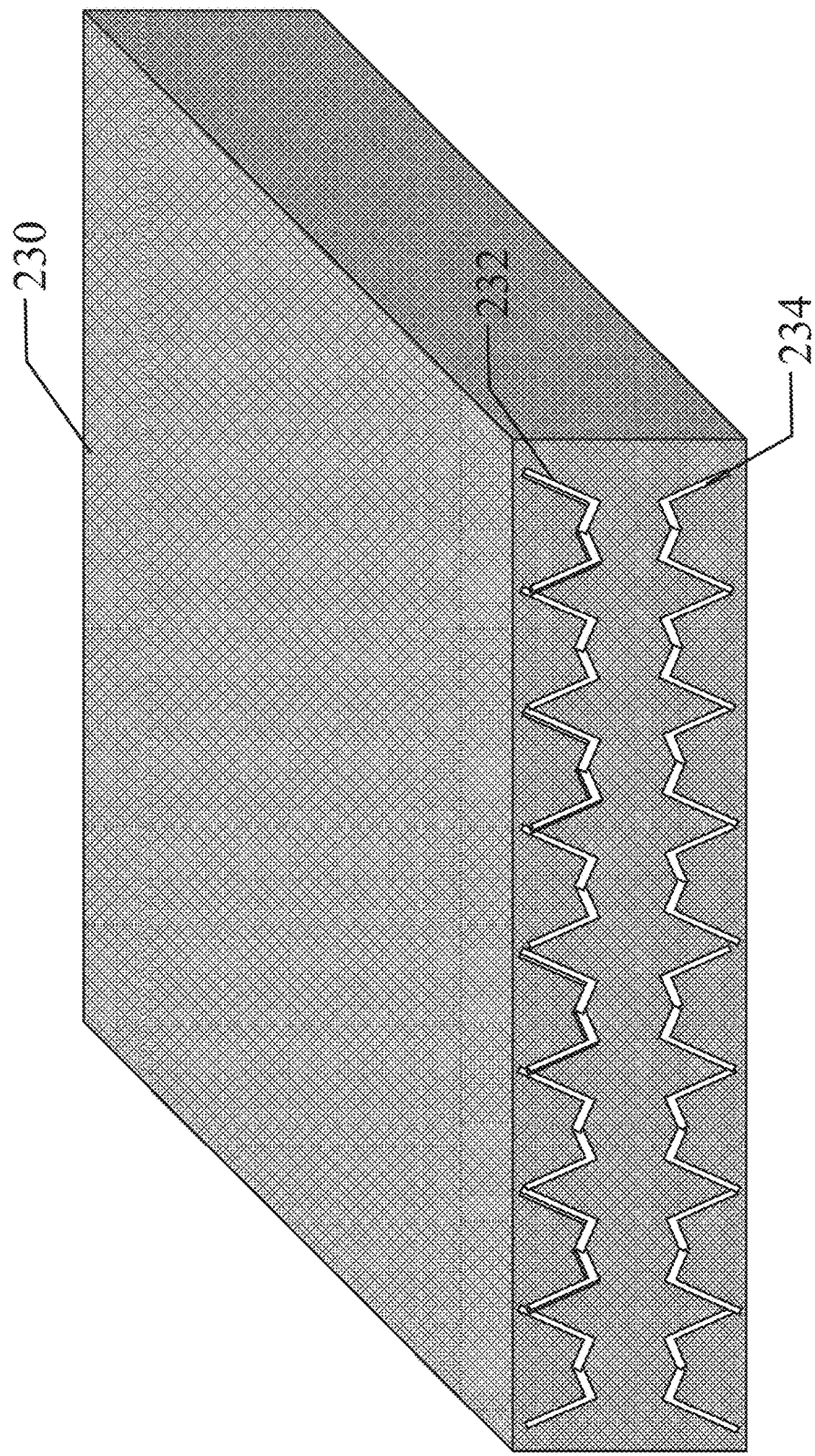
FIG. 31 illustrates a two-way, near-ideal TIR retroreflective element with structured air elements.

FIG. 31 shows an object 230 that exhibits TIR for both sides of the object 340 throughout the allowed range of incident angles. The object 230 material has a high index of refraction and non-vertical cube corner geometry 232, 234 for each side, with an apex angle sufficient to have a minimum TIR angle less than −90 degrees and a maximum TIR angle greater than zero degrees. For a material like crystallized zirconium with an index of refraction of 2.2, an apex angle of 152 degrees or greater meets the requirements for producing TIR throughout all viewable angles on both sides of the object 230.

Figure 32:
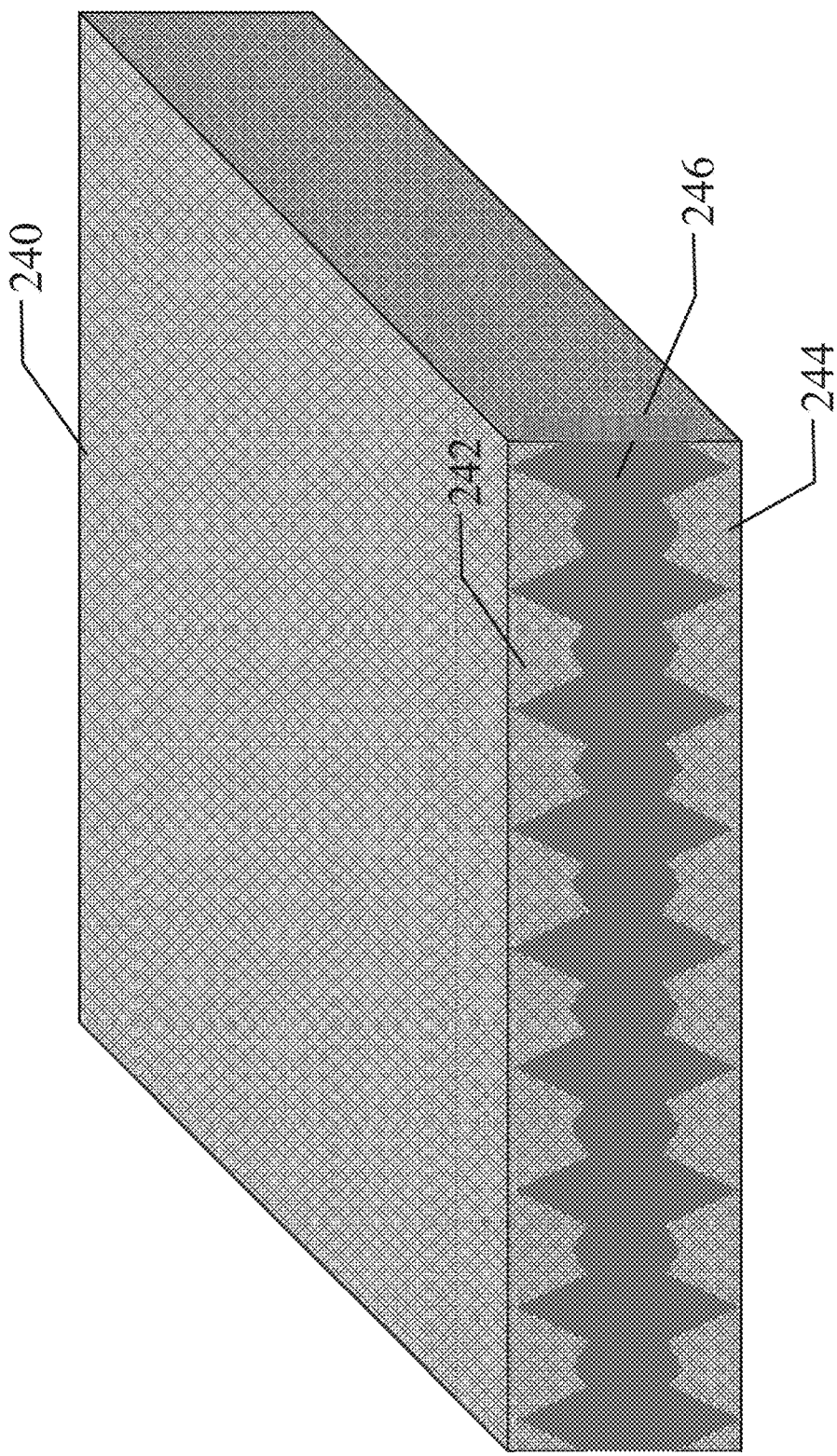
FIG. 32 illustrates a two-way, near-ideal TIR retroreflective element with a low index of refraction inner layer.
Figure 36B:
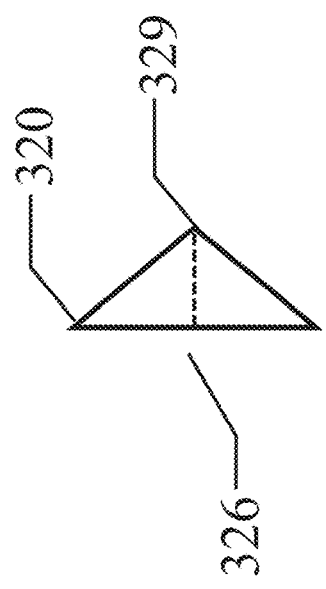
FIGS. 36B, 36C, and 36D are an end view, a side view, and a perspective view of the element of FIG. 36A, respectively.
Figure 36D:
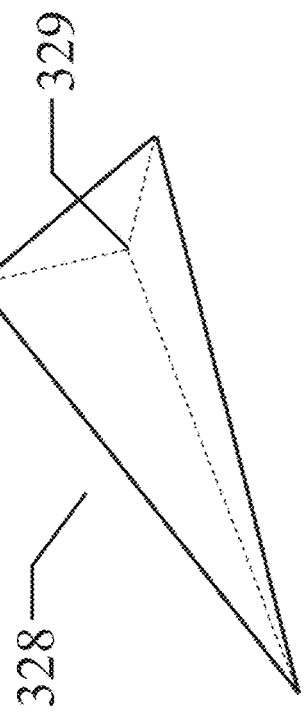
Figure 36A:
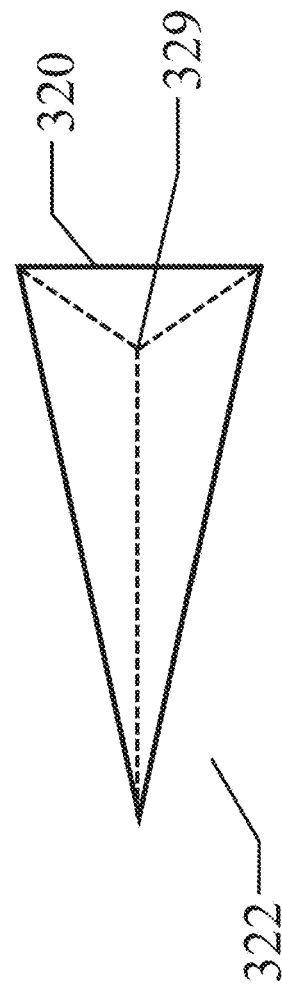
FIG. 36A illustrates a top view of a single element, three-face canted cube corner reflective element, according to an embodiment.
Figure 36C:
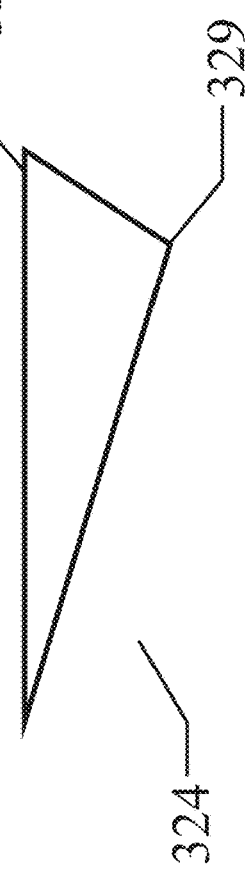

FIG. 32 shows an alternate construction for a near-ideal, two-way retroreflector 240. The medium 242, 244 utilizes a high-refractive-index material that is transparent to the desired operational wavelengths. The backing material 246 utilizes a low-refractive-index material. The difference between the refractive indices of the materials and the geometric construction of the material interface are sufficient to support TIR throughout the entire range of entrance angles for the article 240.

FIG. 33 shows embodiments of a near-ideal, one-way retroreflective article 250. The medium 252 utilizes a high-refractive-index material that is transparent to the desired wavelengths. The structured gap 254 utilizes a low-refractive-index material that is transparent to the desired operational wavelengths. The structured-gap side of the article experiences TIR 256 throughout the range of entrance angles. The opposite side of the article experiences near ideal transmissivity 258.

FIG. 34 shows embodiments of a near-ideal, one-way retroreflective article 260. The medium 262 utilizes a high-refractive-index material that is transparent to the desired wavelengths. The backing 264 utilizes a low-refractive-index material that is transparent to the operational wavelengths. The medium 262 side of the article 260 experiences TIR 266 throughout the range of entrance angles. The opposite side of the article experiences near ideal transmissivity 268. In embodiments, the transmissivity of the structured layer is modifiable for a select wavelength region. Altering the transmissivity properties of the structured layer allow the cloaking properties of the opaquely-invisible article to be selectively enabled and disabled. In embodiment, cloaking activation and deactivation is achieved via means including, but not limited to, optical, electrical, inductive, electromagnetic, or magnetic means.

FIG. 35 illustrates the construction of reflective polyhedrons 270, 280 comprised of base materials 272, 282 and near-ideal, one-way near-ideal TIR retroreflective elements 274, 284. The base materials 272, 282 are rigid and durable to enable usage in outdoor or ruggedized applications. Retroreflective elements 274, 284 may be affixed to the surface of a base material 272, 282 or may be embedded in a base material that is transparent to the operational wavelengths. Embodiments of reflective polyhedrons 270, 280 are enabled from a single material 272, 282 with structured air gaps near the polyhedron surfaces that produce near-ideal retroreflection at all surfaces.

FIGS. 36A-36D illustrate four views 322, 324, 326, 328 of a single-element, three-surface canted cube corner reflector 320 according to an embodiment. In particular, FIGS. 36A, 36B, 36C, and 36D illustrate the top view 322, side view 324, end view 326, and perspective view 328 of the reflector 320, respectively. The reflector 320 is transparent, as indicated by the dashed lines that correspond to portions of the reflector 320 that are behind the front surface in each of FIGS. 36A-36D. Additionally, FIGS. 36A-36D all indicate the location of the apex 329 of the cube corner element.

Figure 37:
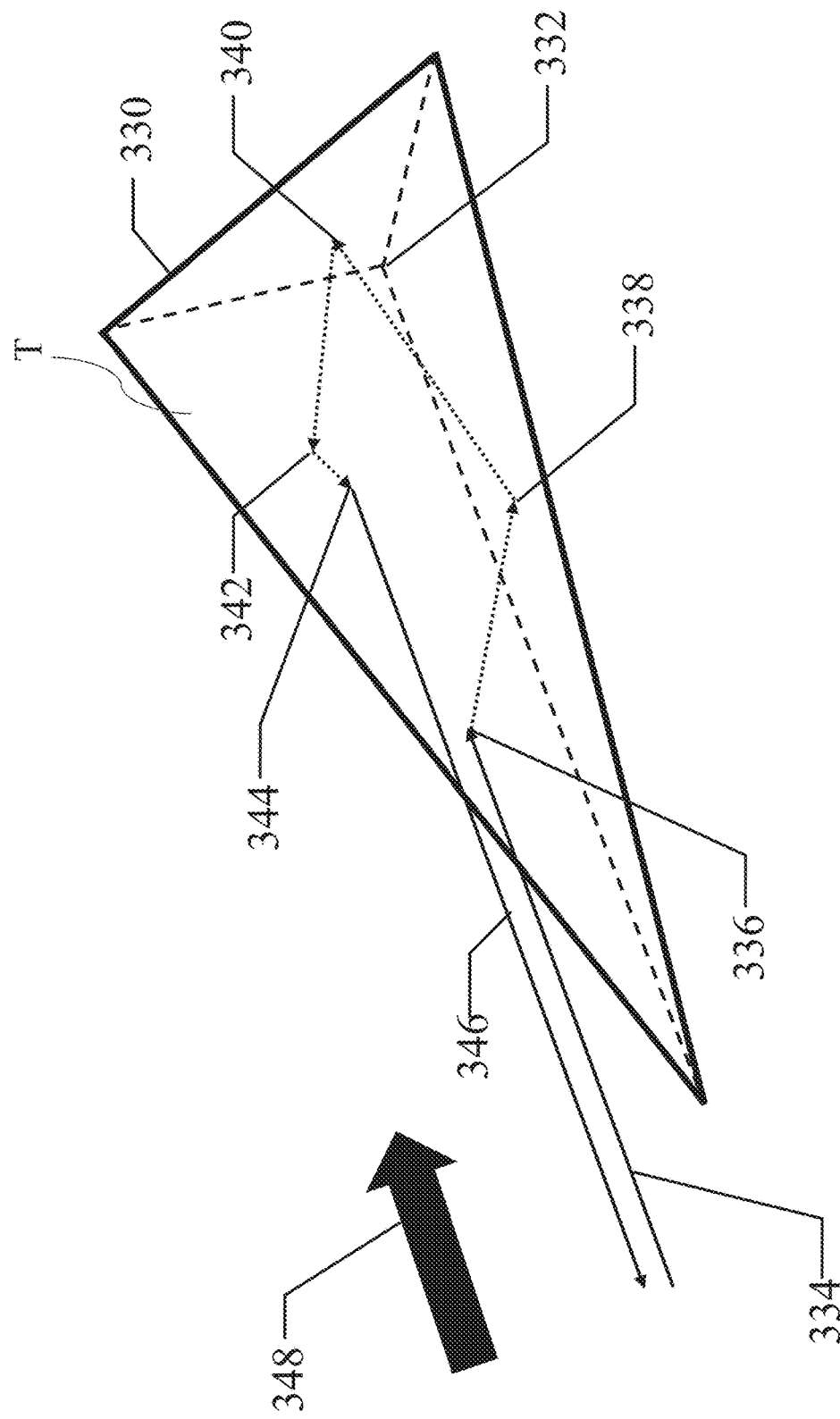
FIG. 37 illustrates ray tracing for incident, refracted, and reflected light in a canted cube corner reflective element, according to an embodiment.

FIG. 37 illustrates ray tracing for incident, refracted and reflected light in a canted cube corner reflector 330 in air ($\eta=1$) that enables highly directional performance for a longitudinal pavement marking embodiment. Highly directional performance refers to the performance of devices having a small range of entrance angles for which incident light is retroreflected after undergoing TIR within the reflector 330. Reflector 330 is anisotropic in that the range of incident entrance angles that results in high retroreflectivity is relatively small and focused around a single direction, indicated by arrow 348.

As shown in FIG. 37, an incident ray 334 encounters the top surface T of reflector 330. From top surface T, the ray is refracted into the reflector 330 at location 336. The refracted incident ray encounters a side surface at location 338 and is reflected. The first reflected ray encounters the end surface at location 340 and is reflected. The second reflected ray encounters an opposite side surface at location 342 and is reflected. The third reflected ray encounters the top surface at location 344 and is refracted as a ray 346 that is parallel to and in the opposite direction of the incident ray 334. The amount of reflection at locations 338, 340 and 342, representing reflections off two side surfaces and an end surface, will depend of the reflector 330 material type, the material type in which the reflector 330 is embedded, and the incident angles at which rays encounter surfaces relative to the three surface normal angles.

Figure 38:
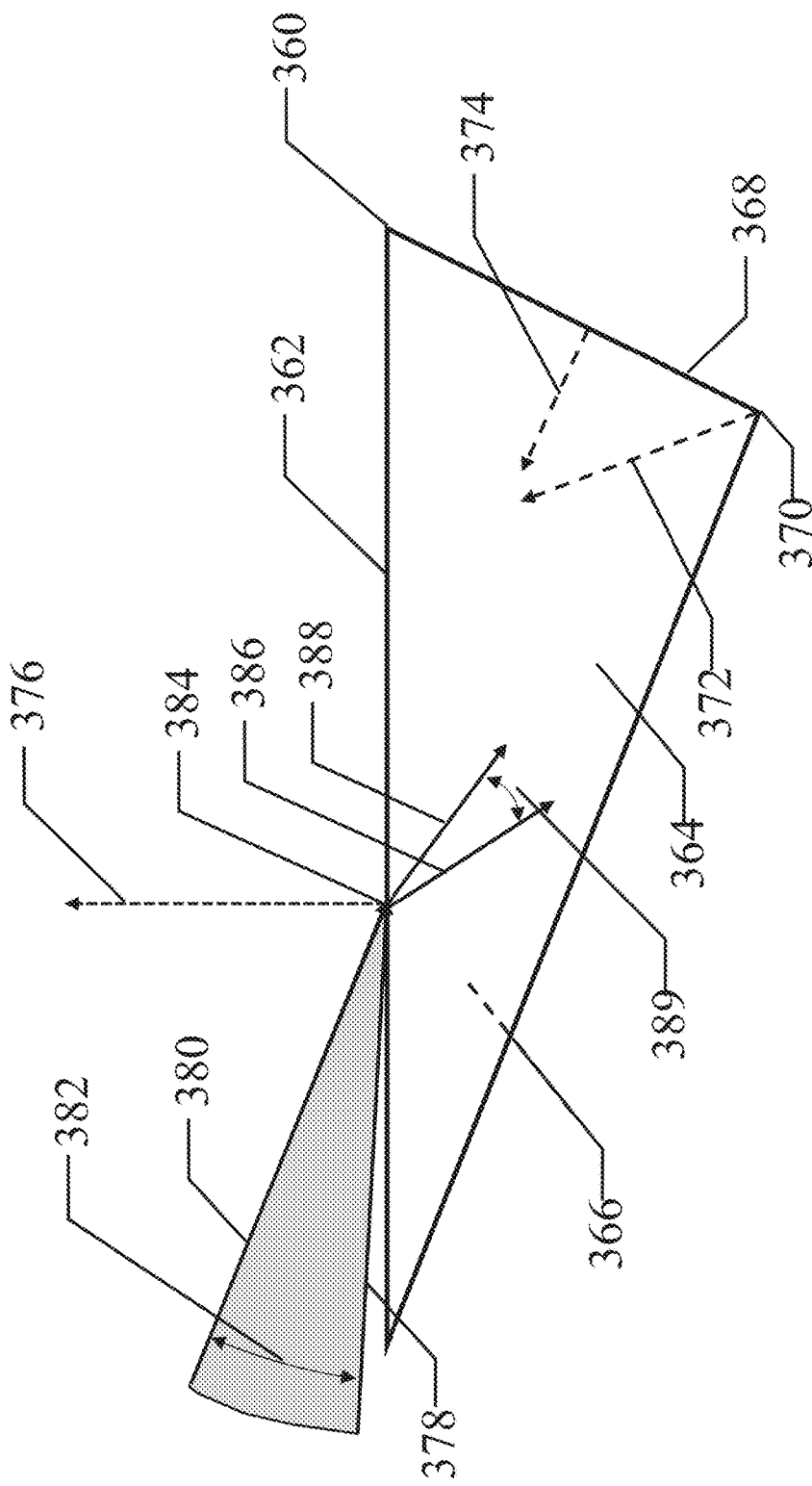
FIG. 38 illustrates shows a side view of a highly directional TIR reflective element according to an embodiment.

FIG. 38 shows a side view of a highly directional TIR reflector 360 for use in a longitudinal pavement marking embodiment. The reflector 360 is defined by a top surface 362 with a top surface normal angle 376, a right-side surface 364 where "right" is used to denote a side surface relative to a view aligned with the axis of a highly directional incident ray that experiences high TIR, a left-side surface 366, and an end surface 368. For the reflector 360 shown, the right-side surface 364, left-side surface 366 and the end surface 368 form a cube corner whereby all three surfaces connect at an apex 370 defined by an apex axis angle 372. Although shown as a ray in FIG. 38, it should be understood that the apex axis "angle" refers to the offset from vertical in that drawing, or in other words the angle between the ray indicated at 372 and the ray indicated as normal angle 376.

A range of entrance angles 382 indicates the minimum in-medium entrance angle 380 and maximum in-medium entrance angle 378 for the desired operating range for incident light for a reflector 360 with a highly directional response. Based on reflector 360 material properties and properties of the material into which a reflector 360 is embedded, a reflector 360 will experience TIR at one or more of the surfaces 364, 366, 368. Incident radiation from a medium like air or water will experience refraction at a location 384 at the top surface 362. As a result, the range of in-reflector ray angles 389, defined by the minimum in-reflector refracted ray angle 388 and the maximum in-reflector refracted ray angle 386 are determined according to Eq. 1. Due to the anisotropic, highly directional design and the apex axis angle 372 of the reflector 360, incident radiation may experience TIR at the right-side surface 364 and the left-side surface 366. Allowable ranges of the apex axis angle 372 are governed by the index of refraction of the medium, the index of refraction of the reflector 360 material, and the desired minimum in-medium entrance angle 380. In order for the end surface 368 to properly direct light into the cube corner construct as the first encountered surface or to properly direct light out of the cube corner construct as a second or third encountered surface, the end surface normal angle must conform to:

$$\text{Angle}_{EndSurfaceNormal} > \text{Angle}_{RefractedMinEntranceTIR} \qquad \text{Eq. 4}$$

Where $\text{Angle}_{EndSurfaceNormal}$ is the normal angle for the end surface, and $\text{Angle}_{RefractedMinEntranceTIR}$ is the refracted version of the minimum entrance angle for reflector TIR.

Utilizing the relationship for the normal angle 374 for the end surface relative to the apex axis angle 372 defined as:

$$\text{Angle}_{ApexAxis} = \text{Angle}_{EndSurfaceNormal} - 45° \qquad \text{Eq. 5}$$

Eqs. 1, 4, and 5 are combined to define the minimum apex axis angle as:

$$\text{Angle}_{ApexAxis} > 45 - \sin^{-1}[(\eta_1/\eta_2)*\sin\theta_1] \qquad \text{Eq. 6}$$

Where $\eta_1$ is the index of refraction of the medium $\eta_2$ is the index of refraction of the material used for a reflector, and $\theta_1$ is the minimum desired entrance angle of the incident ray encountering the reflector top surface.

For longitudinal pavement markings, it is desirable to have highly reflective reflectors that operate at entrance angles 382 of between about 80° and about 90°. Utilizing a minimum entrance angle of 80°, minimum apex axis angles 372 for reflectors produced with various materials ($\eta_2$) having an index of refraction greater than that of the medium (Ili), in accordance with Eq. 6, are as follows:

| Reflector Material Index of Refraction | Minimum Apex Axis Angle |
|---|---|
| 1.5 | −4.0° |
| 1.59 | −6.7° |
| 1.8 | −11.8° |
| 2.1 | −17.0° |
| 2.4 | −20.8° |

In addition to selecting an apex axis angle 372 to ensure cube corner performance for the end surface 68 for the desired range of entrance angles, it is desirable for the angle between 374 and 376 to be high enough to promote TIR at the right-side surface 364 and the left-side surface 366. By increasing the angles at which refracted rays encounter side surfaces 364, 366, materials may be utilized for reflector 360 production with lower indices of refraction while maintaining a high percentage of TIR at side surfaces 364, 366 for entrance angles 382 of between about 80° and about 90°.

Figure 39:
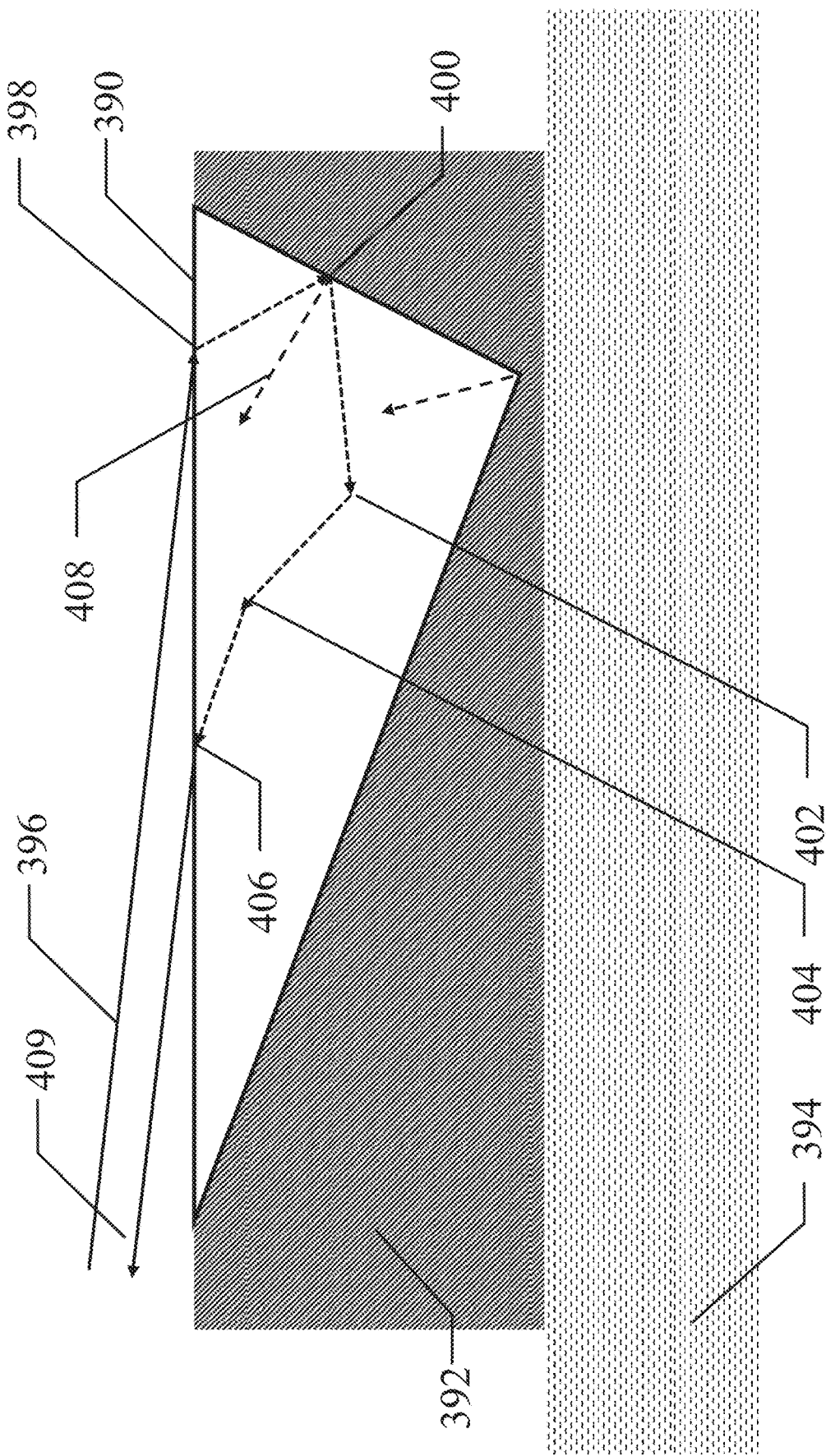
FIG. 39 illustrates an element embedded in a binder material, according to an embodiment.

FIG. 39 illustrates a side view of an anisotropic cube corner reflector 390 for use in a longitudinal pavement marking embodiment. The reflector 390 is embedded in a binder material 392 such that an arrangement of reflectors 390 in the binder material 392 form a mesh of retroreflectors that are affixed to the surface of a roadway 394. In embodiments, binder material 392 can be paint, thermoplastic material, thermoset material, or other curable material, among others. In some embodiments, the binder material 392 flows into and around each reflector 390 as shown in FIG. 39 to form the mesh of retroreflectors. In other embodiments, as shown for example in FIGS. 43A and 43B, the binder material 392 is one layer of a multilayer arrangement in which reflectors 390 are spaced apart in a pattern by another layer comprised of a matrix of material, standoffs and/or interconnecting structures.

As depicted in FIG. 39, an incident ray 396 encounters a point 398 at the top surface and is refracted into the reflector 390. The first refracted ray is reflected about the end surface normal angle 408 at point 400. The amount of reflected light depends on whether the reflection is TIR or specular reflection. The first reflected ray is reflected about one side surface normal angle at point 402 and is reflected about a second side surface normal angle at point 404. The resulting refracted and triple-reflected ray is refracted a second time at a point 406 at the top surface such that the outgoing ray 409 is substantially parallel to and in the opposite direction of the incident ray 396.

Figure 40:
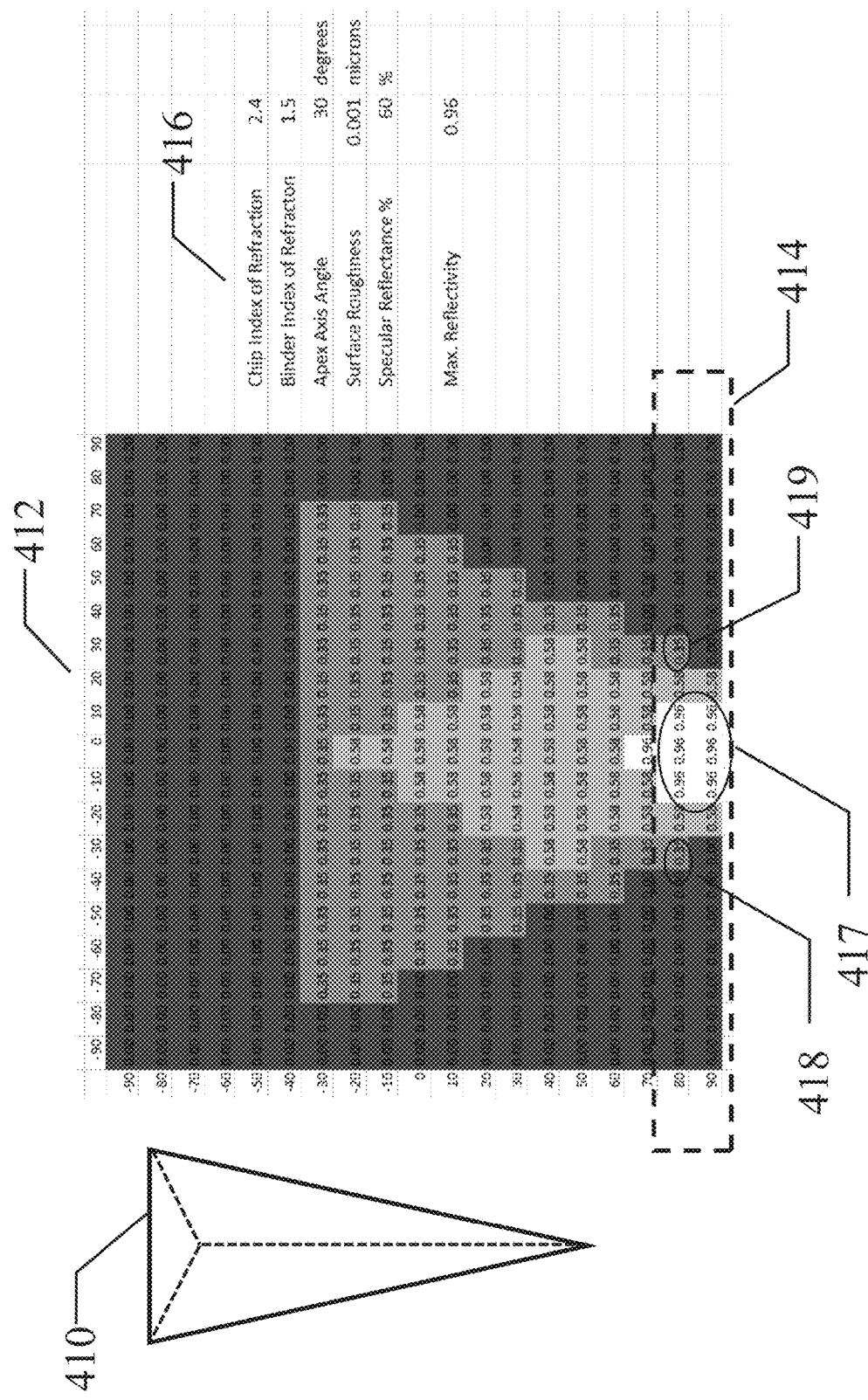
FIG. 40 illustrates the graphical output of a radiance model that determines the reflective performance of a reflective element, according to an embodiment.

FIG. 40 illustrates the graphical output of a radiance model that determines the reflective performance of a reflector 410 in accordance with various embodiments. The numbers in the radiance model reflectivity plot 412 denote the retroreflectivity of a single retroreflective element and will range from 0.00 for no retroreflectivity to 1.00 for total retroreflectivity with no losses. The cells in the reflectivity plot 412 refer to reflectivities at various possible entrance angles for a retroreflective element with a flat top/incident surface. Entrance angles are determined according to a horizontal entrance angle axis and a vertical entrance angle axis. A parameter table 416 denotes the construction of the retroreflective element. Based on the parameters in the table 416, the reflectivity is determined for the chosen geometry and material.

A radiance model reflectivity plot 412 is based on five selectable parameters. Reflector Index of Refraction refers to the refractive index of the material from which the reflector 410 is produced. Binder Index of Refraction refers to the refractive index of the material that abuts, interfaces to, or is adhered to the cube corner surfaces of the reflector 410. An apex axis angle of degrees refers to cube corner constructions whereby the apex axis angle is collinear to and in the same direction as the normal angle at the top surface of the reflector 410. Surface roughness refers to the average deviation of the ideal flat surface from the actual surface. Cube corner surfaces that are ideally flat and exhibit TIR will reflect 100% of an incident signal. Cube corner surfaces that exhibit roughness will result in TIR amounts that are less than 100%. For incident signals within a cube corner construct that encounter the face at an angle that is less than the critical angle, some or all of the signal will cross the boundary and will be subjected to specular reflectance at the surface boundary. The amount of specular reflectance will be less than 100% and will be determined by the specular reflectance properties of the binder material.

Reflector reflectivity is the total of all reflectivity at the three surfaces of a cube corner and is defined by Eq. 7 below:

$$\int_{\rho=-90}^{\rho=+90} \int_{\varphi=-90}^{\varphi=+90} \prod_{s=1}^{s=3} R(\theta.sub.s)$$

Where $\rho$=horizontal angle of incidence at the reflector top surface, $\varphi$=vertical angle of incidence at the reflector top surface, s is a variable representing the three surfaces of a cube corner construct, $R(\theta_s)$ is the reflectivity of the wave at the boundary of the surfaces of a cube corner construct, with:

R(θ$_s$)=1 for TIR, and

R(θs)=percent specular reflectance for non-TIR, and

θ$_s$ is the incident angle of a ray at the surface s relative to the surface s normal angle.

FIG. 40 illustrates a radiance model reflectivity plot 412 for a highly-directional reflective reflector 410 with parameter table 416 values as shown below:

| | |
|---|---|
| Reflector Index of Refraction | 2.4 |
| Binder Index of Refraction | 1.5 |
| Apex Axis Angle | 30 degrees |
| Surface Roughness | 0.001 microns |
| Specular Reflectance Percentage | 60% |

The selection of an index of refraction of 2.4 typically means the resulting reflector will be rigid and will likely have a high melting point, both of which are properties that can result in higher manufacturing costs. The binder index of refraction is selected at the high end of a range of possible binder materials that may include epoxy and/or polyurethane. The index of refraction of binder materials can range from 1.34 to 1.51 in such embodiments. A binder material with a higher index of refraction will place a stricter requirement on a reflector 410 from a TIR standpoint due to the lower difference in the indices of refraction between the binder and reflector, which results in a lower critical angle at the reflector-to-binder boundaries. An apex axis angle of 30 degrees results in the end surface of a highly-directional reflector 410 having a surface angle of −15° relative to the top surface normal angle. Because pavement markings produced with binder materials and microspheres utilize specular reflectance, binder materials for pavement markings will typically exhibit high specular reflectance values. A specular reflectance value of 60% in the parameter table 416 specifies that for signals that encounter a surface at an angle that is less than the critical angle, the reflected signal intensity will be 60% of the incident signal intensity.

For longitudinal pavement markings, it is desirable to have high-TIR reflector 410 whereby the best reflective performance is at entrance angles between 80° and 90° as denoted by reference number 414. Reflectivity values for this range 382 of vertical (or longitudinal) entrance angles are shown in FIG. 38. In embodiments that utilize materials and geometry that conform to the values from the parameter table 416, vertical (or longitudinal) entrance angles of 80 degrees will exhibit some TIR for horizontal (or lateral) entrance angles from −30 degrees as indicated at reference number 418 to +30 degrees as indicated at reference number 419. In embodiments that utilize materials and geometry that conform to the values from the parameter table 416, vertical (or longitudinal) entrance angles from 80 degrees to 90 degrees will exhibit TIR for all three cube corner surfaces for horizontal (or lateral) entrance angles from −10 degrees to +10 degrees as indicated at reference number 417.

FIGS. 41A and 41B illustrate a top view 450 and a side view 452 of a construction of a reflector mesh, respectively. In embodiments, the interconnected highly-directional reflectors 454, 456 are organized within the mesh to provide highly directional reflectivity for longitudinal pavement markings at entrance angles consistent with bi-directional vehicle traffic in two roughly diametrically opposing directions (similar to a conventional 2-way highway or road). In embodiments, reflectors 454, 456 are separated within the mesh to allow an air gap 458 between reflector 454, 456 edges, thus allowing in situ pavement markings to optically present two material types to sensing elements—the top surface of reflectors 454, 456 and the top, flat surface of the binder material to which the mesh is affixed and into which the mesh is embedded. Pavement marking binder material is typically installed on roadways or airport runways at predetermined thicknesses. In the United States, for example, binder thicknesses for pavement markings will typically be 0.012 inches to 0.025 inches for paint and epoxy and 0.040 inches to 0.1 inches for thermoplastic or methyl methacrylate. In embodiments, in order to avoid over-embedding of a reflector mesh into a binder, mesh standoff elements 460 are utilized to situate the top surface of reflectors a known height 462 above a roadway. In embodiments, a standoff 460 height 462 is typically equal to the binder thickness to which the mesh is affixed and into which the standoff 460 is embedded. In embodiments, a standoff 460 height 462 is greater than or equal to a maximum vertical dimension 464 of a reflector 454, 456.

Figures 42A, 42B:
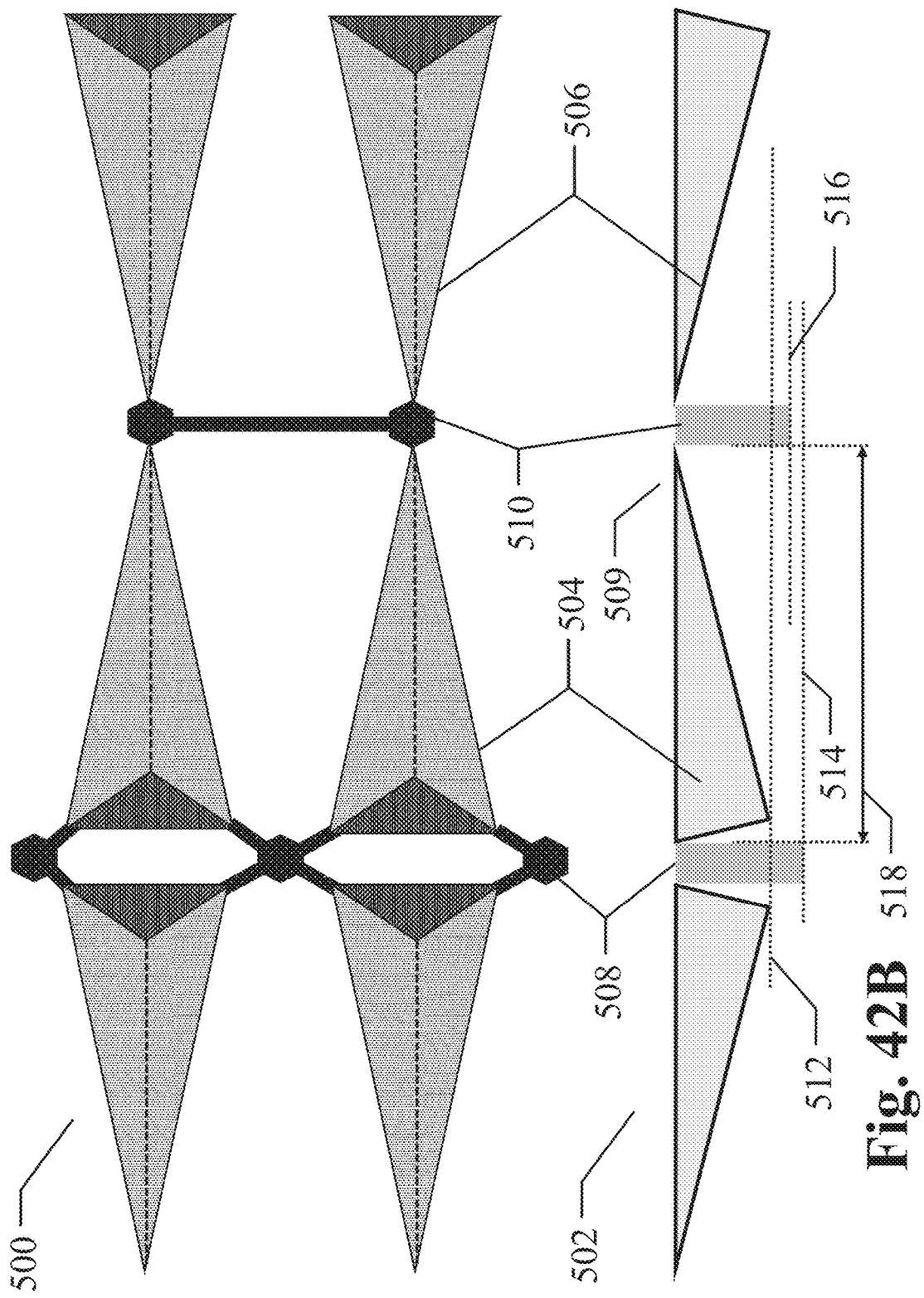
FIGS. 42A and 42B illustrate a bi-directional, longitudinal reflective mesh according to an embodiment.

FIGS. 42A and 42B illustrate a top view 500 and a side view 502, respectively, of a bi-directional, longitudinal reflective mesh for use in a normal-angle-controlling configuration. In embodiments, the interconnected highly-directional reflectors 504, 506 are arranged into the mesh 500 that also includes interconnecting components organized to provide highly directional reflectivity for longitudinal pavement markings at entrance angles consistent with bi-directional vehicle traffic in two opposing directions. In embodiments, all reflectors within a transverse section will have highly-directional incident angles that are parallel to and in substantially the same direction as one another, within manufacturing tolerances. Reflector 504 represents elements in a transverse section whereby highly-directional reflectivity will occur for incident rays from the right, as shown, and reflector 506 represents elements in a transverse section whereby highly-directional reflectivity will occur for incident rays from the left, as shown. In embodiments, in order to influence the tilting of reflectors 504, 506 toward incident radiation, high-side mesh standoff 508 elements and low-side mesh standoff elements 510 are utilized to situate the top surface of reflectors 504, 506 at a known height above a roadway and with a non-vertical normal angle. In embodiments, a high-side standoff 508 height 514 is typically equal to the binder thickness to which the mesh is affixed and into which the high-side standoff 508 is embedded. In embodiments, a high-side standoff 508 height 514 and a low-side standoff 510 height 516 are greater than or equal to a maximum vertical dimension 512 of a reflector 504, 506. In embodiments, a high-side standoff 508 height 514 is greater than a low-side standoff 510 height 516 and, whereby a known distance 518 between standoffs 508, 510 defines the angle at which the normal to the top surface of a reflector 504, 506 will deviate from vertical and is computed according to:

$$\theta_N = \tan^{-1}(h_{high\text{-}side} - h_{low\text{-}side})/d \qquad \text{Eq. 8}$$

where θ$_N$ is the normal angle for the top surface of a reflector, with 0° degrees defined as vertical, h$_{high\text{-}side}$ is the height of a high-side standoff, h$_{low\text{-}side}$ is the height of a low-side standoff, and d is the distance between the edges of a high-side standoff and a low-side standoff.

In embodiments, anisotropic reflective mesh that utilizes high-index-of-refraction reflectors 504, 506 will utilize a rigid transparent material for reflector 504, 506 construction and a flexible material like transparent polycarbonate for the mesh-creating adhesion material 509. In embodiments, standoffs 508, 510 are produced utilizing the same mesh-creating adhesion material 509 and are formed as part of the same molding or web process that yielded the mesh components. In embodiments, standoff 508, 510 height is selected so the tilted surface normal angle of reflectors 504, 506 is between about two degrees and about eight degrees.

Figure 43A:
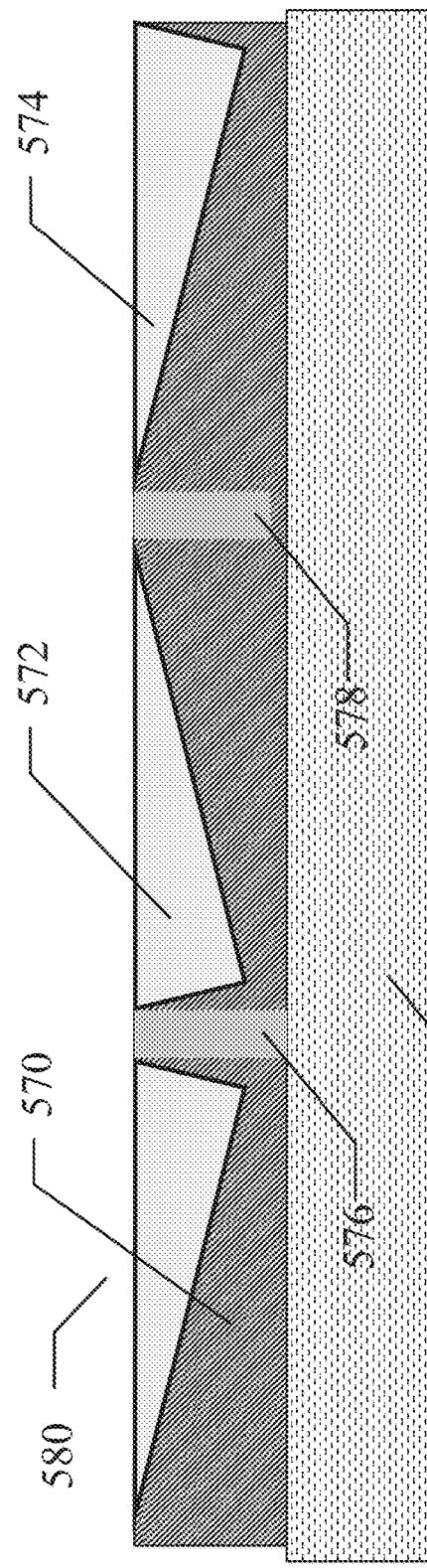
FIGS. 43A and 43B illustrate a pavement marking construction configured to maintain a uniform surface, according to an embodiment.
Figure 43B:
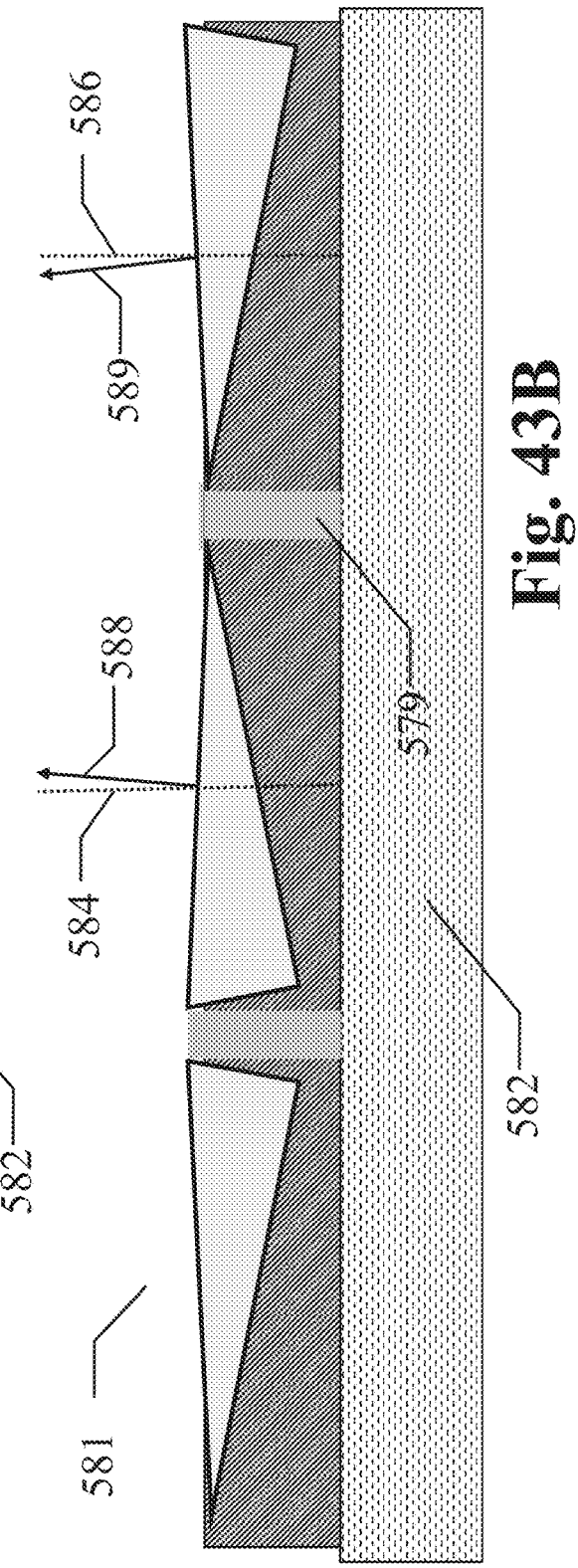

In embodiments, reflective mesh is installed in situ into a binder layer for field-installed pavement markings or is installed in a factory into a binder or adhesive layer for reflective tape products. In embodiments, factory-installed or field-installed reflective mesh with staggered-height standoffs procedures utilize a vertical pressure step to determine the orientation of the tilted surface normal angles for the individual reflector surfaces. FIG. 43A illustrates a pavement marking construction 580 before application of a vertical pressure step, and FIG. 43B depicts the same pavement marking construction 581 after the application of a vertical pressure step. In embodiments, a reflective mesh is affixed to and installed into an uncured, partially-cured, molten, or semi-molten binder 570, the mesh including a right-facing reflector 572, a left-facing reflector 574, a high-side standoff 576, and a low-side standoff 578. A high-side standoff 576 is shown before 580 pressure application with a bottom surface abutting a roadway surface 582. The standoffs 576, 578 extend primarily perpendicularly to the roadway (i.e., along a primary axis parallel to the normal axes of the plurality of reflectors 572, 574). A low-side standoff 578 is shown before 580 pressure application with a bottom surface that is not abutting a roadway surface 582. In embodiments, a low-side standoff 579 is shown after 581 pressure application with a bottom surface that is abutting a roadway surface 582. Upon pressure application, a right-facing reflector has a tilted surface normal angle 588 that varies from vertical 584 by an amount determined by Eq. 9. Upon pressure application, a left-facing reflector has a tilted surface normal angle 589 that varies from vertical 586 by an amount determined by Eq. 8.

In embodiments, anisotropic reflective mesh is produced without the use of standoffs. A two-material mesh consisting of high-index-of-refraction, rigid, transparent, highly-directional cube corner reflectors and interconnected mesh material. In embodiments, the mesh interconnect orients the normal angles of reflectors during the factory manufacturing process, thus negating the need for a pressure application step for in situ pavement marking assembly or negating the need for a pressure application step for reflective tape manufacturing. Reflector normal angles for factory-produced anisotropic, two-material reflective mesh is selected so the tilted surface normal angle of reflector surfaces is between about two degrees and about eight degrees.

FIG. 44 illustrates a radiance model reflectivity plot 544 for a reflective mesh produced with highly-directional reflective elements 540, 542 oriented along a longitudinal axis in opposite directions with parameter table values as shown below:

| | |
|---|---|
| Reflector Index of Refraction | 2.4 |
| Binder Index of Refraction | 1.5 |
| Apex Axis Angle | 30 degrees |
| Surface Roughness | 0.001 microns |
| Specular Reflectance Percentage | 60% |

The intensity plot 544 indicates that for embodiments that utilize materials and geometry that conform to the values from the parameter table 546, vertical (or longitudinal) entrance angles of +80 degrees and −80 degrees will exhibit some TIR for horizontal (or lateral) entrance angles from −30 degrees to +30 degrees. In embodiments that utilize materials and geometry that conform to the values from the parameter table 546, vertical (or longitudinal) entrance angles from +80 degrees to +90 degrees and from −80 degrees to −90 degrees will exhibit TIR for all three cube corner surfaces for horizontal (or lateral) entrance angles from −10 degrees to +10 degrees.

In the United States, for example, binder thicknesses for pavement marking will typically be 0.012 inches to 0.025 inches for paint and epoxy and 0.040 inches to 0.1 inches for thermoplastic or methyl methacrylate. In embodiments, reflective mesh products may be provided with standoffs at a set of different standard heights to accommodate different ranges of binder thicknesses. In embodiments, a reflective mesh is produced whereby tilting of reflector normal angles from vertical is achieved during mesh manufacturing. In embodiments, for a factory-tilted reflective mesh, standoff heights are smaller than the maximum vertical dimension of a reflector.

In other embodiments, a mesh need not be required in order to align reflectors to create an anisotropic effect. By removing interstitial components, the complexity and materials requirements to manufacture such embodiments can be decreased. In one embodiment, reflectors can be aligned by statically charging the reflective elements and then placing them within an electromagnetic field E. Because static charge will primarily gather at the tip thereof, each of the reflectors can function essentially as a small compass and self-align due to the force applied by the electric field upon each reflector.

Figure 45:
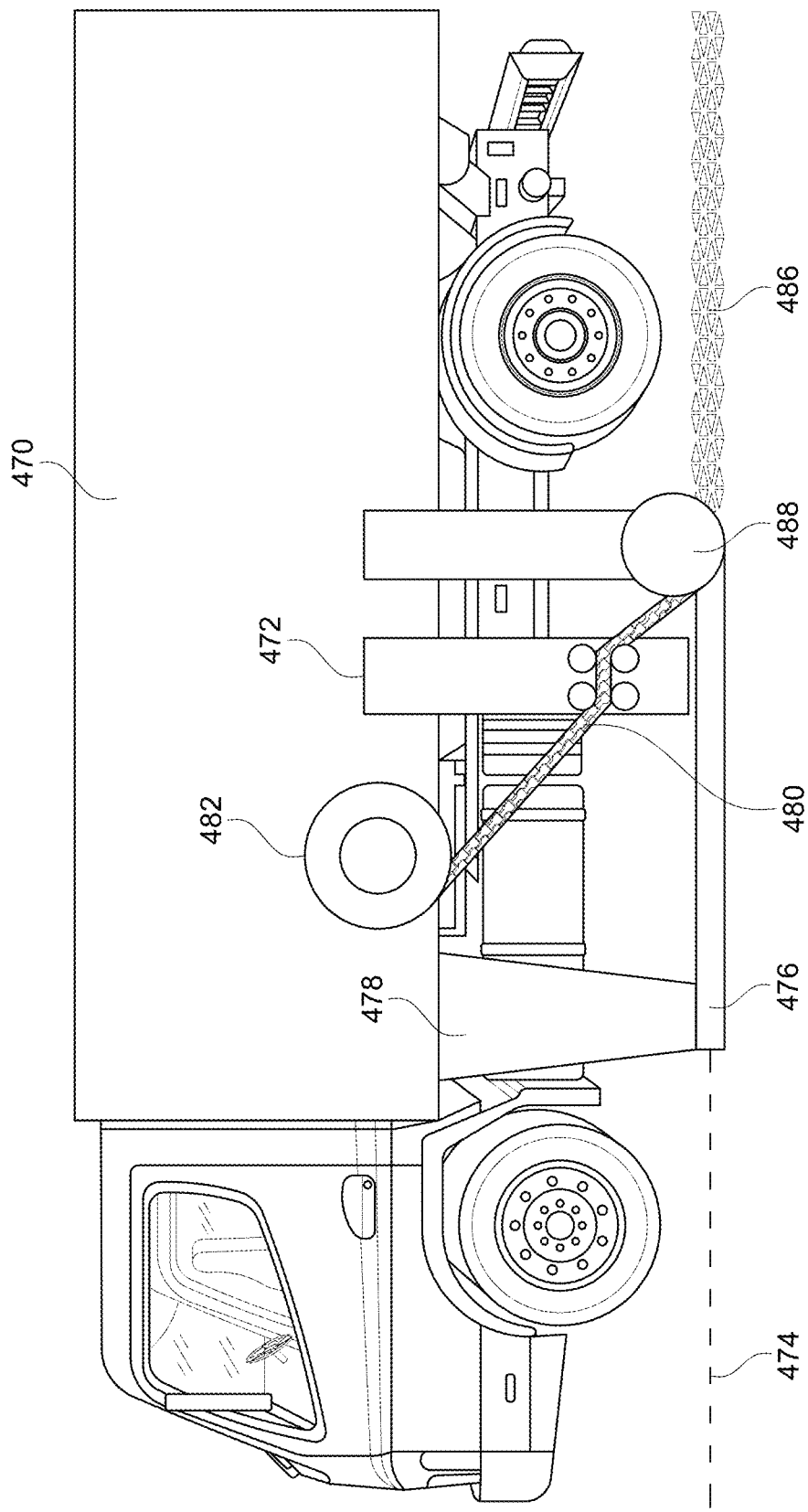
FIG. 45 illustrates a vehicle configured to install a binder and a reflective mesh, according to an embodiment.

FIG. 45 illustrates embodiments for a vehicle 470 utilized for installation of binder 476 and a reflective mesh 480. A vehicle 470 disposes a binder 476 along a desired longitudinal path 474 on a roadway. Binder 476 is disposed from a mechanism 478 that controls the thickness and location of the binder 476 and could be similar to a conventional lane marking painting apparatus in some embodiments. In embodiments, a reflective mesh 480 is directed by a supply spool 482. As the reflective mesh 480 is directed below a pressure applicator 488, the reflectors from the mesh 480 are transferred to and embedded in the binder 476. In embodiments, a cutting/feeding station 472 controls the feeding of the mesh 480 to the pressure applicator 488 and cuts the mesh 480 to the desired length for termination of a solid longitudinal line or to the desired length for a longitudinal skip line. In embodiments, the result of the installation process is a longitudinal pavement marking 486 with exposed binder and the top side of exposed reflectors in a flush-mounted configuration, thus allowing optical access to both optical components (binder and reflectors) for vehicles traversing a roadway.

Figure 46:
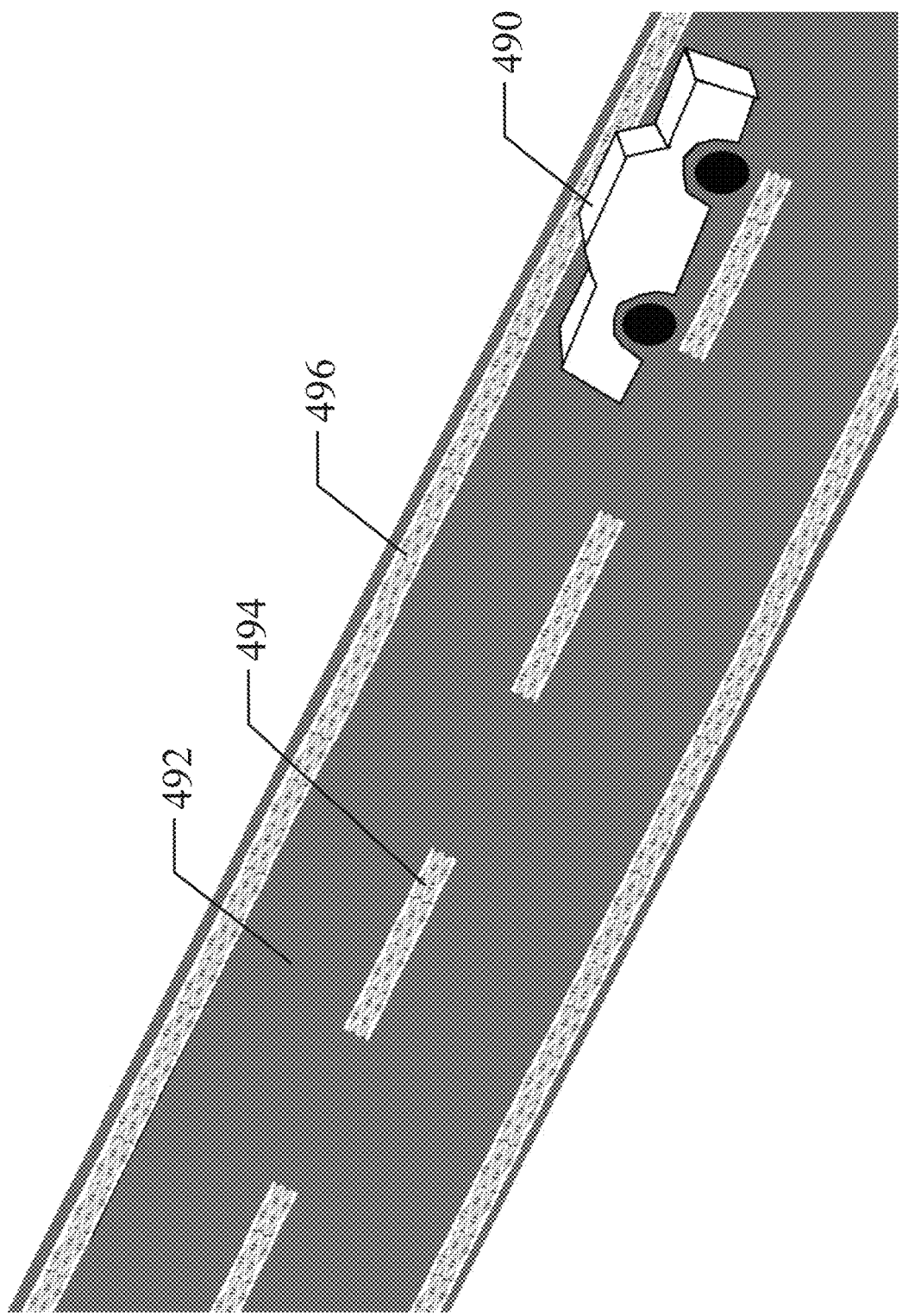
FIG. 46 illustrates a roadway having pavement markings applied by the vehicle of FIG. 38, according to an embodiment.

FIG. 46 illustrates embodiments for a vehicle 490 traversing a roadway 492 equipped with pavement markings that include a longitudinal skip line 494 and a longitudinal edge line 496. In embodiments, the longitudinal pavement markings are installed with a binder material affixed to the roadway 492 and a reflective mesh affixed to and embedded in the binder. In embodiments, the reflectors that are built into the mesh are highly directional and oriented in two longitudinal directions, thus providing superior reflective properties to vehicles 490 traveling the roadway 492 in the shown direction and in the direction parallel to and opposite the shown direction.

Longitudinal pavement markings are designed and installed to provide reflective performance at entrance angles that approach 90 degrees. For reflective elements with a flat top surface, the orientation of the normal angle of the surface will determine how well the flat-surfaced elements perform. It is desirable to have a reflective mesh whereby the tilted surface normal angles for top surfaces are tilted slightly toward the incident radiation, thus ensuring adequate entry of the incident rays into the reflector and ensuring proper three-surface reflectivity throughout the cube corner construct.

In embodiments, longitudinal skip lines 494 or longitudinal edge lines 496 can be embedded into the surface of roadway 492 at a depth by grinding away roadway 492 corresponding to the contours of those lines. As such, the potential for damage from plows or other abrasion, grinding, or peeling can be reduced. In some embodiments, a mesh of retroreflective reflectors can be embedded relatively deeply within the lines (494, 496) such that surface abrasion does not cause loss of retroreflectivity. One advantage of a mesh of retroreflectors is that they may be less easily mechanically removed from the rest of the mesh superstructure than, for example, loose retroreflective beads.

U.S. Pat. No. 8,591,044 (Budd) discloses micro sphere construction utilizing mixtures of high index of refraction (greater than 2.3) compounds in an attempt to lower overall melting points and exhibit favorable crystallization on heat treatment. Table II in Budd specifies examples of compositions and their corresponding indices of refraction in which the material amounts are presented in percentage by weight and for which the compositions provide for relatively lower melting points and still yield an index of refraction of greater than 2.3:

| $TiO_2$ | $ZrO_2$ | $La_2O_3$ | CaO | SrO | BaO | Index of Refraction |
|---|---|---|---|---|---|---|
| 69.73 | 6.99 | 5.54 | 5.87 | 3.18 | 8.69 | 2.38 |
| 73.80 | 7.39 | 5.86 | 6.22 | 6.73 | 0.00 | 2.42 |
| 71.53 | 6.57 | 5.21 | 5.53 | 2.99 | 8.18 | 2.40 |
| 68.46 | 6.86 | 5.44 | 5.77 | 3.12 | 8.53 | 2.39 |
| 76.97 | 10.94 | 0.00 | 0.00 | 0.00 | 12.09 | N/A |
| 67.80 | 13.95 | 9.22 | 5.86 | 3.17 | 0.00 | 2.404 |
| 69.67 | 12.73 | 9.35 | 3.96 | 4.29 | 0.00 | 2.482 |
| 67.17 | 12.27 | 9.01 | 3.82 | 2.07 | 5.66 | 2.410 |
| 69.10 | 14.21 | 5.64 | 7.17 | 3.88 | 0.00 | 2.435 |
| 66.83 | 13.75 | 5.45 | 4.62 | 2.50 | 6.84 | 2.408 |
| 65.94 | 13.57 | 8.97 | 0.00 | 3.09 | 8.44 | 2.417 |
| 64.80 | 13.90 | 7.40 | 0.00 | 13.90 | 0.00 | 2.42 |
| 71.45 | 14.70 | 5.83 | 8.03 | 0.00 | 0.00 | 2.45 |

Budd, however, only teaches the use of compounds like these in connection with making microspheres by melting and quenching the raw materials to form the microspheres.

In various embodiments, reflective corner cube elements are produced with materials that exhibit a high index of refraction, high transparency for wavelengths from 400-1000 nm, lower overall melting points, favorable crystallization on heat treatment, and otherwise suitable for use in the production and distribution of microspheres, such as the compounds described by Budd. In other embodiments, high index of refraction and high transparency for wavelengths from 400-1800 nm may be obtained by varying percentages of a primary alkaline earth component, such as $TiO_2$, in a compound that may have ranges of at least 10%, of at least 40-50%, or of at least 65%. In other embodiments, additional alkaline earth components, such as CaO, may be included in smaller ranges such as less than 0.5% or less than 5%.

Even with such lower melting point materials, higher-temperature processes are still required—processes that don't typically lend themselves to a web-based, continuous production process typically used for production of the web-based mesh in which these kinds of reflective cub corner elements are incorporated. In embodiments, high index of refraction compounds with high-temperature, but relatively lower overall melting points are utilized in a web-based casting process whereby lateral and longitudinal tensioning features and process are implemented to orient corner cube reflective elements appropriately within a web-based construction.

FIGS. 47A and 47B illustrate a top view 700 and a side view 702, respectively, of a bi-directional, longitudinal reflective mesh for use in a normal-angle-controlling configuration. In embodiments, the interconnected highly-directional reflectors 704, 706 are arranged into the mesh 700 that also includes interconnecting components organized to provide highly directional reflectivity for longitudinal pavement markings at entrance angles consistent with bi-directional vehicle traffic in two opposing directions. In embodiments, all reflectors within a transverse section will have highly-directional incident angles that are parallel to and in substantially the same direction as one another, within manufacturing tolerances. Reflector 704 represents elements in a transverse section whereby highly-directional reflectivity will occur for incident rays from the right, as shown, and reflector 706 represents elements in a transverse section whereby highly-directional reflectivity will occur for incident rays from the left, as shown.

In embodiments, in order to influence the tilting of reflectors 704, 706 toward incident radiation, high-side lateral tensioning 708 elements and low-side lateral tensioning elements 710 are utilized to, upon subsequent longitudinal tensioning of a mesh, orient the top surface of reflectors 704, 706 at a defined non-vertical normal angle. FIG. 47B illustrates the orientation of reflective elements prior to longitudinal tensioning but after reflective material casting and cooling. Pre-longitudinally-tensioned mesh elements have a horizontal top surface and laterally-tensioned elements that form an angle 712 that, upon longitudinal tensioning, determine the tilt angle of the top surface of the reflective element. In embodiments, the angle at which the normal to the top surface of a reflector 704, 706 in a longitudinally-tensioned mesh will deviate from vertical is computed according to:

$$\theta_N = \tan^{-1}(h_{vertical}/d_{horizontal}) \qquad \text{Eq. 9}$$

where $\theta_N$ is the normal angle for the top surface of a reflector, with 0° degrees defined as vertical, $h_{vertical}$ is the vertical offset between the a high-side and a low-side lateral tensioning element, $d_{horizontal}$ is the horizontal offset between the a high-side and a low-side lateral tensioning element.

Figure 48:
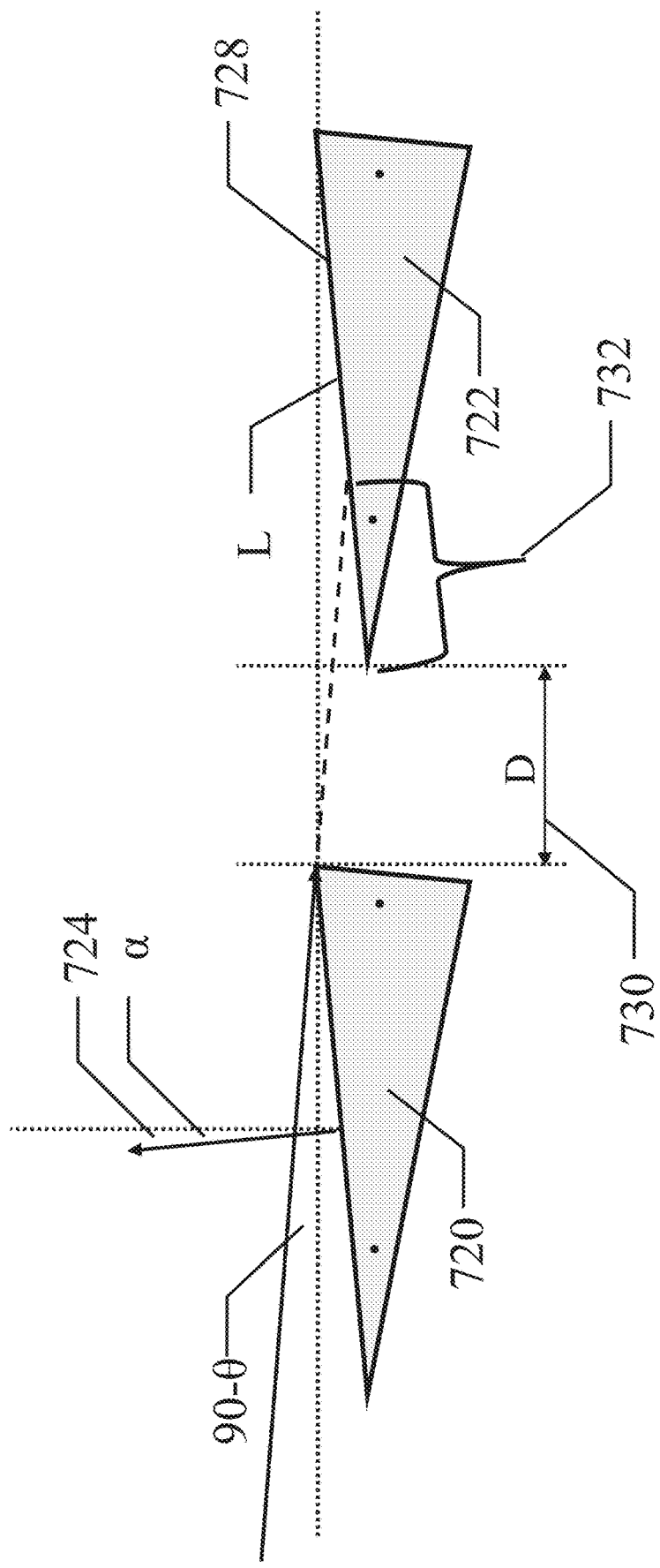
FIG. 48 illustrates a reflective element longitudinal offset and the effect of shadowing.

For pavement markings with densely-placed reflective elements, shadowing can occur at the top surface of a reflective element when a nearby reflective element casts a shadow 732 for incident light at a large entrance angle. FIG. 48 depicts two reflective elements 720, 722 in an anisotropic configuration for a pavement marking. The top surface 728 of a shadowed element 722 has a length L and is positioned at a distance D 730 from a shadow-producing element 720. The maximum entrance angle at which shadow 732 removal occurs is defined as 0 and the reflective element tilt angle from vertical is defined as a 724. For reflective article spacing at large entrance angles when reflective articles incorporate tilting of the top surface, the minimum offset between reflective articles is:

$$D = [L^* \sin \alpha]/[\tan(90-\theta)] \qquad \text{Eq. 10}$$

Where L is the longitudinal length of the top surface of a reflective article

α is the tilt angle (from vertical) of the top surface of a reflective element

θ is the maximum entrance angle for shadow-free placement

In the United States, in accordance with ASTM E1710-05 (dry conditions) and ASTM E2177 (wet conditions), pavement markings are assessed and retroreflectivity is measured at an entrance angle of 88.76 degrees. Minimum reflective article offsets for various mesh geometries, as determined by Eq. 10, are as follows:

| Article Length (in.) | Entrance Angle | Tilt Angle | Minimum Offset (in.) |
|---|---|---|---|
| 0.1 | 88.76° | 2° | 0.161 |
| 0.1 | 88.76° | 3° | 0.242 |
| 0.1 | 88.76° | 4° | 0.322 |
| 0.1 | 88.76° | 5° | 0.403 |
| 0.1 | 88.76° | 6° | 0.483 |
| 0.1 | 88.76° | 7° | 0.563 |
| 0.1 | 88.76° | 8° | 0.643 |
| 0.08 | 88.76° | 2° | 0.129 |
| 0.08 | 88.76° | 3° | 0.193 |
| 0.08 | 88.76° | 4° | 0.258 |
| 0.08 | 88.76° | 5° | 0.322 |
| 0.08 | 88.76° | 6° | 0.386 |
| 0.08 | 88.76° | 7° | 0.450 |
| 0.08 | 88.76° | 8° | 0.514 |
| 0.06 | 88.76° | 2° | 0.097 |
| 0.06 | 88.76° | 3° | 0.145 |
| 0.06 | 88.76° | 4° | 0.193 |
| 0.06 | 88.76° | 5° | 0.242 |
| 0.06 | 88.76° | 6° | 0.290 |
| 0.06 | 88.76° | 7° | 0.338 |
| 0.06 | 88.76° | 8° | 0.386 |

Figure 49:
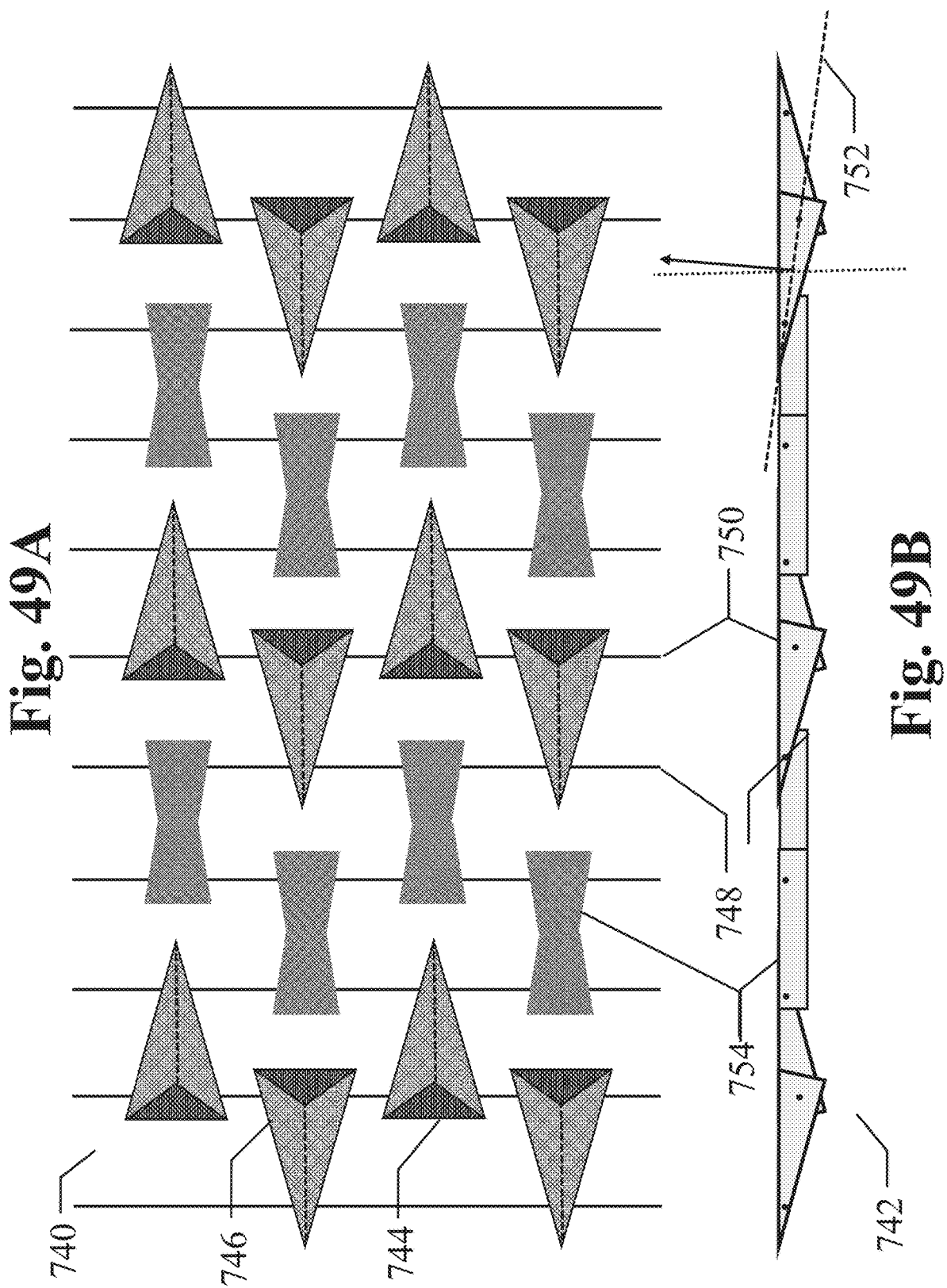
FIGS. 49A and 49B illustrate a top and side view of a reflective mesh produced with high-index-of-refraction elements in a bi-directionally-tensioned configuration with sufficient longitudinal offset to reduce or eliminate shadowing.

FIGS. 49A and 49B illustrate a top view 740 and a side view 742, respectively, of a bi-directional, longitudinal reflective mesh for use in a normal-angle-controlling configuration. In embodiments, the interconnected highly-directional reflectors 744, 746 are arranged into the mesh 740 that also includes interconnecting components organized to provide highly directional reflectivity for longitudinal pavement markings at entrance angles consistent with bi-directional vehicle traffic in two opposing directions. In embodiments, all reflectors within a transverse section will have highly-directional incident angles that are parallel to and in substantially the same direction as one another, within manufacturing tolerances. Reflector 744 represents elements in a transverse section whereby highly-directional reflectivity will occur for incident rays from the right, as shown, and reflector 746 represents elements in a transverse section whereby highly-directional reflectivity will occur for incident rays from the left, as shown. In embodiments, in order to influence the tilting of reflectors 744, 746 toward incident radiation, high-side lateral tensioning 748 elements and low-side lateral tensioning elements 750 are utilized to, upon subsequent longitudinal tensioning of a mesh, orient the top surface of reflectors 744, 746 at a defined non-vertical normal angle. FIG. 49B illustrates the orientation of reflective elements prior to longitudinal tensioning but after reflective material casting and cooling. Pre-longitudinally-tensioned mesh elements have a horizontal top surface and laterally-tensioned elements that form an angle 752 that, upon longitudinal tensioning, determine the tilt angle of the top surface of the reflective element. In embodiments, the longitudinal spacing of reflective elements is selected to reduce or eliminate shadowing whereby the longitudinal spacing is selected in accordance with Eq. 10. Rigid elements 754 are implemented in the casting process to provide longitudinal support for consecutive lateral tensioning features.

Figure 50:
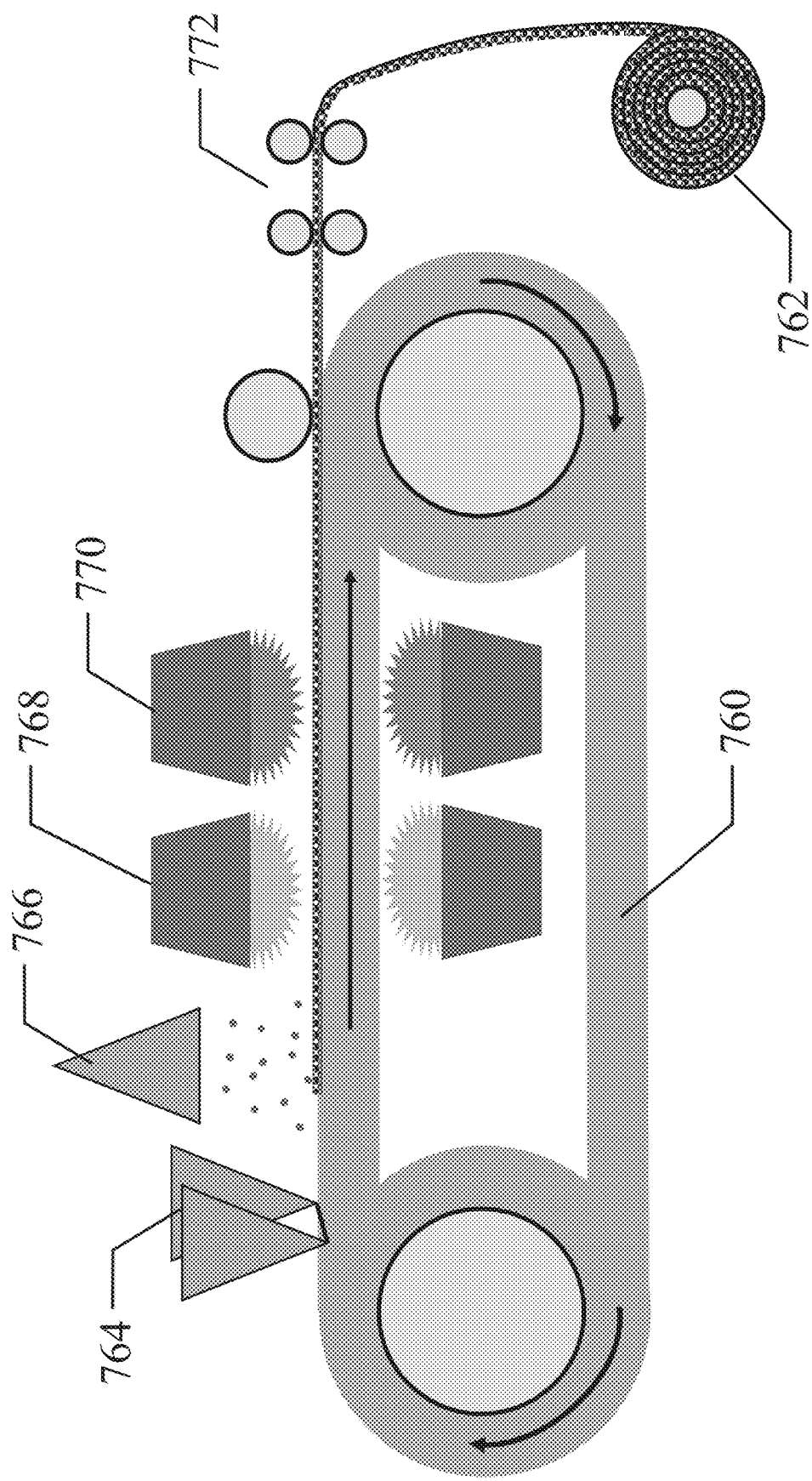
FIG. 50 illustrates a web-based reflective mesh manufacturing process for high-melting-point reflective element materials.

FIG. 50 illustrates a web-based, laterally- and longitudinally-tensioned mesh production process. In embodiments, a continuous conveyor 760 includes casting wells for the forming of reflective elements and includes features for the placement of lateral tensioning elements. In embodiments, a first stage 764 inserts thin elements that are laterally tensioned upon insertion. Lateral elements are made of materials like metallic wire, carbon nanotubes or other material that will maintain lateral rigidity when placed under tension. In embodiments, a second stage 766 places a powdered form of the reflective material compound into casting wells. In embodiments, a third stage 768 heats the powder to a temperature beyond the melting point, allowing the molten material to settle into the casting wells and form the shapes of the reflective elements. At the third stage 768 the top surfaces of the formed reflective elements are horizontal. In embodiments, a fourth stage 770 cools the reflective elements below the crystallization temperature. In embodiments, a longitudinal-tensioning stage 772 introduces longitudinal tensioning, which has the effect of rotating the top surfaces of reflective elements according to Eq. 9. In embodiments, fully-tensioned reflective mesh is collected on a spool 762.

Figure 51:
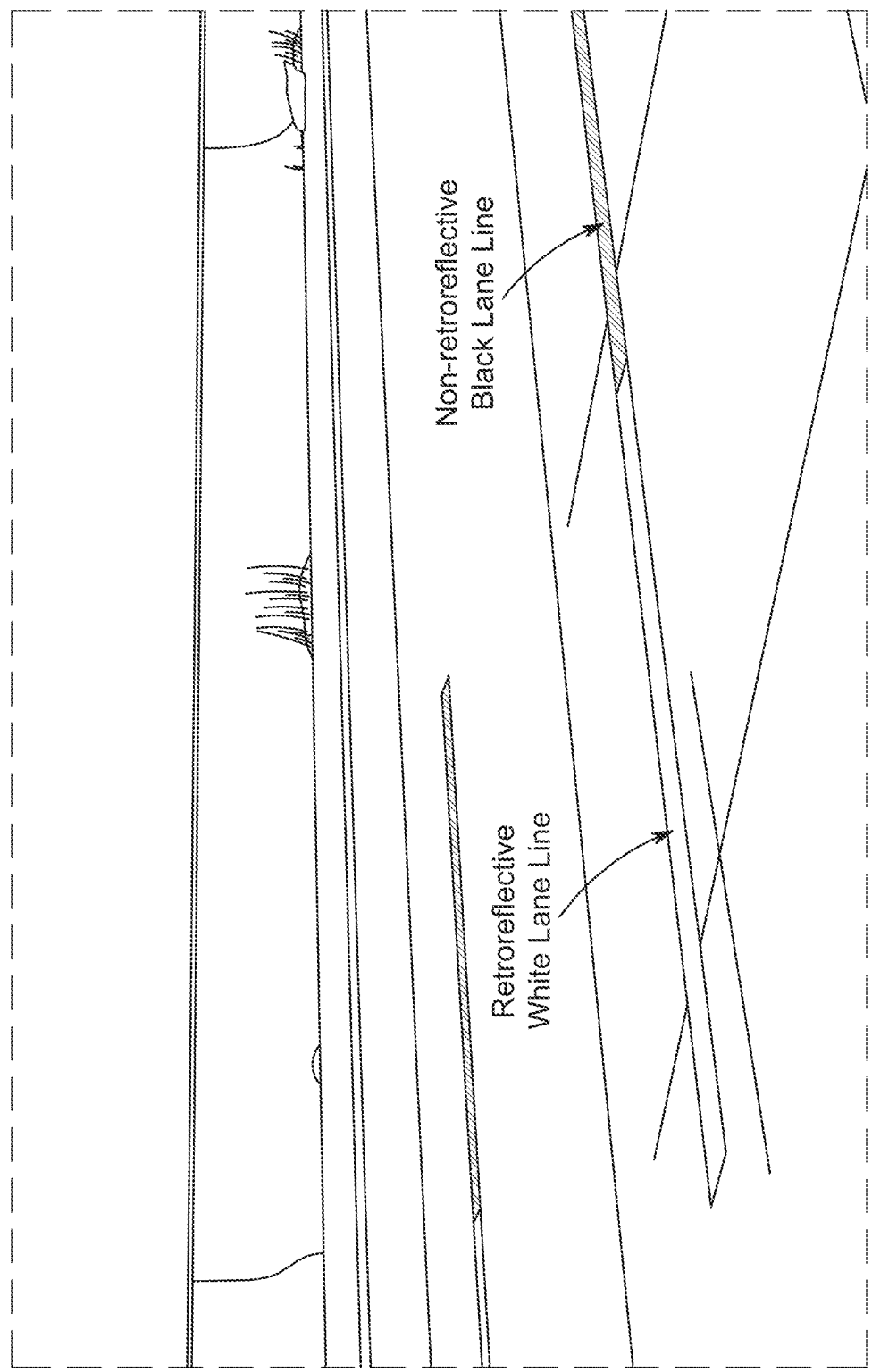
FIGS. 51-53 depict contrast road markings.
Figure 52:
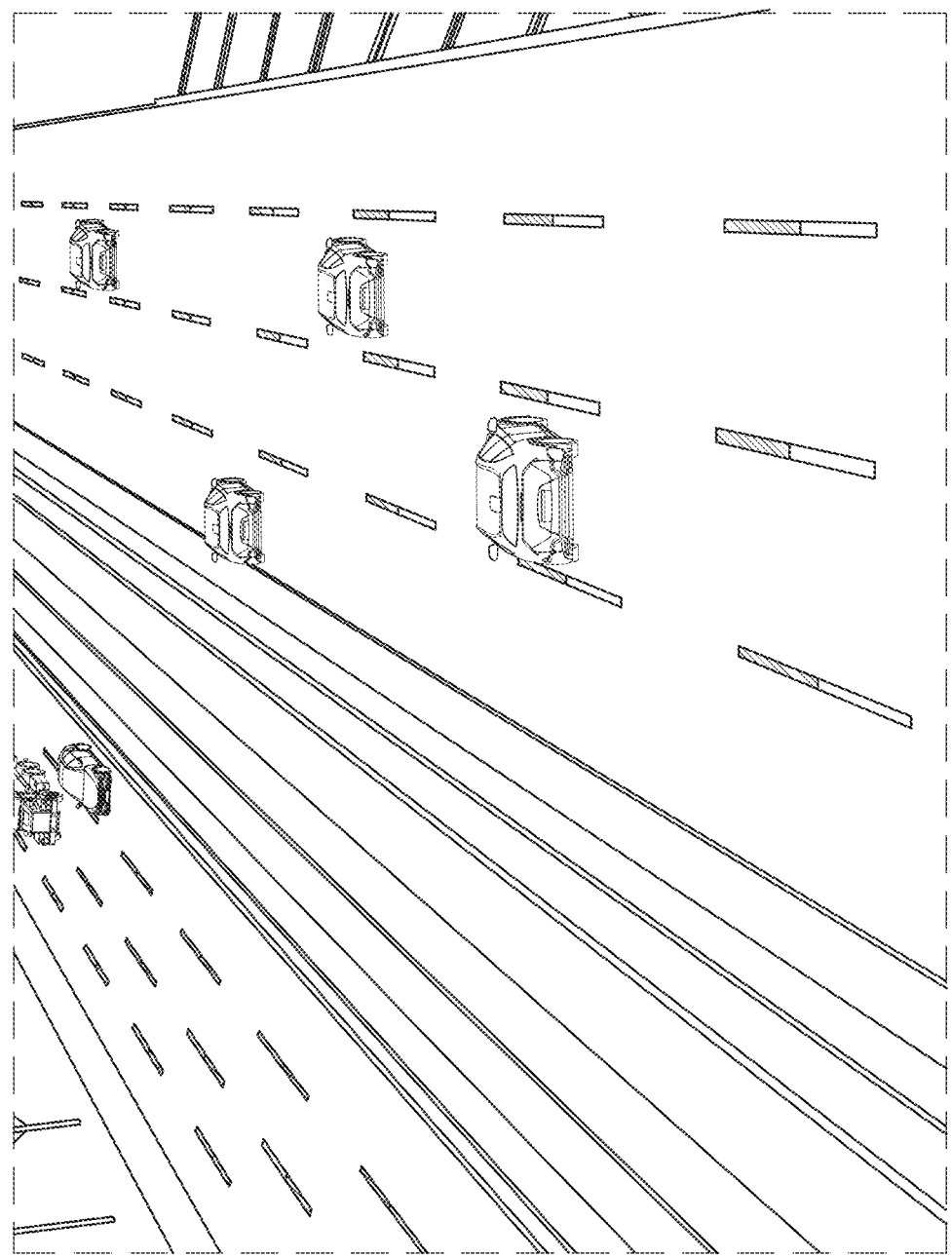
Figure 53:
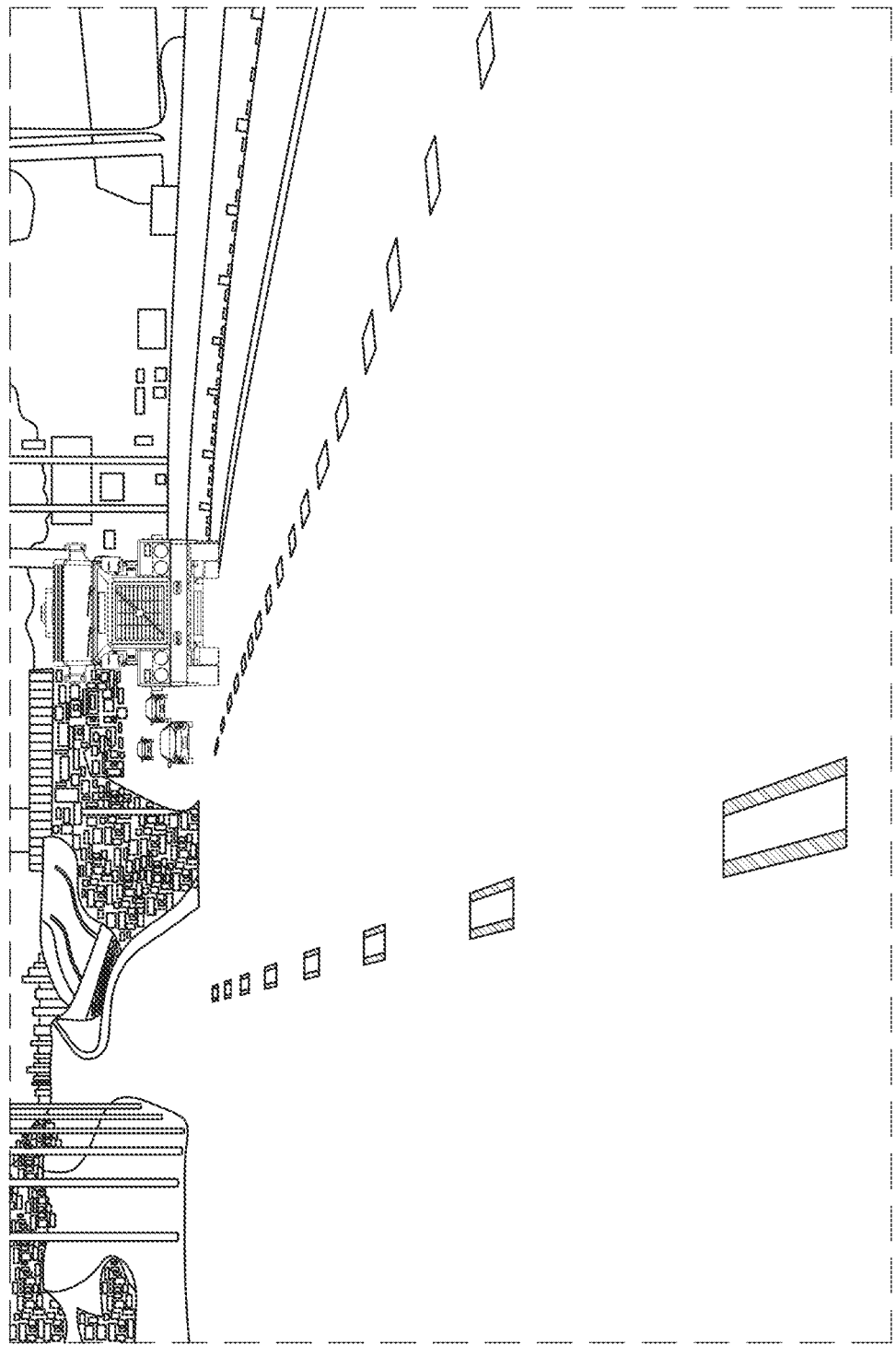

FIGS. 51-53 depict two constructions of contrast road markings. As shown in FIG. 51, a retroreflective white lane line is juxtaposed with a non-retroreflective black lane line along a common axis in order to enhance visibility of the lines. The enhanced contrast is depicted in a perspective view in FIG. 52. In other embodiments, the contrast is enhanced by placing black lines on lateral edges of the white lines, as shown in FIG. 53. A retroreflective mesh in accordance with the various embodiments described herein may be incorporated or embedded into these contrasting segments, as described above with respect to FIG. 10, for example. It should be understood that this contrast-enhancing feature of the embodiments described above could be implemented in addition to conventional contrast-enhancing mechanisms including those shown in FIGS. 51-53 as well as other constructions of black/white contrast markings. Contrast markings are typically used on concrete roadways or on aged asphalt roadways whereby the luminance properties of the roadway surface do not contrast sufficiently with the luminance properties of white pavement markings, thus rendering the white markings harder to distinguish.

Figure 54:
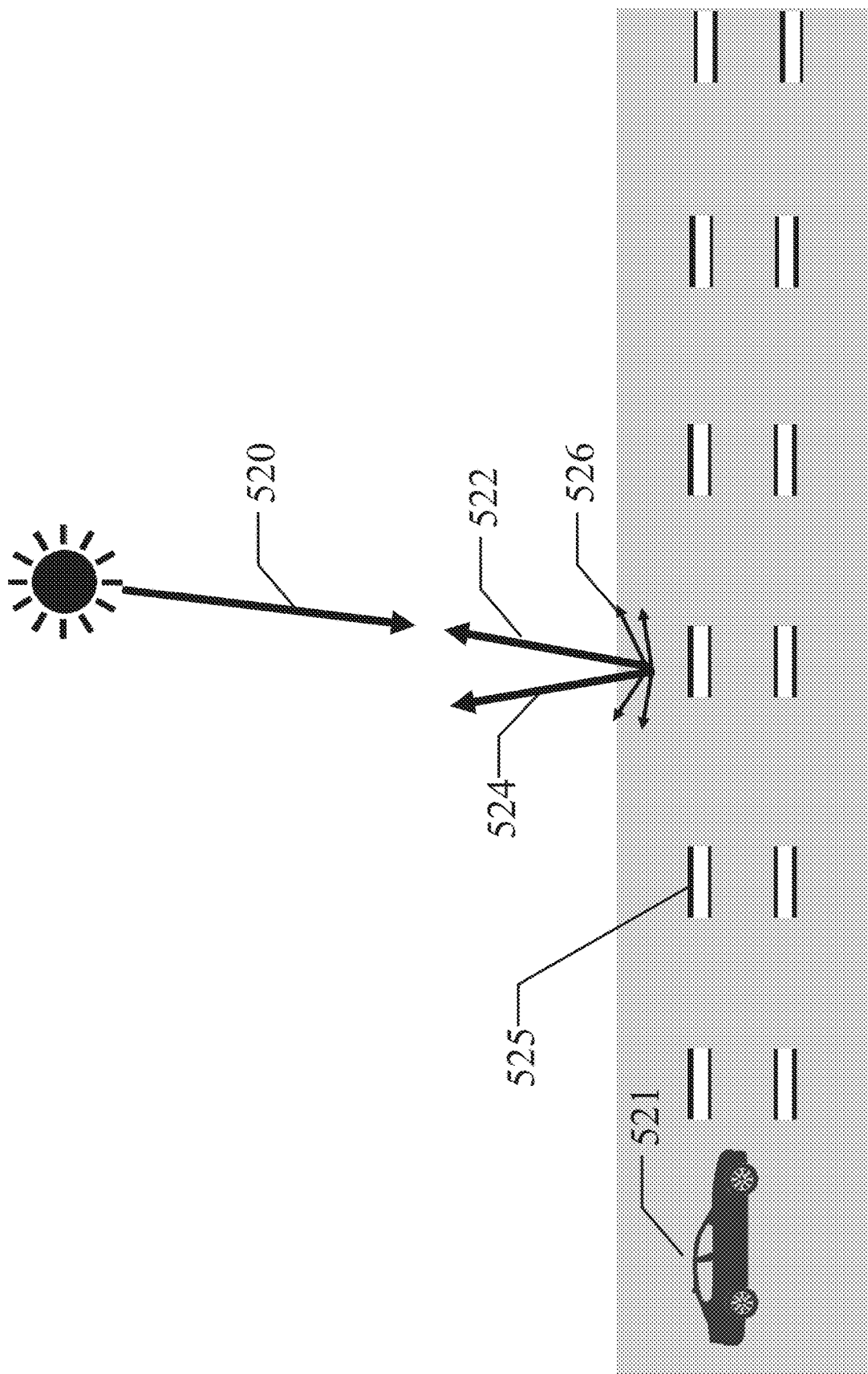
FIG. 54 illustrates a scene with contrast pavement markings and a non-oblique sun angle.

FIG. 54 illustrates a roadway with contrast markings 525. The sun, shown high in the sky, sends light 520 toward the roadway surface at a substantially non-oblique angle. Solar radiation that hits the roadway surface will be subjected to three components of reflectivity—retroreflectivity 522 whereby the reflected angle is equal to and in the opposite direction of the incident angle, specular reflection 524 (or mirror reflection) whereby the reflected angle equidistant from the normal angle for the roadway surface, and diffuse reflection 526 (or scatter reflection) whereby the angles of reflected light are scattered throughout and are dependent on the material properties and surface texture of the roadway material.

The luminance properties of the roadway surface and contrast markings 525 to a driver of or a sensor contained within a vehicle 521 will determine how well the vehicle 521 will be able to detect, interpret, and act upon the contrast markings 525 regardless of the position of the sun in the sky. For conditions whereby the sun is high in the sky (at a substantially non-oblique angle) for a concrete roadway, the luminance properties of the roadway and markings may present flux density amounts to the vehicle similar to:

| Material | Concrete Roadway | Contrast PM White | Contrast PM Black |
|---|---|---|---|
| Retro Flux Density | 0 mW/m$^2$ | 0 mW/m$^2$ | 0 mW/m$^2$ |
| Specular Flux Density | 0 mW/m$^2$ | 0 mW/m$^2$ | 0 mW/m$^2$ |
| Diffuse Flux Density | 20 mW/m$^2$ | 30 mW/m$^2$ | 2 mW/m$^2$ |
| Total Flux Density | 20 mW/m$^2$ | 30 mW/m$^2$ | 2 mW/m$^2$ |

For roadways that include contrast markings, the ability to detect white pavement markings is enhanced because the pavement marking contrast is increased from 10 mW/m$^2$ (30 mW/m$^2$-20 mW/m$^2$) for white pavement markings on concrete to 18 mW/m$^2$ (20 mW/m$^2$-2 mW/m$^2$) for black contrast marking edges on concrete.

Figure 55:
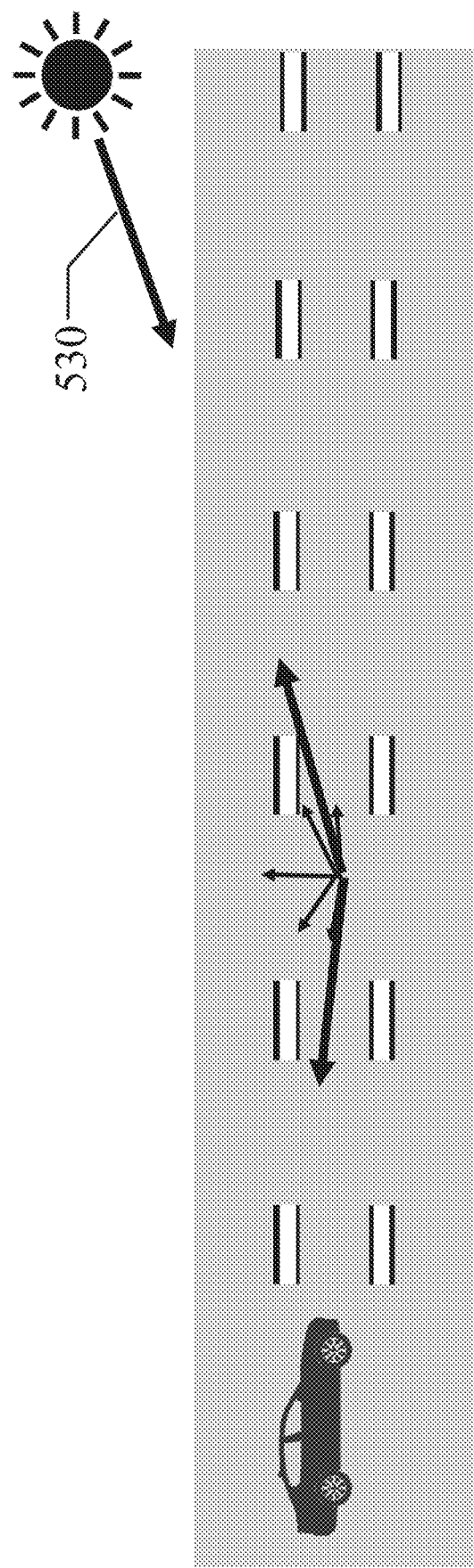
FIG. 55 illustrates a scene with contrast pavement markings and an oblique sun angle.

FIG. 55 illustrates a roadway with contrast markings 525. The sun, however, is shown lower in the sky and sends light 520 toward the roadway surface at a substantially oblique angle. Solar radiation that hits the roadway surface will still be subjected to three components of reflectivity, but the flux densities of the reflectivity components will be presented differently to the vehicle than those flux densities in the non-oblique configuration from FIG. 54. For conditions whereby the sun is lower in the sky (at a substantially oblique angle) for a concrete roadway, the luminance properties of the roadway and markings may present flux density amounts to the vehicle similar to:

| Material | Concrete Roadway | Contrast PM White | Contrast PM Black |
|---|---|---|---|
| Retro Flux Density | 0 mW/m$^2$ | 0 mW/m$^2$ | 0 mW/m$^2$ |
| Specular Flux Density | 70 mW/m$^2$ | 75 mW/m$^2$ | 65 mW/m$^2$ |
| Diffuse Flux Density | 4 mW/m$^2$ | 6 mW/m$^2$ | 1 mW/m$^2$ |
| Total Flux Density | 74 mW/m$^2$ | 81 mW/m$^2$ | 66 mW/m$^2$ |

For roadways that include contrast markings, the ability to detect white pavement markings is compromised because the pavement marking contrast of 7 mW/m$^2$ (81 mW/m$^2$-74 mW/m$^2$) for white pavement markings on concrete is sufficiently close to 8 mW/m$^2$ (74 mW/m$^2$-66 mW/m$^2$) for black contrast marking edges on concrete.

Figure 56:
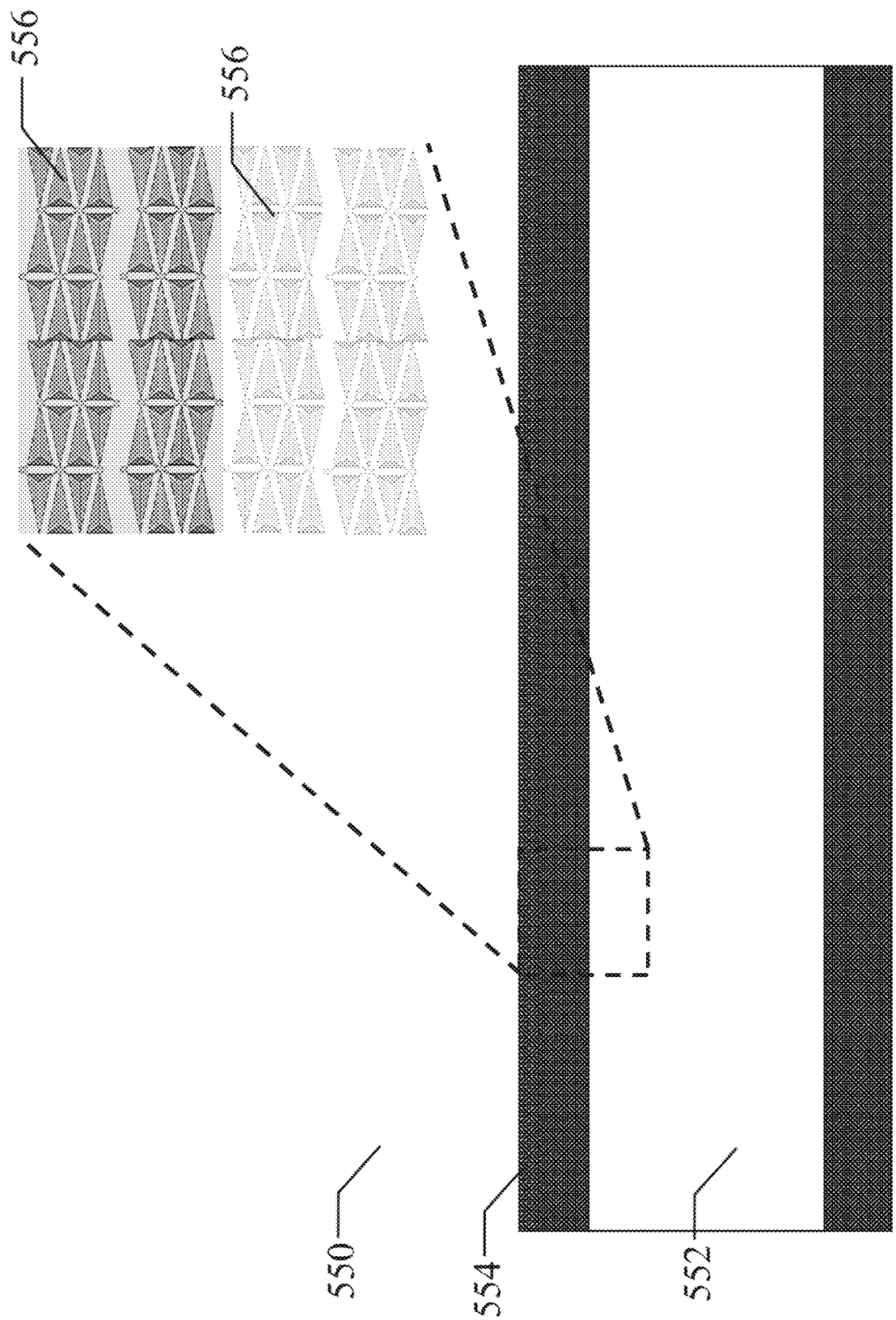
FIG. 56 illustrates a contrast pavement marking with an anisotropic reflective mesh, according to an embodiment.

FIG. 56 illustrates a contrast marking 550 for enhanced performance in substantially-oblique sun angle environments. The top view of the marking illustrates a white binder 552 and a black binder 554. In embodiments, an anisotropic reflective mesh 556 is installed in the black binder and the white binder. For conditions whereby the sun is lower in the sky (at a substantially oblique angle) for a concrete roadway, the luminance properties of the roadway and markings may present flux density amounts to the vehicle similar to the values shown below for the anisotropic-mesh-enhanced contrast marking:

| Material | Concrete Roadway | Contrast PM White | Contrast PM Black |
|---|---|---|---|
| Retro Flux Density | 0 mW/m$^2$ | 0 mW/m$^2$ | 0 mW/m$^2$ |
| Specular Flux Density | 70 mW/m$^2$ | 54 mW/m$^2$ | 50 mW/m$^2$ |
| Diffuse Flux Density | 4 mW/m$^2$ | 5 mW/m$^2$ | 1 mW/m$^2$ |
| Total Flux Density | 74 mW/m$^2$ | 59 mW/m$^2$ | 51 mW/m$^2$ |

In embodiments, for roadways that include anisotropic-mesh-enhanced contrast markings, the ability to detect white pavement markings in oblique-sun-angle scenarios is improved because the pavement marking contrast of 15 mW/m$^2$ (74 mW/m$^2$-59 mW/m$^2$) for white pavement markings on concrete exceeds the 7 mW/m$^2$ value with no mesh additions, and because the pavement marking contrast of 23 mW/m$^2$ (74 mW/m$^2$-51 mW/m$^2$) for black contrast marking edges on concrete exceeds the 8 mW/m$^2$ value with no mesh additions. White pavement markings and black pavement markings will exhibit higher contrast from roadways in oblique-sun-angle scenarios because up to 25% of the incident oblique signal is retroreflected toward the light source, thus decreasing the specular reflectance flux density by up to 25%.

Figure 57:
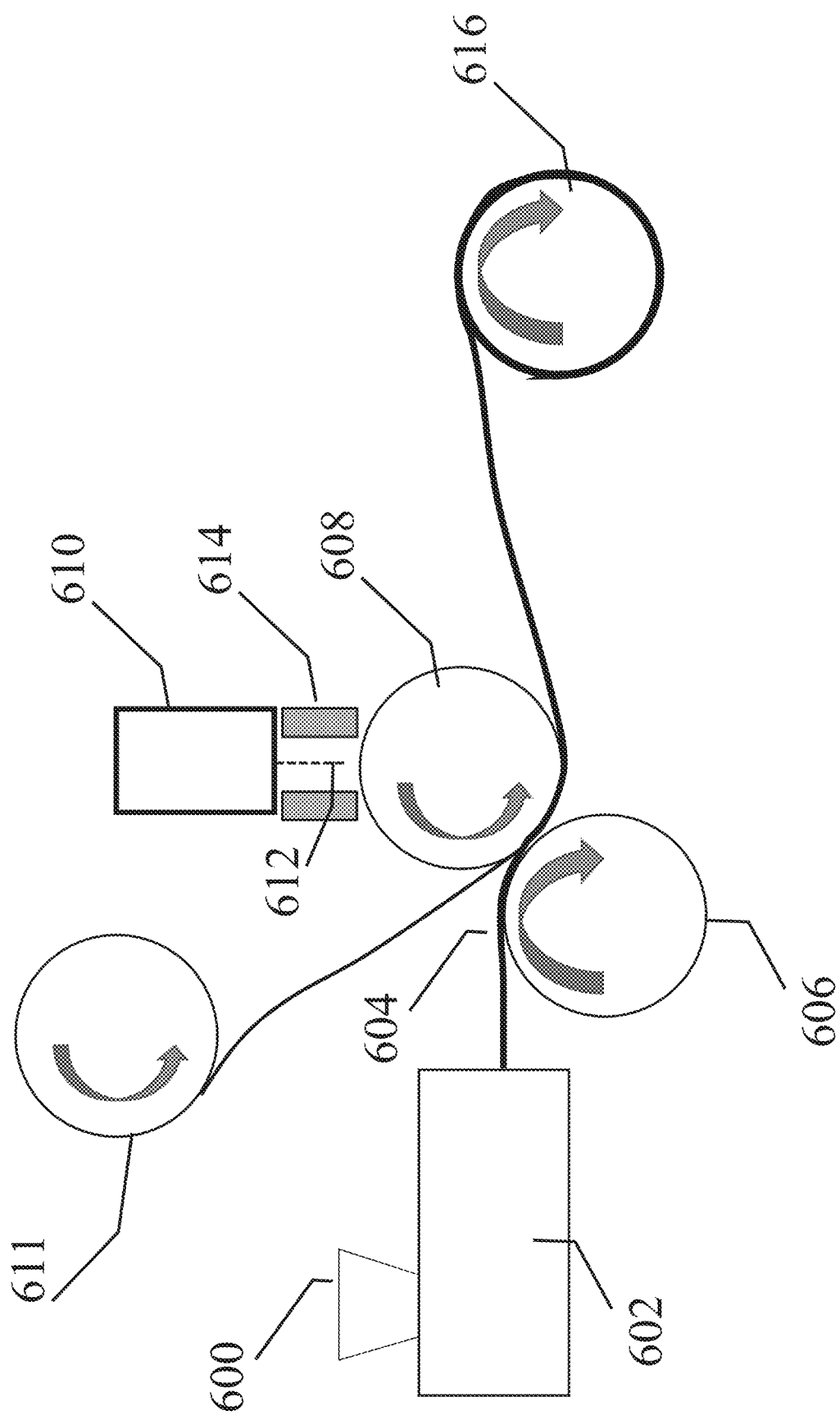
FIG. 57 depicts a process line for making an anisotropic retroreflective material according to an embodiment.

FIG. 57 shows a processing line configured to generate meshes of retroreflective tapes or other materials that include trihedral materials or other retroreflective elements as described herein. As shown in FIG. 53, a hopper 600 feeds a die 602, which extrudes a web 604. The material fed through hopper can be a powder, for example made of materials such as those described in U.S. Pat. No. 8,591,044. The web 604 can be made of a binder material such as those described above with respect to other embodiments. The extruded web 604 of High Index of Refraction (HIR) elements, reflectors, or chips is transferred to nip rollers 606 and 608. Nip rollers 606 and 608 can provide a uniform thickness of the web 604. Additionally, nip rollers can be used to provide a desired texture, by embossing either or both of the nip rollers (606, 608) with a negative of a desired profile.

Scrim feed 611 is provided to orient retroreflective elements made in this way. Scrim feed 611 is heated, fused with elements, reflectors, or chips, and "formed" to orient the top sides of anisotropic chips. Scrim feed 611 can be heated and fused with elements, reflectors, or chips having non-anisotropic characteristics as well, such as the retroreflective elements described above with respect to FIGS. 7A-7E.

In the embodiment shown in FIG. 57, nip roller 608 is further used to deliver retroreflective elements at a surface portion of the web 604. As shown in FIG. 56, a reflector maker 610 is arranged proximate to nip roller 608, and is configured to provide reflectors 612, shown falling towards nip roller 608. Reflectors 612 fall between two plates 614, which generate an electromagnetic field to orient them en route to the nip roller 608. In embodiments, as described with respect to FIG. 44, each of the reflectors 612 can be statically charged in order to be aligned in this way. Nip roller 608 can hold the aligned reflectors 612 by static electrical force, in one embodiment, or nip roller 608 could be made or a naturally tacky material such as polydimethylsiloxane (PDMA) or similar that holds the oriented reflectors 612 due to Van der Waals interactions. In either case, nip roller 608 holds reflectors 612 and impresses them into web 604, which is then collected at roller 616.

The simplified process line shown in FIG. 57 could include other components, in alternative embodiments. For example, while FIG. 57 only shows embedding reflectors 612 oriented in one direction (i.e., unidirectional anisotropy) it may be desirable to have reflectors 612 that point in opposite directions, as described with respect to other embodiments. This could be accomplished either by providing reflectors 612 that have opposite charges from one another, or alternatively a second reflector maker 610 could be used to provide reflectors that are oriented in the opposite direction. A second reflector maker 610 could use an additional nip roller (not shown).

Reflector maker 610 can be a shaker to dispense pre-made reflectors, or it could form the reflectors during processing, in embodiments. In some embodiments, the reflectors can be shaped by exposure to radiation en route to the nip roller, as described in U.S. Pat. No. 8,513,322 which describes the use of nip rollers for the creation of spherical beads.

In still further embodiments, nip rollers 606 and 608 can "pinch" the web 604 to create voids corresponding to a desired mesh pattern. A sprayer could then be used to apply material having the desired index of refraction for the anisotropic retroreflectors. Alternatively, pre-formed trihedral reflectors could be placed on top of the web having the negative of the mesh pattern and reflectors could be inserted therein mechanically.

The process line shown in FIG. 57 could also be modified to include a source of opaque material. For example, before web 604 reaches nip rollers 606 and 608, a sprayer or roller could apply the opaque material such that it is present on the surface that will be impregnated with reflectors 612. In still further embodiments, a mesh of anisotropic retroreflectors could be draped over nip roller 608 to be pressed into web 604, using a roll-to-roll process.

In various embodiments, a process of producing a retroreflective mesh includes providing a plurality of reflectors, each of the plurality of reflectors including: a front surface presenting a generally flat surface; an array of cube corner elements defining a plane parallel to the front surface with at least some of the cube corner elements having an apex axis having an orientation generally tilted relative to a normal of the plane; such that when the element is incorporated with the backing material of the article a refractive index ratio of the second index of refraction to the first index of refraction is at or above an amount that produces a near-ideal total internal reflection (TIR) of light incident upon the front surface. The process further includes co-orienting the plurality of reflectors in a mesh having a pattern in which each of the apex axes of the plurality of reflectors is substantially parallel to one another; and combining the binder material and the mesh of the plurality of reflectors such that the front surfaces of the plurality of reflectors are exposed while all other surfaces of the plurality of reflectors are arranged in contact with the binder material.

In embodiments, the binder in the process has a first index of refraction and the plurality of reflectors have a second index of refraction that is different from the first index of refraction. In embodiments, the co-orienting of the plurality of reflectors in the mesh includes using a scrim roller to provide an orientation direction. In embodiments, the co-orienting of the plurality of reflectors comprises applying a static charge to the plurality of reflectors; and exposing the reflectors to an electromagnetic field. In embodiments, the forming of the web of the binder material comprises extruding a polymer. In embodiments, the forming of the web of the binder material comprises applying a paint to a surface. In embodiments, the process may further comprise applying the combined web and plurality of reflectors to a roadway or applying a pressure treatment to the combined web and plurality of reflectors after applying to the roadway.

Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. A retroreflective material for creating roadway markers having a near-ideal retroreflectivity, the retroreflective material comprising:
   a mesh made of a flexible compound; and
   a plurality of discrete retroreflective elements made of a rigid material retained within the mesh in an array pattern that defines an incident material surface, each retroreflective element formed of one or more cube corner elements with at least some of the cube corner elements having an apex axis having an orientation generally tilted relative to a normal of the incident material surface and each retroreflective element includes at least a front surface exposed to the incident material surface having a tilted surface normal angle of between about 2 degrees and 8 degrees relative to the normal of the incident material surface,
   wherein each of the plurality of discrete retroreflective elements is configured to produce a near-ideal total internal reflection (TIR) when the retroreflective material is installed on a roadway.

2. The retroreflective material of claim 1, wherein the retroreflective material is configured to be installed with a body layer presenting a generally flat surface corresponding to the incident surface and having a high transparency and a first index of refraction, and wherein each retroreflective element has a material affixed to the cube corner surfaces with a second index of refraction such that a refractive index ratio of the second index of refraction to the first index of refraction is sufficiently high to produce a high degree of total internal reflection (TIR) of light incident upon the retroreflective element.

3. The retroreflective material of claim 2, wherein the retroreflective material produces a retroreflectivity of greater than 90% of light incident upon the incident surface over an angular performance range of entrance angles from 80 degrees to 90 degrees.

4. The retroreflective material of claim 1, wherein the flexible compound is a plastic compound and the rigid material is a crystalline compound or element.

5. The retroreflective material of claim 4, wherein the plastic compound consists of polycarbonate or acrylic and the crystalline compound or element consists of zirconium, crystallized carbon, or silicon carbide.

6. The retroreflective material of claim 1, wherein the flexible compound is transparent to wavelengths of electromagnetic radiation from 400-1000 nanometers.

7. The retroreflective material of claim 1, wherein the flexible compound is a degradable material.

8. The retroreflective material of claim 7, wherein the degradable material consists of an ultraviolet degradable material or a water soluble degradable material.

9. The retroreflective material of claim 1, wherein each retroreflective element has a thickness of less than 30 microns and an average diameter of the element that is less than 1 cm.

10. The retroreflective material of claim 1, wherein each cube corner element has at least one surface having a surface roughness that ranges 0.0005 microns to 0.01 microns.

11. A retroreflective element comprising a cube corner element having at least one incident surface exposed to incident radiation and having a cube corner apex axis with an orientation generally tilted relative to a normal of the incident surface, wherein the element comprises at least about 10 percentage by weight $TiO_2$, and wherein the element has an index of refraction of at least 2.3.

12. The element of claim 11, wherein the element is transparent to wavelengths of light in a range selected from the set consisting of 400-700 nanometers, 400-1000 nanometers, and 400-1800 nanometers.

13. The element of claim 11 wherein the element comprises at least about 40 percentage by weight $TiO_2$.

14. The element of claim 11 wherein the element comprises at least about 65 percentage by weight $TiO_2$.

15. The element of claim 11 wherein the element further comprises at least about 0.5 percentage by weight CaO.

16. A retroreflective article formed of a plurality of the retroreflective elements of claim 11 in a binder material.

17. A retroreflective article formed of a plurality of the retroreflective elements of claim 11 configured in a mesh made of a flexible material.

18. A retroreflective article formed of a plurality of the retroreflective elements of claim 11 configured in a body layer presenting a generally flat incident surface and having a high transparency.

\* \* \* \* \*